United States Patent
Maresca, Jr.

(10) Patent No.: US 10,161,240 B1
(45) Date of Patent: Dec. 25, 2018

(54) METHOD AND APPARATUS FOR TESTING THE BLOWOUT PREVENTER (BOP) ON A DRILLING RIG

(71) Applicant: Vista Precision Solutions, inc., Richland, WA (US)

(72) Inventor: Joseph W. Maresca, Jr., Sunnyvale, CA (US)

(73) Assignee: Vista Prevision Solutions, Inc., Richland, WA (US)

( * ) Notice: Subject to any disclaimer, the term of this patent is extended or adjusted under 35 U.S.C. 154(b) by 123 days.

(21) Appl. No.: 14/545,476

(22) Filed: May 8, 2015

Related U.S. Application Data

(60) Provisional application No. 61/990,508, filed on May 8, 2014.

(51) Int. Cl.
*E21B 47/06* (2012.01)
*G01M 3/28* (2006.01)
*E21B 33/06* (2006.01)
*E21B 34/02* (2006.01)

(52) U.S. Cl.
CPC .............. *E21B 47/06* (2013.01); *E21B 33/06* (2013.01); *E21B 34/02* (2013.01); *G01M 3/2876* (2013.01)

(58) Field of Classification Search
CPC .................................. E21B 33/06; E21B 47/06
See application file for complete search history.

(56) References Cited

U.S. PATENT DOCUMENTS

| | | | |
|---|---|---|---|
| 2005/0126639 A1* | 6/2005 | Ens | F16K 37/0083 137/554 |
| 2008/0314122 A1* | 12/2008 | Hunaidi | G01M 3/243 73/40.5 A |
| 2013/0073227 A1* | 3/2013 | Levy | G01M 3/2846 702/51 |

\* cited by examiner

*Primary Examiner* — David M Gray
*Assistant Examiner* — Andrew V Do
(74) *Attorney, Agent, or Firm* — David H. Jaffer; Pillsbury Winthrop Shaw Pittman LLP

(57) ABSTRACT

A method and apparatuses for testing the blowout preventer (BOP) piping system on a drilling rig for leaks. The method and apparatuses can be used in conjunction with a pressure or volumetric method to more accurately test the BOP for integrity and to shorten the total time of testing.

17 Claims, 45 Drawing Sheets

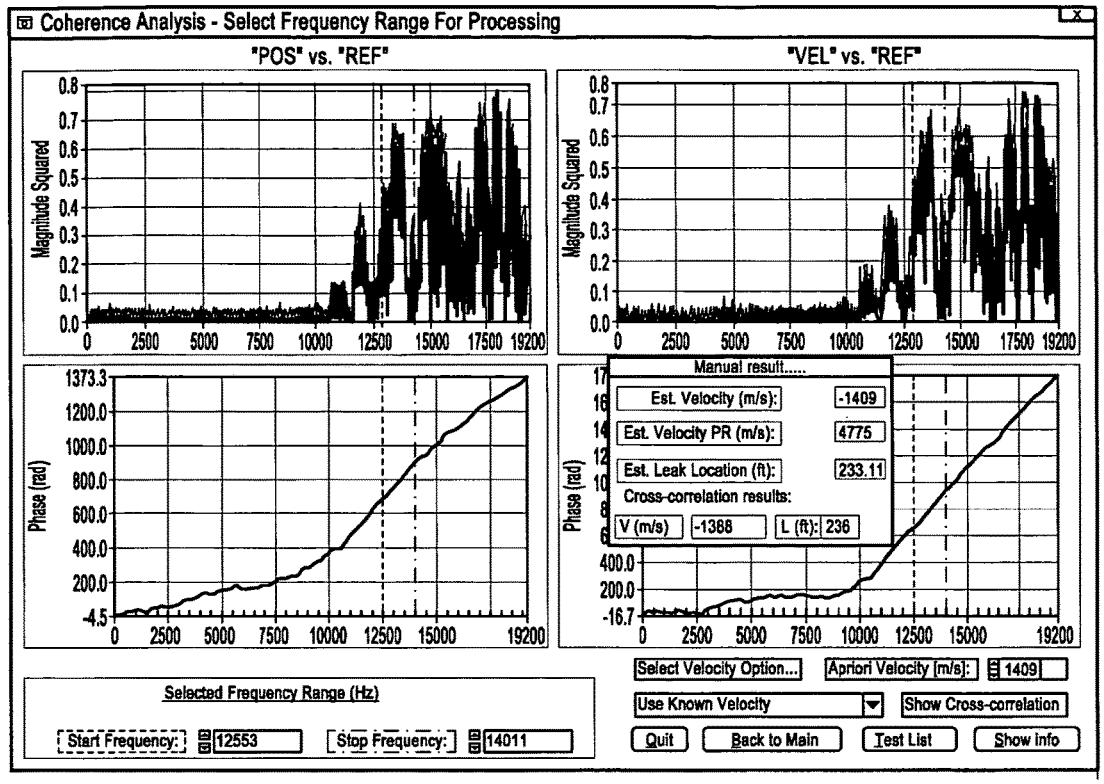
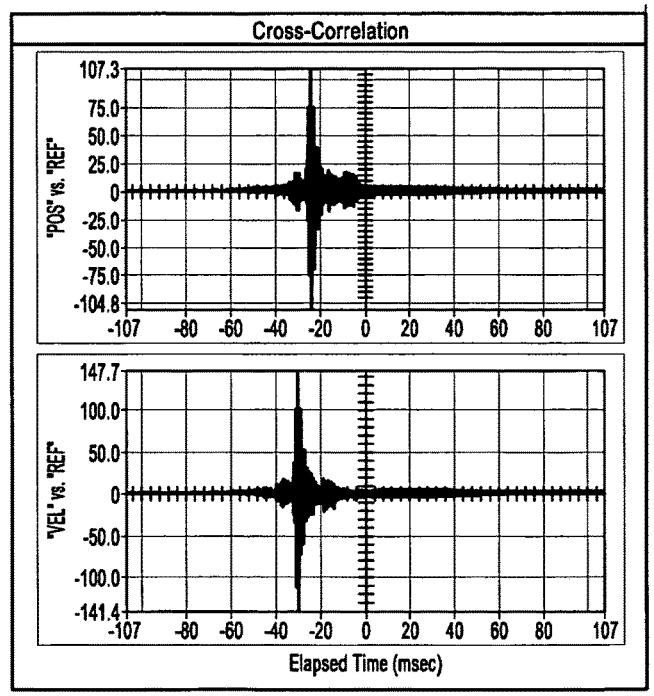
FIG. 13

— REF Power Spectrum Background - dB
— POS Power Spectrum Background - dB

— POS-REF Cross Power Spectra Background - dB
— POS-REF Cross Power Spectra Valve Flow Signal - dB

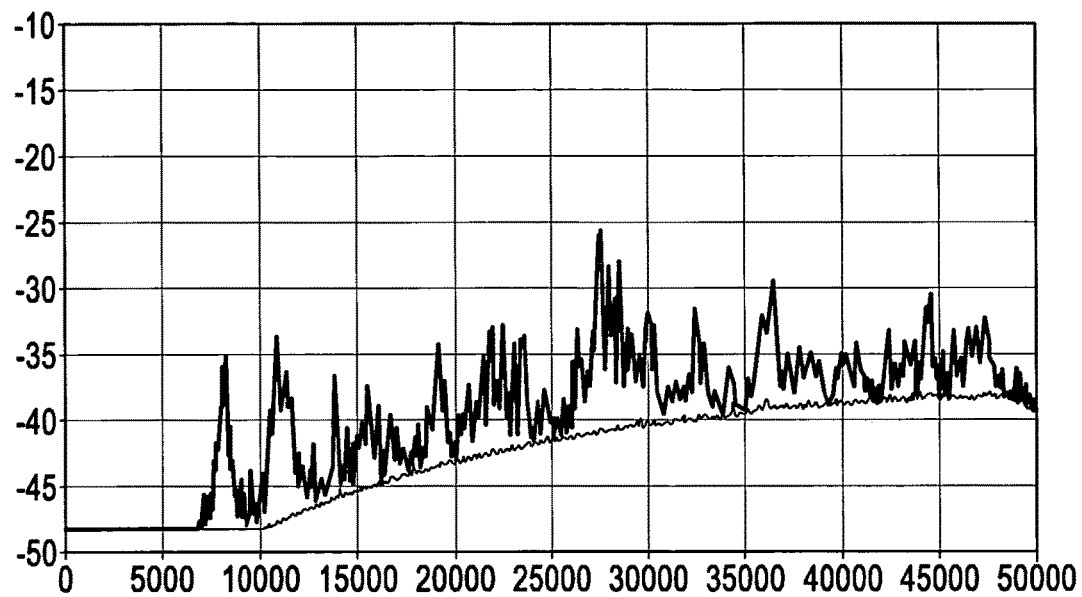
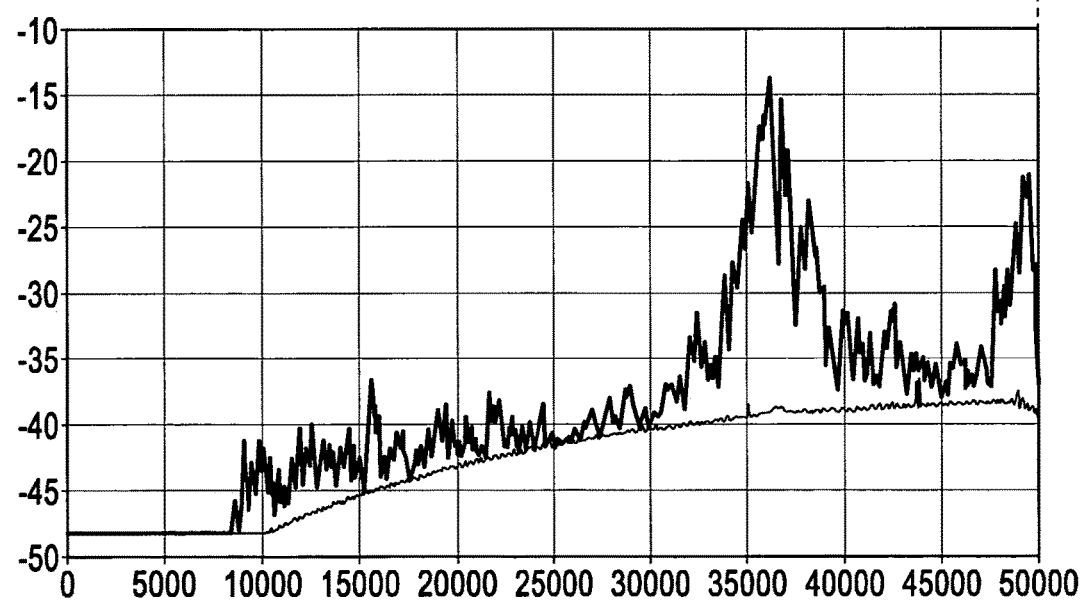
FIG. 31

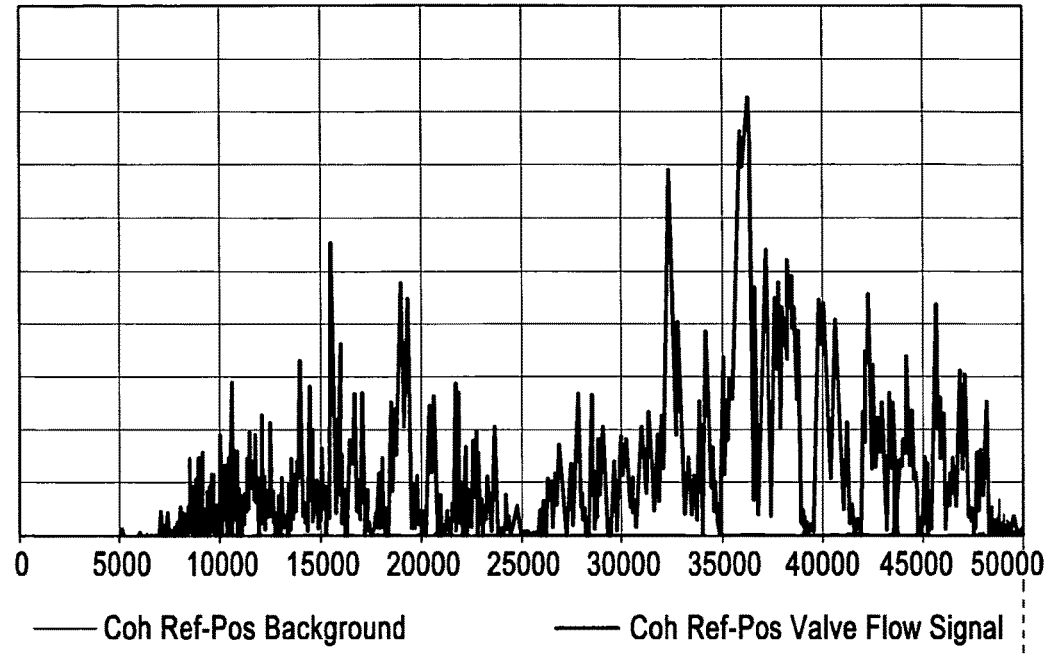
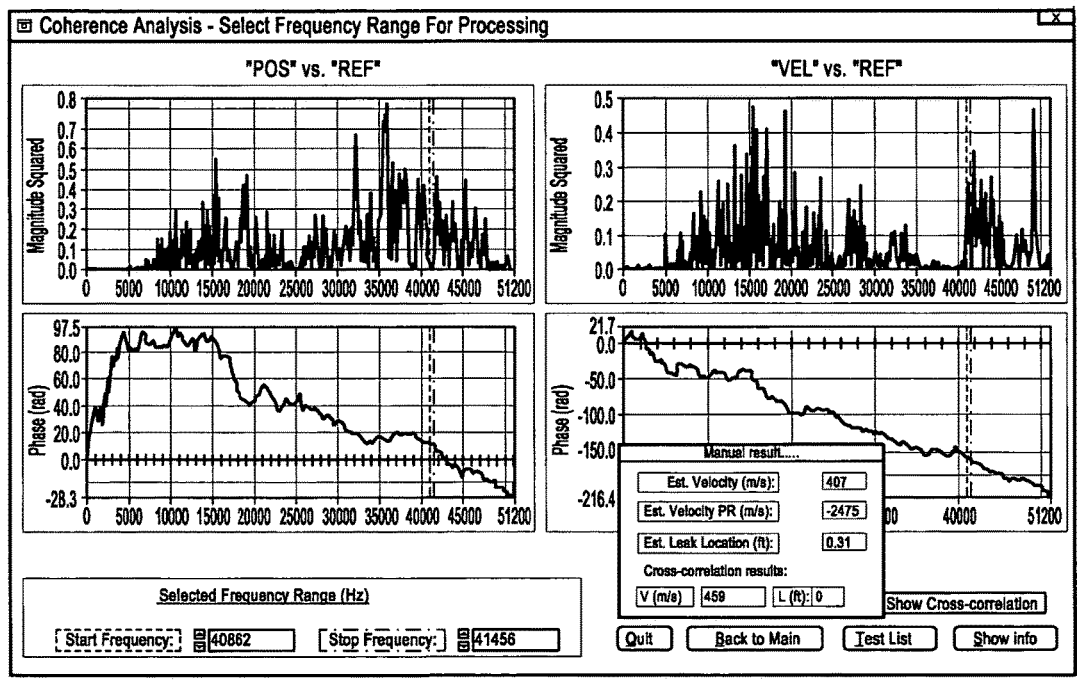
FIG. 33

— SNR - dB REF Ratio Power Spectra
— SNR - dB POS Ratio Power Spectra

— SNR - dB Ratio POS-REF Cross Power Spectra

— Diff SNR - dB REF Ratio Power Spectra
— Diff SNR - dB POS Ratio Power Spectra

— Diff SNR - dB Ratio POS-REF Cross Power Spectra

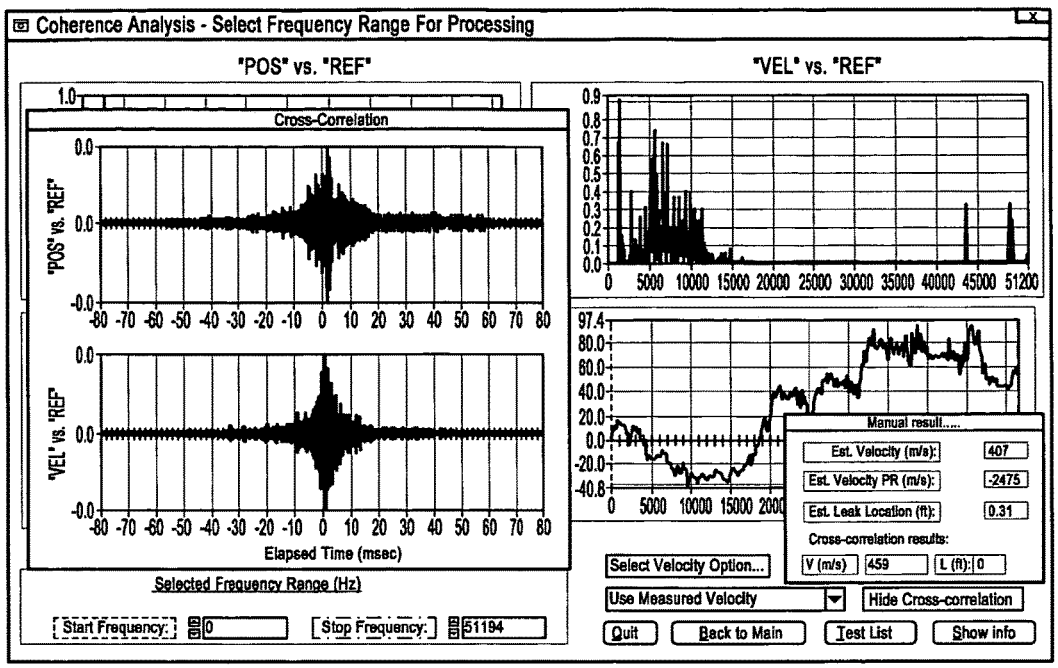
FIG. 44
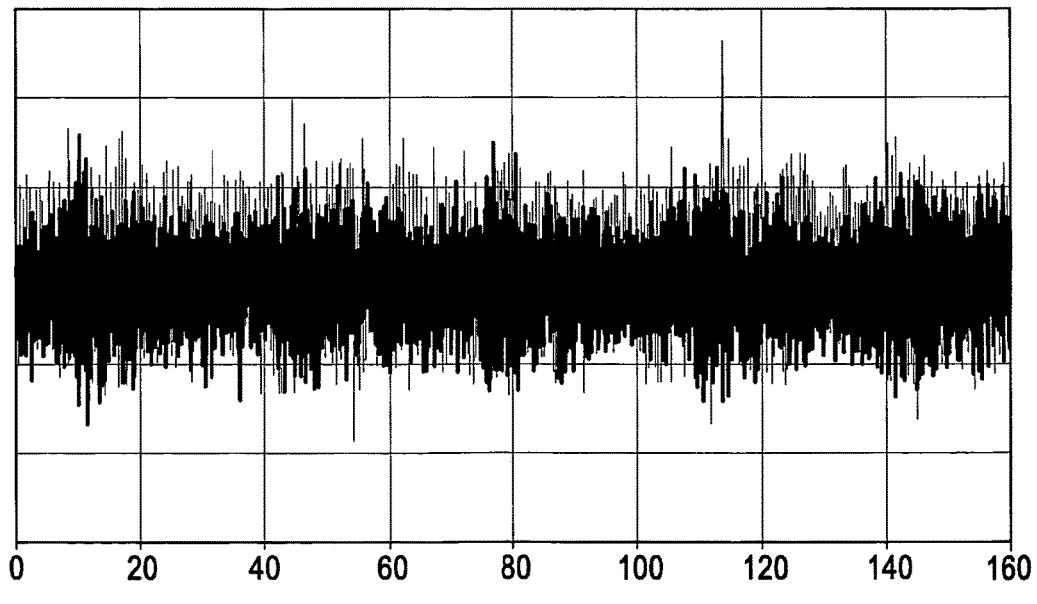
FIG. 45 —— POS Test #3 —— REF Test #3

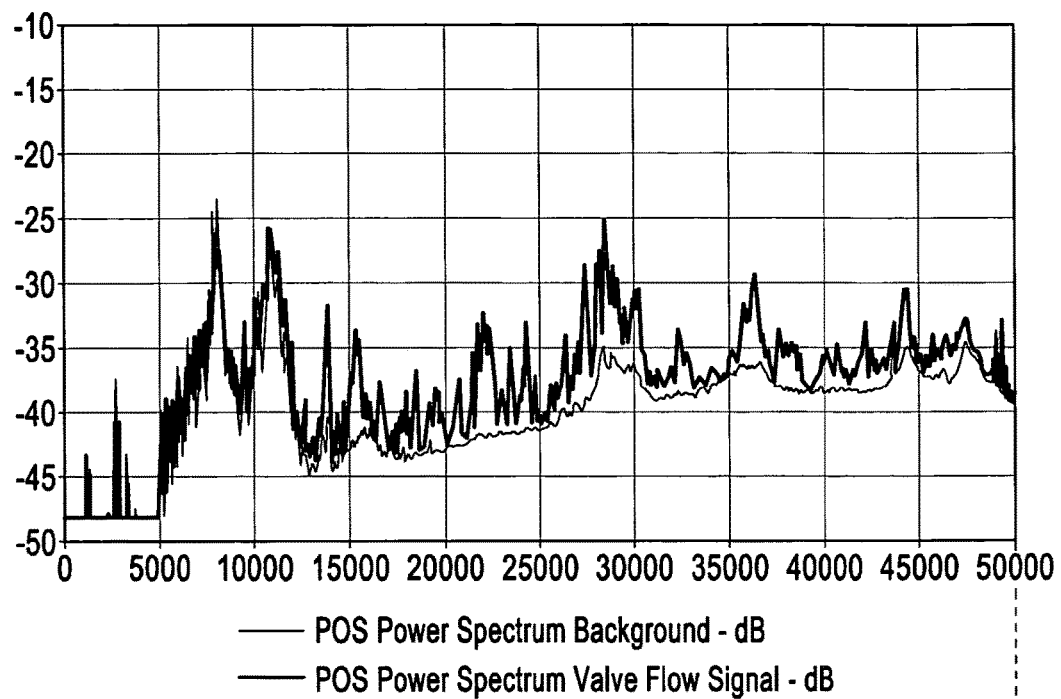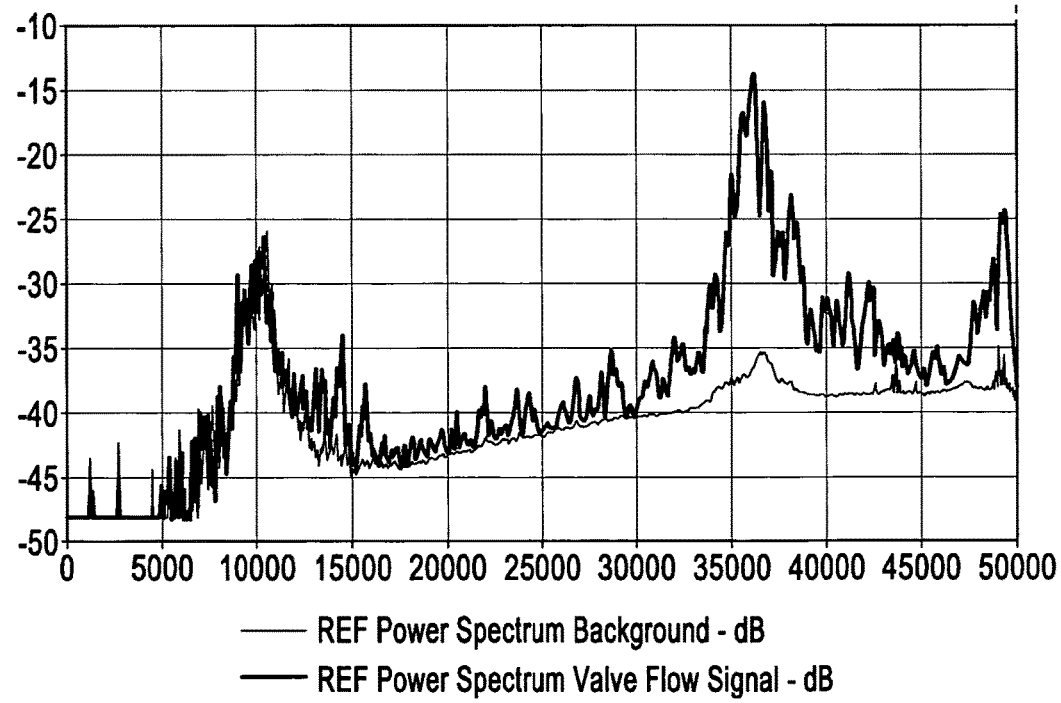
FIG. 47

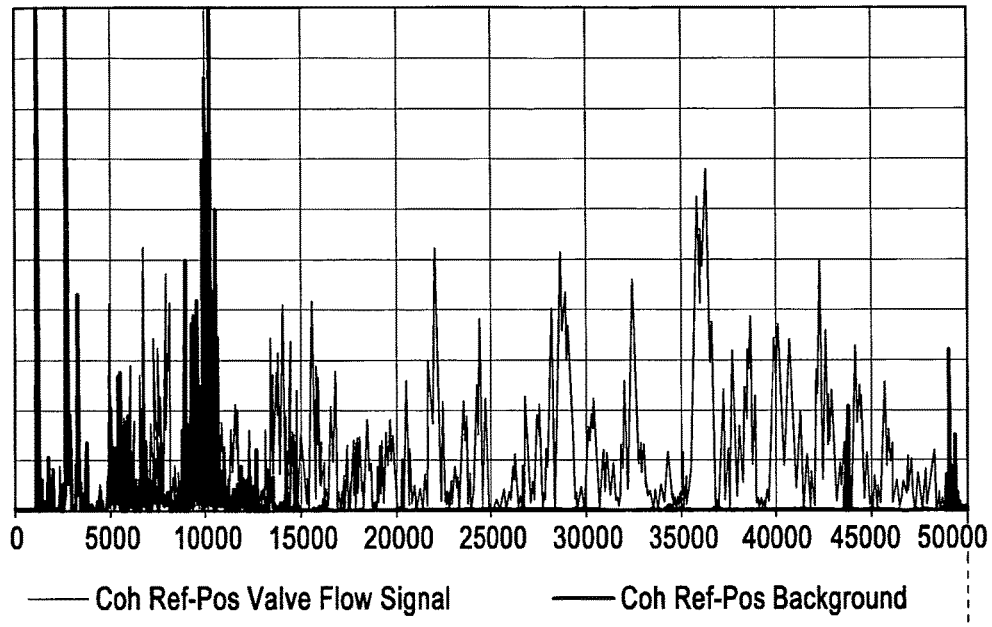
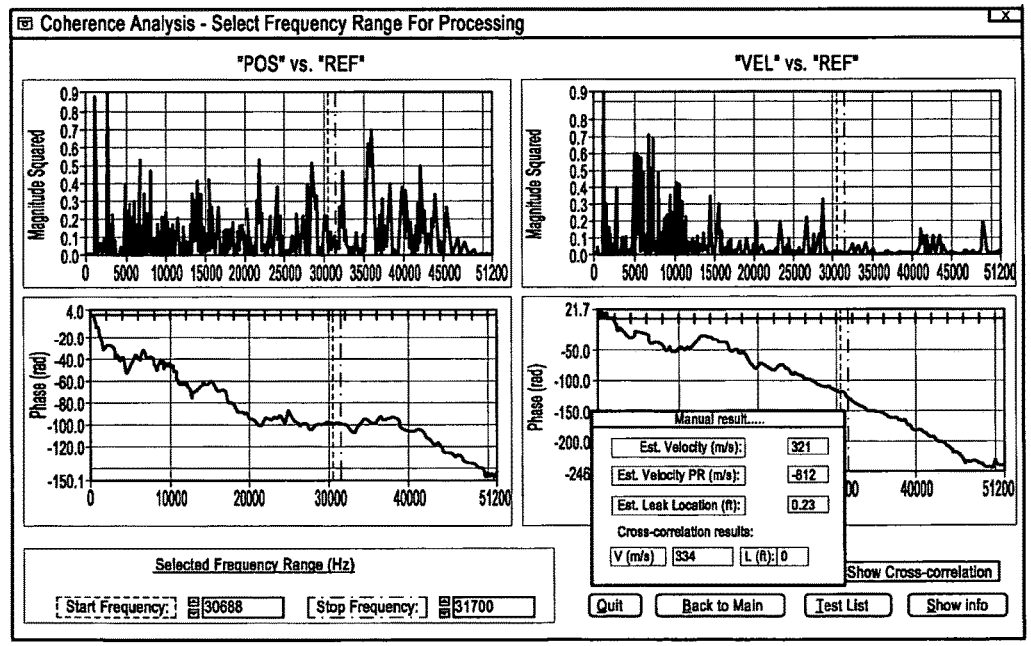
FIG. 49

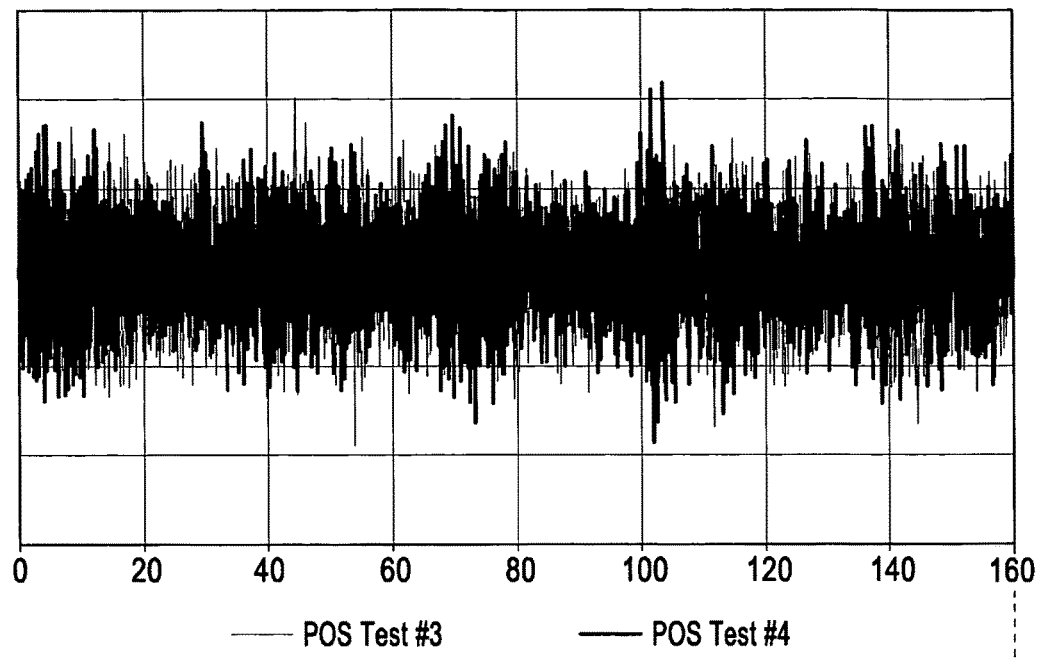
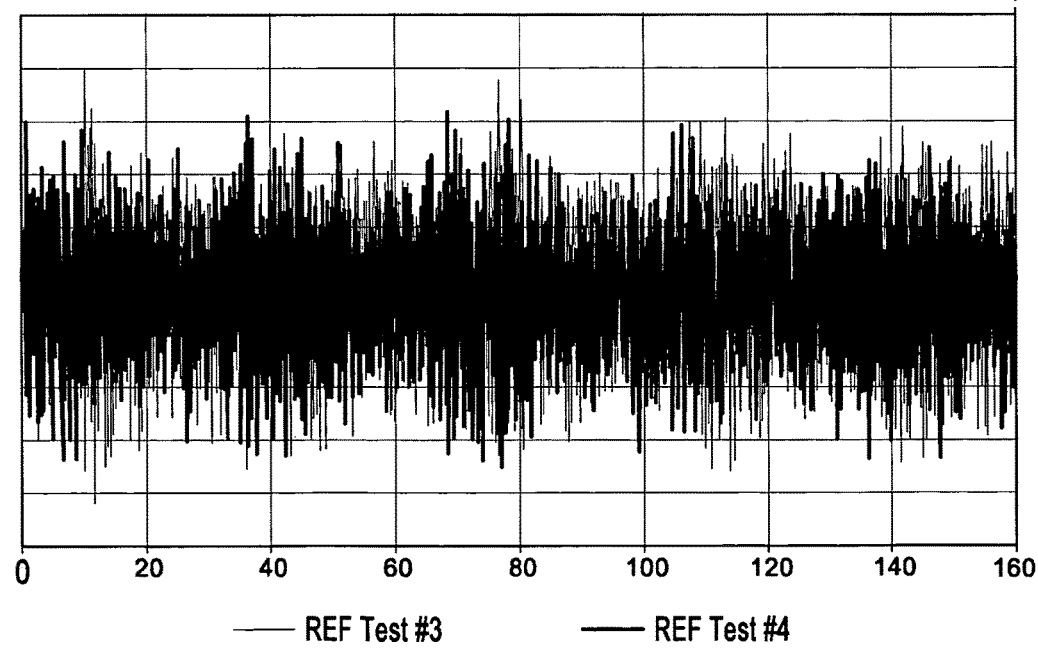
FIG. 51

—— Diff SNR - dB REF Ratio Power Spectra
—— Diff SNR - dB POS Ratio Power Spectra —— Diff SNR - dB Ratio POS-REF Cross Power Spectra — REF Power Spectrum Background - dB
— POS Power Spectrum Background - dB — POS-REF Cross Power Spectra Background - dB
— POS-REF Cross Power Spectra Valve Flow Signal - dB

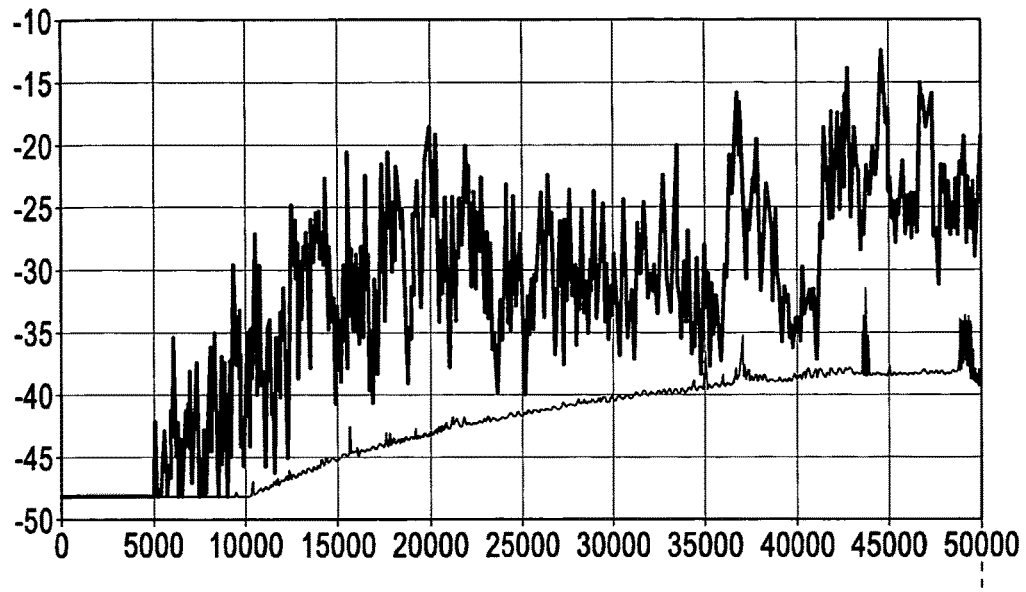
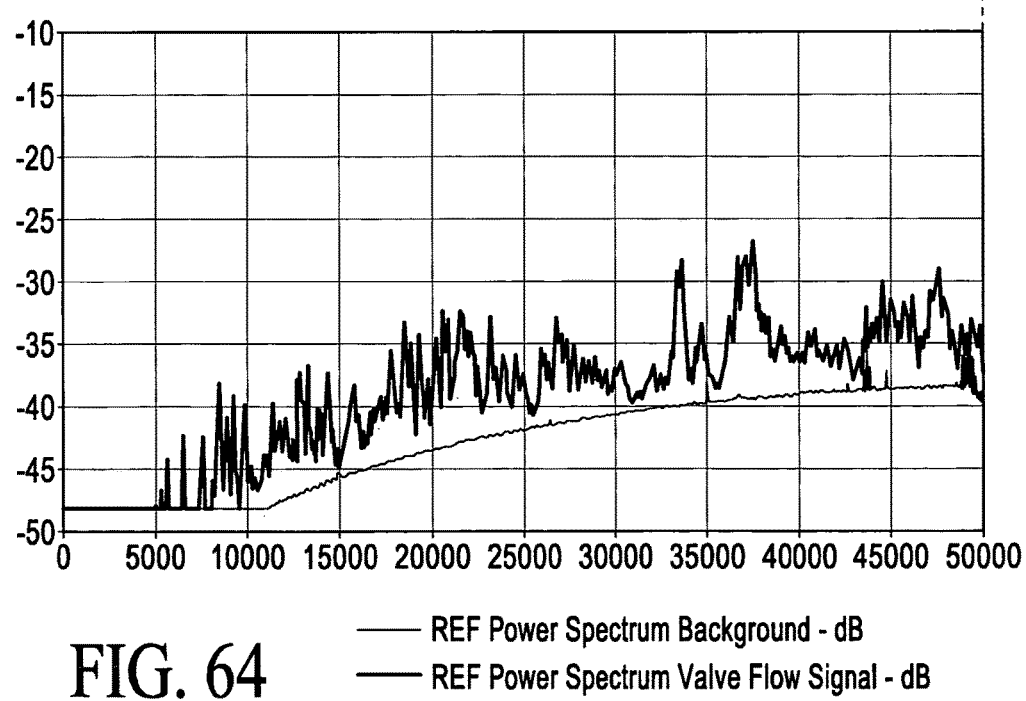
FIG. 64

METHOD AND APPARATUS FOR TESTING THE BLOWOUT PREVENTER (BOP) ON A DRILLING RIG

RELATED APPLICATIONS

This application claims the benefit of U.S. Provisional Patent Application Ser. No. 61/990,508 filed May 8, 2014, which is incorporated by reference herein.

BACKGROUND OF THE INVENTION

Field of the Invention

A method and apparatuses for testing the blowout preventer (BOP) piping system on a drilling rig for leaks. The method and apparatuses are comprised of a pressure, or alternatively a volumetric system, to test the piping and flanges for integrity and an acoustic sensor system to verify that the valves isolating the system for the integrity testing are completely sealed. The use of an acoustic valve sensing system with an integrity test minimizes the number of false alarms due to flow across an incompletely sealed valve and reduces the time to mitigate these false alarms.

Brief Description of Prior Art

Currently, regulations in the United States (Title 30: *Mineral Resources*, Part 250—*Oil And Gas and Sulphur Operations in the Outer Continental Shelf Subpart D—Oil and Gas Drilling Operations;* § 250.447-§ 250.451) require that the BOP system on a drilling rig, both onshore and offshore rigs, be pressure tested according to Part 250, Subpart D, Sections 250.447-250.45. Section 250.447 indicates that the BOP should be tested when installed or at least every 14 days. Section 250.448 indicates that the BOP must be pressure tested. The pressure test is designed to insure that all parts of the BOP are operationally functional, i.e., pipes and flanges do not leak and valves seal completely when closed so that there is no flow across the valve. The regulation indicates that when a pressure test of the BOP system is performed, each component of the BOP must be pressure tested at a low-pressure and at a high-pressure. The low-pressure test must be conducted before the high-pressure test. Each individual pressure test must hold pressure long enough to demonstrate that the tested component(s) holds the required pressure. The required test pressures are as follows:
(a) Low-pressure test. All low-pressure tests must be between 200 and 300 psi. Any initial pressure above 300 psi must be bled back to a pressure between 200 and 300 psi before starting the test. If the initial pressure exceeds 500 psi, then the test must be re-initiated after bleeding the pressure back to zero.
(b) High-pressure test for ram-type BOPs, the choke manifold, and other BOP components. The high-pressure test must equal the rated working pressure of the equipment or be 500 psi greater than the calculated maximum anticipated surface pressure (MASP) for the applicable section of hole. Approval of the District Manager is required before the BOP equipment is tested to the MASP plus 500 psi.
(c) High pressure test for annular-type BOPs. The high pressure test must equal 70 percent of the rated working pressure of the equipment or to a pressure approved in your APD.
(d) Duration of pressure test. Each test must hold the required pressure for 5 minutes. For surface BOP systems and surface equipment of a subsea BOP system, a 3-minute test duration is acceptable if the test pressures are recorded. If the equipment does not hold the required pressure during a test, then the problem must be corrected and the affected components must be retested.

FIG. 1a illustrates a BOP Stack that needs to be pressure tested. It is comprised of the BOP itself, short sections of piping, and valves used to isolate parts of the BOP system. Many of the valves are in pairs for redundancy. Valves are opened and closed to test each part of the entire system. This procedure illustrates a five test procedure and involves a Casing Pressure Test, a Pipe Rams Test, an Annular Test, a Blind Rams Test, and a Choke Manifold Test. Such BOP tests can involve many more valves and many more than five valve configurations.

Typically, the BOP system is tested for leaks by closing valves on the BOP system to isolate parts or all of the BOP for this testing and pressurizing the system with water. Any drop in pressure that exceeds some specified threshold value is indicative of an integrity problem. This pressure drop can be produced by a leak in a pipe or pipe flange, and/or it could be produced by flow across an incompletely closed valve. Any valves that do not completely seal can be mistaken for a leak (i.e., a false alarm) or prevent an integrity test from being completed. To mitigate these false alarms and incompletely sealed valves can be an extremely time-consuming and expensive process, because, first, it must be determined that a valve is not sealed and is the source of the pressure drop rather than a leak from a pipe flange, and second, if the pressure drop is due to an incompletely closed valve, then it must be determined which valve or valves are not sealed. Before the valves are considered, a visual check of the piping, piping flanges, and appurtenances is made to determine if there are any obvious leaks. If none are found, then the valves are checked. The present testing procedures do not include any sensing systems to check whether or not the valves are sealed. If a pressure loss occurs, then all of the valves are checked to insure they are closed, but this is a challenging task and is generally done by either re-opening and re-closing each valve to make sure they are closed and/or further tightening each valve. This is time consuming, because the only way to determine whether or not the valve check was successful was to repeat the pressure test. Simply reclosing the valve or more tightly closing the valve is no assurance that the valve is actually closed, because debris, grit, sand, and nicks in the valve may prevent a complete seal.

An acoustic sensor can be attached to the external wall of the pipe near each valve (either permanently or temporarily) to listen for the "flow noise" produced by the flow across an incompletely closed valve with a small hole or slit (i.e., the valve flow signal). This approach will not work well, because there are a variety of sources of background noise present on a drilling rig that cannot be easily or safely eliminated and that could easily mask the valve flow signal. There are several types of background noise. One type is background noise that emanates from a single location or a single source. This can not only mask the valve flow signal, but it can also be mistaken for a valve flow signal or a leak. A generator or a pump would be examples of this type of noise. These sources of noise can be very large, much larger than the valve flow signal to be detected. Fortunately, the acoustic return from most of these sources of noise are found in one or more narrow frequency bands that are generally not found in the same frequency bands as the valve flow signal, and thus, they can be removed through advanced signal processing methods, as described as part of the processing methods of the present invention. The noise cancellation methods (both adaptive noise cancellation and average background transfer function noise cancellation) of the present invention can also address the more complicated sources of background noise that are also present in the valve flow signal band. In general, simple acoustic listening systems do not have and do not use noise cancellation or advanced signal processing methods as described herein and none are currently used as part of BOP testing.

Another type of background noise is broadband noise that occurs at all frequency bands, including the valve flow signal bands. If this level of noise is larger than the valve flow signal or a leak, it can mask the valve flow signal or a leak, and as indicated above, acoustic listening methods will not work, unless advanced signal processing is used.

BOP testing requires that all drilling operations be shut down until these tests are completed and the integrity of the entire BOP system can be verified. This includes all valves, piping, and connections. Because of the large number of valves that need to be checked and that need to be sealed, the total BOP is not usually tested at one time. Instead, different parts of the BOP piping system are individually tested. Furthermore, because of the integrity of the BOP system must be ensured at the working operational pressure, more than one pressure test is typically required. For safety, a first pressure test is required to be conducted at a lower pressure (e.g., 200 to 300 psig) to ensure that the system is ready to be tested at the working operational pressures (e.g., 5,000 psig, or higher), or at a minimum of 500 psig. While the same valve problems can exist at both pressures, many of the improperly sealed valves can be mitigated at the lower pressure before testing at the higher pressure, which is safer and more efficient. One company requires testing nine different piping and valve configurations to fully assess the integrity of a BOP system. Typically, the pressure testing procedure is performed manually, is highly operator dependent for preparation of the BOP for testing and for interpretation of the results, and may take between 6 h and 40 hours to complete, with an average test time of 14 h. Since the piping sections are short (e.g., typically less than 100 ft), leaks are verified by visual inspection. This can be a challenging problem if the leaks are small or if tests are done at night or in inclement weather. Valve closure problems are even more difficult to resolve. This testing represents a loss of total operational drilling time of between 2 and 12% with an average of 4%. Because of this testing significantly impacts operations and results in a loss of income, quicker methods of testing are needed.

The method and apparatuses of the present invention are motivated by the need to reduce the drilling rig downtime associated with the periodic testing of the BOP piping system. The method and apparatuses of the present invention can address this downtime problem by integrating an acoustic valve sensing system as part of the total integrity pressure test. Knowing that each valve is sealed, or knowing which valve or valves are not sealed, and by verifying that all valves are sealed before beginning a test, results in a significant time savings, and more reliable test results. The use of an acoustic valve sensing system has the potential to significantly reduce the down time associated with the current testing approach. The use of such acoustic systems, however, is not currently being done as part of the pressure test.

Acoustic systems have been used for many years to determine whether or not a valve is "leaking" (i.e., not fully closed or sealed) in a variety of applications. In general, this approach requires a listening approach using a single acoustic sensor or stethoscope placed on the valve or nearby piping. In addition, acoustic systems have been used for many years to find leaks in pipes and to locate those leaks in pipes using listening methods or cross correlation methods. One company uses a coherence function method, because it identifies the frequency bands with the maximum signal-to-noise ratio (SNR), single propagation modes, and propagation velocity. However, acoustic measurement systems for verifying valve closure have not been used or integrated together with a constant-pressure volumetric leak detection system when testing a BOP System for integrity, where a volumetric system can be used to quantify the flow rate across an incompletely seal valve.

SUMMARY OF THE INVENTION

It is the object of this invention to provide a method and apparatuses for testing the BOP system on a drilling rig for integrity.

It is the object of this invention to provide a method and apparatuses for testing the BOP system on a drilling rig for integrity with a method and apparatuses for verifying that the valves are completely closed when testing the BOP system or when isolating that portion of the BOP system being tested for integrity.

It is the object of this invention to provide a method and apparatuses for pressure testing the BOP system on a drilling rig for integrity.

It is the object of this invention to provide a method and apparatuses for volumetrically testing the BOP system on a drilling rig for integrity.

It is the object of this invention to provide a method and apparatuses for verifying that the valves closed to isolate and pressurize that portion of the BOP system being integrity tested are completely closed.

It is the object of this invention to provide a method and apparatuses for verifying that the valves closed to isolate and pressurize that portion of the BOP system being integrity tested are completely closed, and if not, to determine which valve or valves are not completely closed.

It is the object of this invention to provide a method and apparatuses for verifying that the valves closed to isolate and pressurize that portion of the BOP system being integrity tested are completely closed, and if not, to determine the flow rate from the valve or valves that are not completely closed.

The preferred embodiment of the present invention is comprised of (1) a pressure testing system to test the BOP system or portions of the BOP system for integrity and (2) an acoustic valve measurement system to determine whether or not each valve that is closed for the pressure test is actually completely closed. The pressure testing system is used to test the BOP system or portions of the BOP system for integrity after verifying with an acoustic measurement system that all of the valves closed to isolate and pressurize that portion of the BOP system being tested are completely closed, and if not, to identify which valves are not completely closed and need to be closed to perform a test. As an alternative embodiment, a constant-pressure, volumetric measurement system can be used in conjunction with the acoustic system to quantify the flow across a valve that is not closed and to verify that the flow rate is zero when the valve is believed to be closed. If the measured flow is due to an incompletely closed valve, then this flow will be decreased or eliminated as the valve is more completely closed. Because a constant-pressure volumetric system can detect smaller flows than an acoustic system, the use of the volumetric system with the acoustic system further reduces the number of false alarms due to incompletely closed valves over that of an acoustic system alone. The constant-pressure, volumetric system will also detect any residual flow not associated with an incompletely sealed valve, and as an alternative embodiment, a constant-pressure volumetric testing system can be used instead of a pressure testing system for testing a portion or all of the BOP system for leaks. In this test, the pressure is maintained at the test pressure and the volume changes, which would result in a pressure drop, are measured directly and can be converted to an equivalent pressure drop, if necessary.

The acoustic valve measurement system provides a method to allow the BOP system to be pressure tested (or volumetrically tested) more efficiently and may reduce the number of pressure tests into sub-configuration that is currently required to complete a test of the entire BOP system, because the potential of a failed pressure test due to one or more incompletely sealed valves can be identified and minimized or eliminated before a test is performed.

As illustrated for a simple pipe and valve configuration in FIG. 2, the preferred embodiment of the valve measurement system is comprised of two acoustic sensors mounted on the outside of the pipe with one sensor on either side of the valve. Acoustic sensors 1 and 2 are preferred, but acoustic sensors 3 and 2 will also work well. In addition, acoustic sensors 1 and 3, although they do not bracket the valve can also be used. As an alternative embodiment, the valve measurement system can be implemented with only one acoustic sensor positioned close enough to a valve that is not completely closed to detect any flow noise produced by that valve, but if flow noise from a valve is detected, it is not possible to say with certainty that it is the valve closest to the acoustic sensor that is not completely closed. With two or more acoustic sensors, where at least one acoustic sensor is located on either side of the valve, a definitive statement about the status of the valve that is bracketed by the acoustic sensors can be made, because the source of the valve flow signal can be "located" between the two sensors. In addition, the signal-to-noise ratio (SNR) of the two-valve acoustic system is significantly higher than a one-valve acoustic system. An accurate location estimate indicates that the bracketed valve is producing the valve flow signal. Once this bracketed valve is closed, another acoustic test will determine if other valves may also be incompletely closed. As another alternative embodiment, a third or fourth acoustic sensor can be mounted on the piping leading into the valve but at a known separation distance from each sensor bracketing the valve. The two acoustic sensors on each side of the valve (not bracketing the valve) can be used to detect a valve flow and to compute the velocity of the flow noise propagating through the piping, which leads to more accurate location of the valve between the two acoustic sensors bracketing the valve. They can also be used to determine from which direction a valve flow signal is coming from. To compute the propagation velocity requires that the distance between the acoustic sensors be known. The most reliable verification that a valve with bracketing acoustic sensors is completely sealed requires that the distance between two acoustic sensors bracketing the valve and from each sensor to the valve be known. However, such verification can also be accurately performed without knowing these distances.

The preferred embodiment detects any flow across the valve by computing the cross power spectrum when the BOP is pressurized and dividing this cross power spectrum by the cross power spectrum of the background noise that is obtained when the pressure across the valve is the same, generally at 0 psig, or when the valve is known to be completely closed as ascertained by another test like a volumetric test.

IN THE DRAWINGS

FIG. 1 illustrates a test configuration for a BOP System with numerous valves that need to be pressure tested to verify that they can be completely closed.

Figure 12:
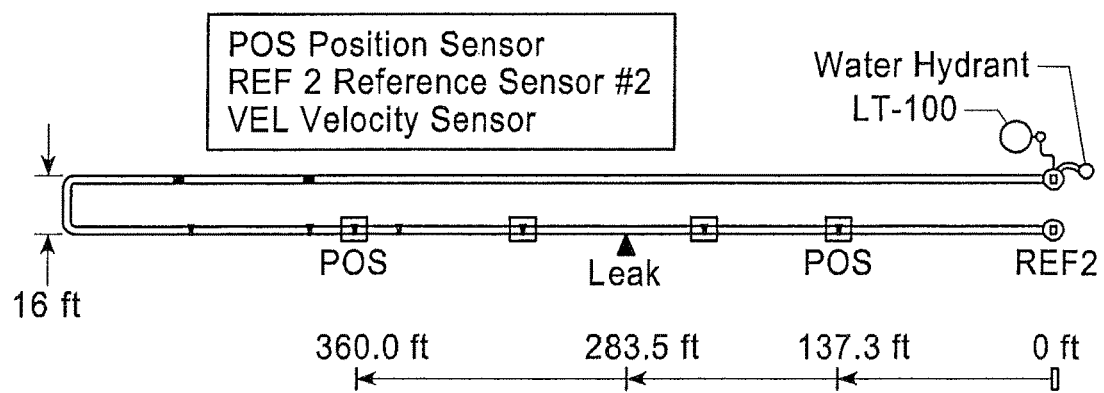

FIG. 12 illustrates the test configuration 2 on the test pipeline with acoustic sensors mounted to the line with epoxy. The distance between the reference and velocity sensors was 137.3 ft and the distance between the reference and the position sensors was 360.0 ft. The leak was 233.5 ft from the reference sensor.

FIG. 13 illustrates the output of the PALS given (1) the sensor configuration shown in FIG. 12, with REF2, VEL, position=POS=360.0 ft; (2) a leak of 1.9 gal/h at 70 psi, through a 0.01-in.-diameter hole in the pipeline; and (3) a distance of 360.0 ft between the two sensors bracketing the leak. The reference sensor was mounted on the blind flange at the top of the pipe.

Upper portion: Output showing the position of the leak and the velocity of the leak signal determined by the coherence function. The leak was located to within 0.4 ft of its actual position—less than 0.1% of the distance between the two sensors bracketing the leak. (The PALS measured the leak's position at 233.5 ft from the reference sensor; the actual position was 233.1 ft.) The estimate of the leak's position was determined from a measurement of the propagation velocity of the leak signal (1,409 m/s) made at the same time.

Lower portion: Output showing the position of the leak and the velocity of the leak signal as determined by the correlation function (using the frequency band determined by the coherence function). The leak was located to within 2.5 ft of its actual position-0.7% of the distance between the two sensors bracketing the leak. (The PALS measured the leak's position at 236 ft from the reference sensor; the actual position was 233.5 ft.) The leak's position was determined from a measured estimate of the propagation velocity of the leak signal (1,409 m/s) made with the coherence function.

Figure 14:
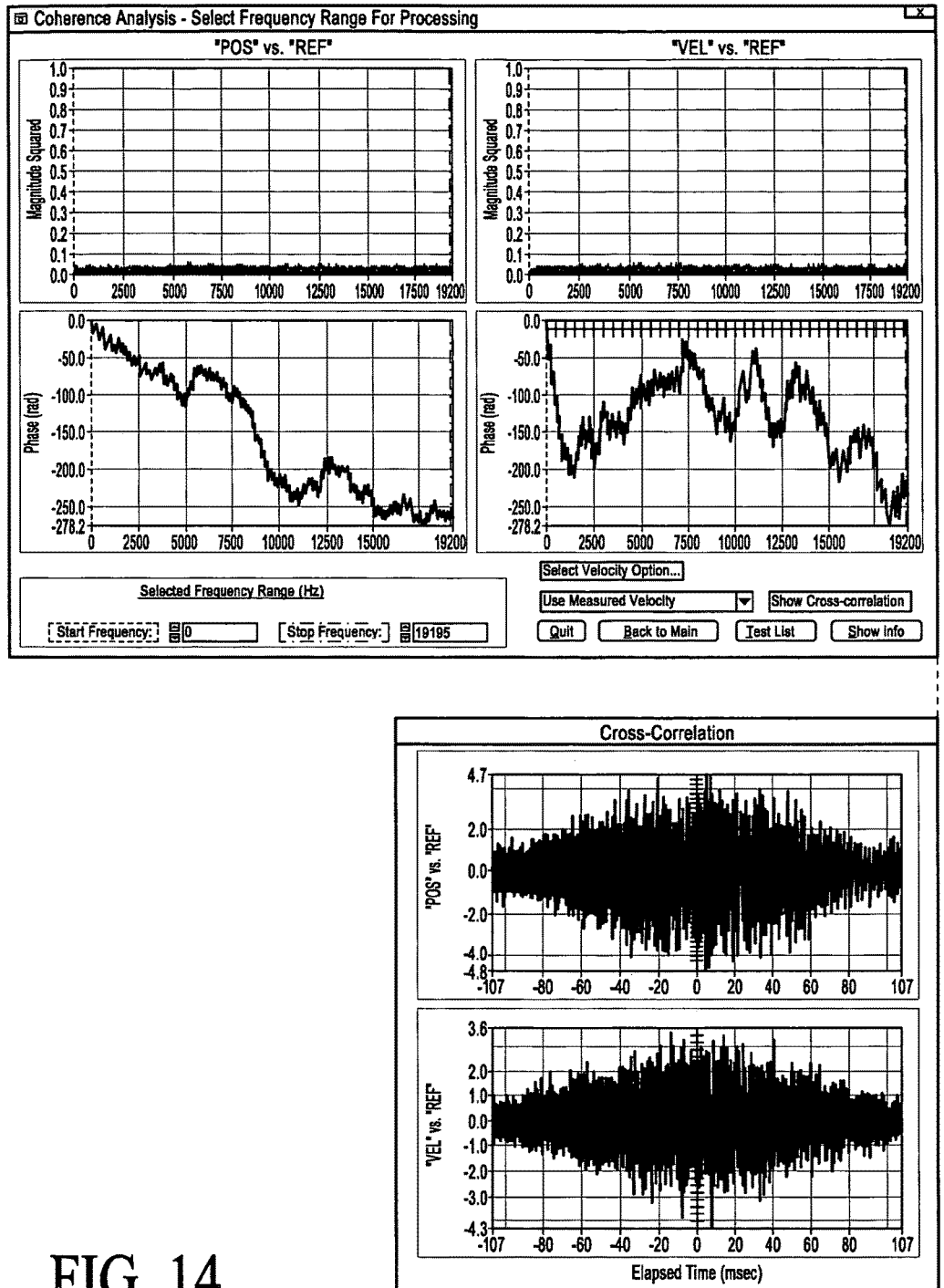

FIG. 14 illustrates the output of the PALS given the sensor configuration shown in FIG. 12 (REF2, VEL, Position=POS=360.0 ft) and a distance of 360.0 ft between the sensors that bracket the leak.

Upper Portion: The output of the coherence function over the frequency band from 0 to 19.2 kHz is typical of a test of background noise when no leak is present.

Lower Portion: The output of the correlation function over the frequency band from 0 to 19.2 kHz is typical of a test for background noise when no leak is present.

Figure 15:
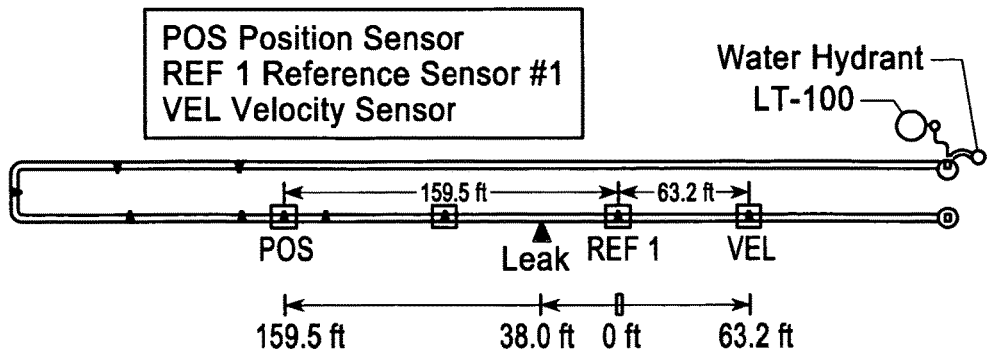

FIG. 15 illustrates the test configuration 1, with acoustic sensors mounted to the line with epoxy. The distance between the reference and velocity sensors was 63.2 ft and the distance between the reference and the position sensors was 159.5 ft. The leak was 33.0 ft from the reference sensor.

Figure 16:
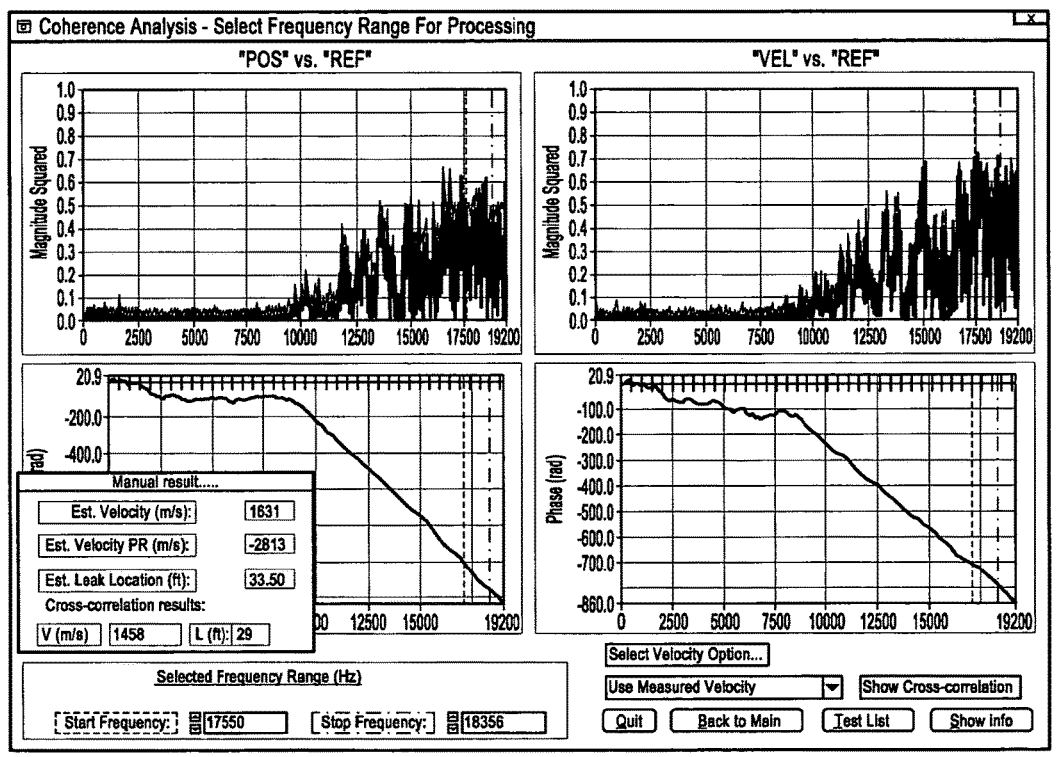

FIG. 16 illustrates the output of the PALS for the sensor configuration shown in FIG. 15 (Ref 1-Vel-Pos=159.5 ft) and a leak through a 0.01-in.-diameter hole (1.9 gal/h) with the sensors bracketing the leak separated by 159.5 ft (Edison STPF on 8/15/00 at 15:29). The leak was located to within 0.5 ft (0.3% of the sensor separation distance) of its actual position. The actual position of the leak was 33.0 ft from the reference sensor, and the measured position was 33.5 ft from the reference sensor. The position estimate was determined using a measured estimate of the propagation velocity (1,631 m/s) made at the same time. The output shows the position and velocity determined by the coherence function.

Figure 17:
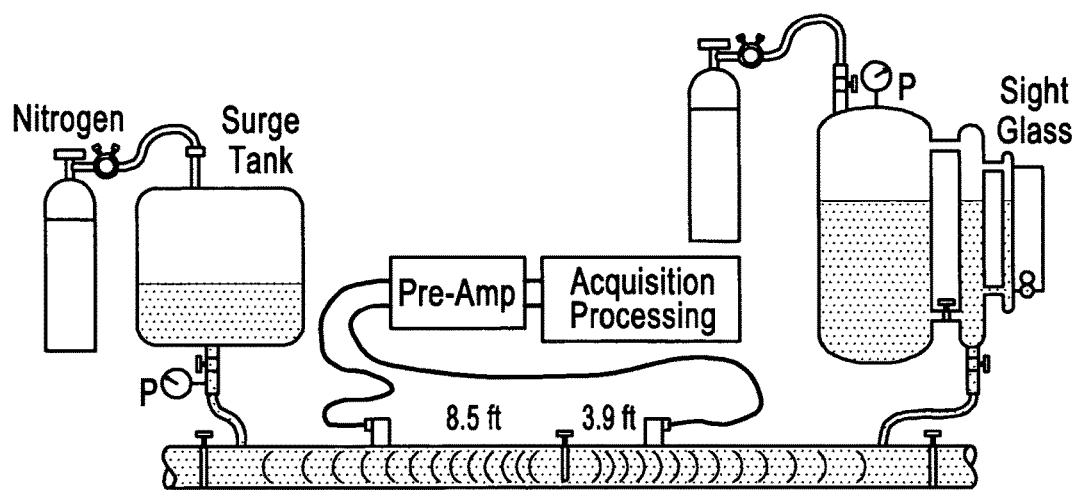

FIG. 17 illustrates a schematic of the 25-ft, 2-in.-diameter steel pipe section. The valve was located 12.5 ft from either end of the pipe. The far and near sensors were mounted at 8.5 ft and 3.4 ft respectively from the valve.

Figure 18:
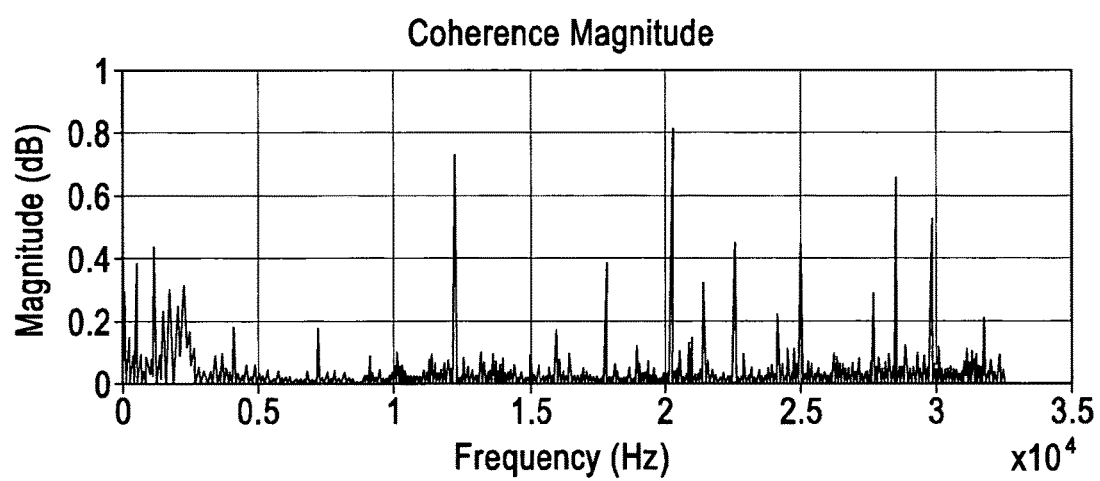

FIG. 18 illustrates the coherence function (magnitude squared) developed from a 2-min test with no valve leak (valve cracked but no pressure difference across the valve) for the sensor configuration shown in FIG. 17.

Figure 19:
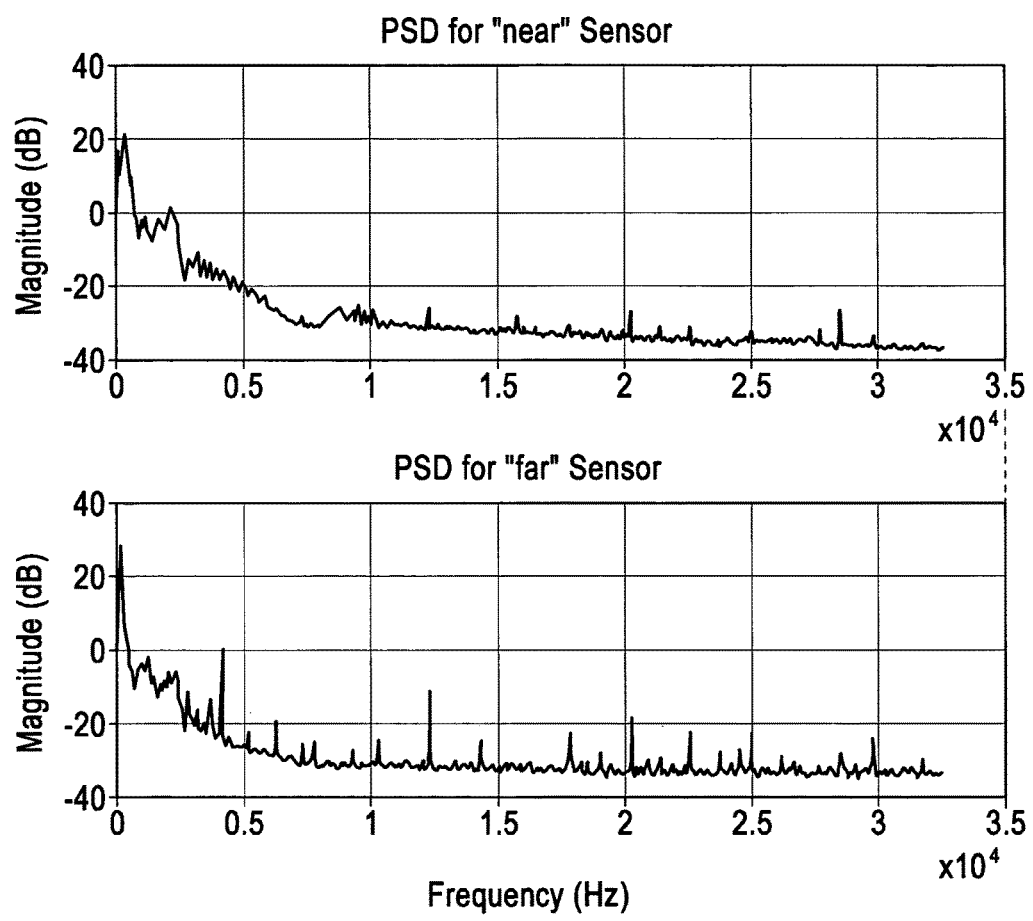

FIG. 19 illustrates the power spectra developed from a 2-min test with no valve leak (valve cracked but no pressure difference across the valve) for the sensor configuration shown in FIG. 17.

Figure 20:
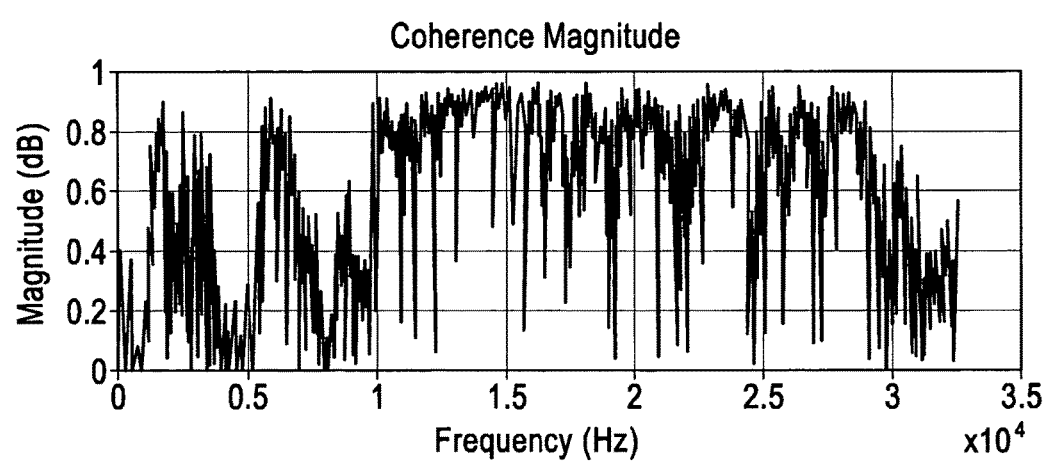

FIG. 20 illustrates the coherence function developed from a 2-min test with a valve leak of 0.16 gal/h for the sensor configuration shown in FIG. 17.

Figure 21:
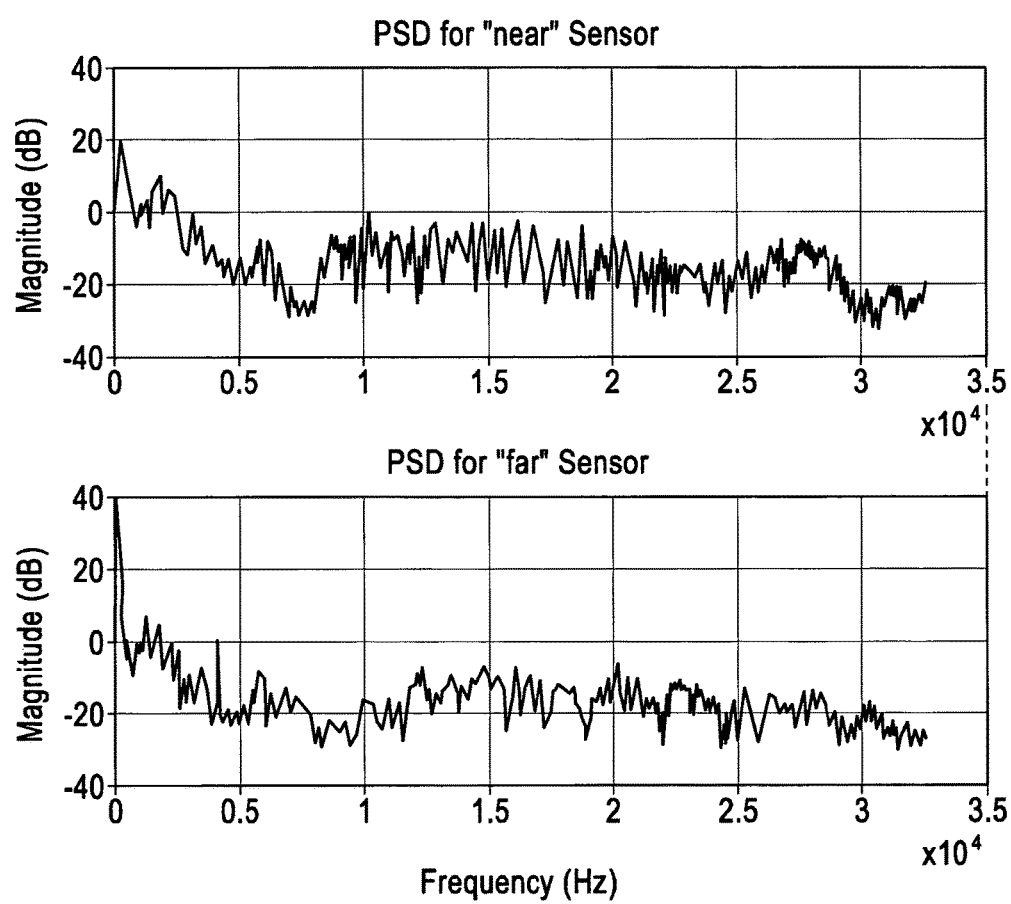

FIG. 21 illustrates the power spectra developed from a 2-min test with a valve leak of 0.16 gal/h for each of the acoustic sensors shown in FIG. 17.

Figure 22:
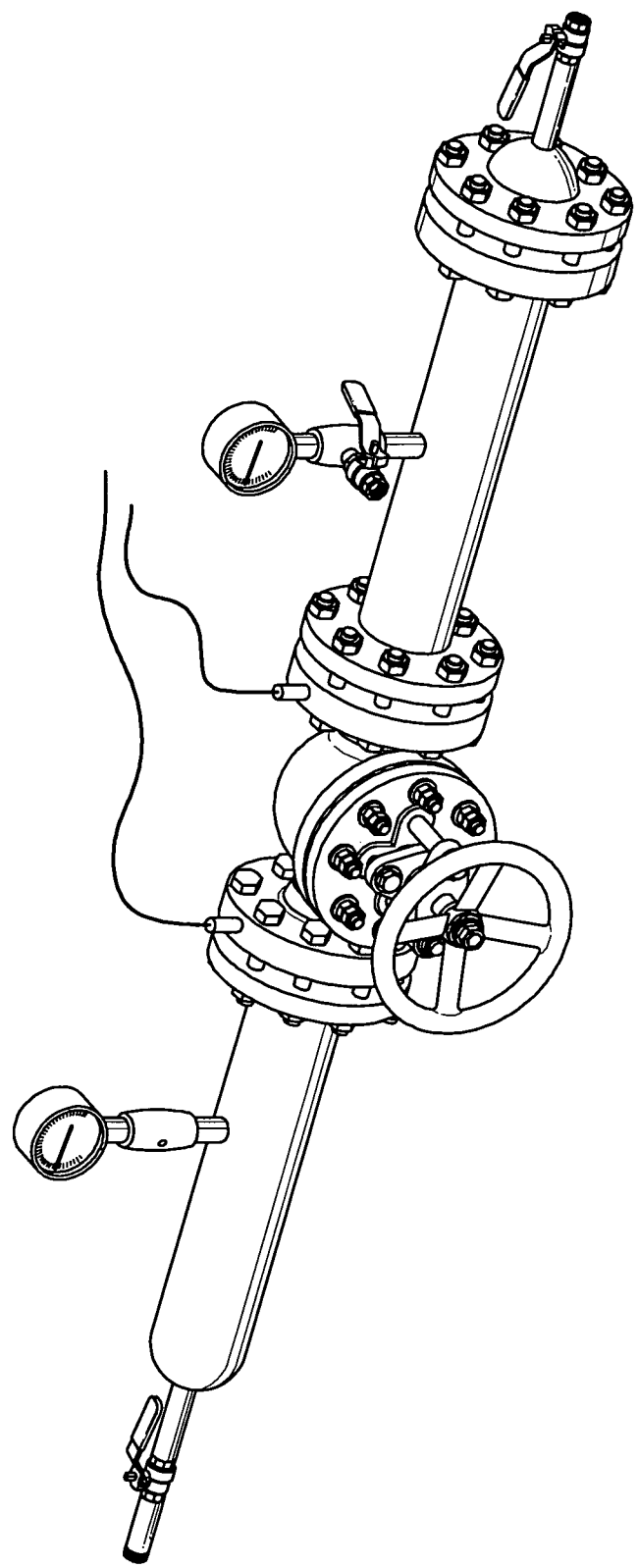

FIG. 22 illustrates the valve flow measurement laboratory test configuration to illustrate the preferred methods of analysis to detect flow across the valve in the center of the pipe. As illustrated two of the acoustic sensors are mounted on the valve flange and one is on the left side of the pipe.

Figure 23:
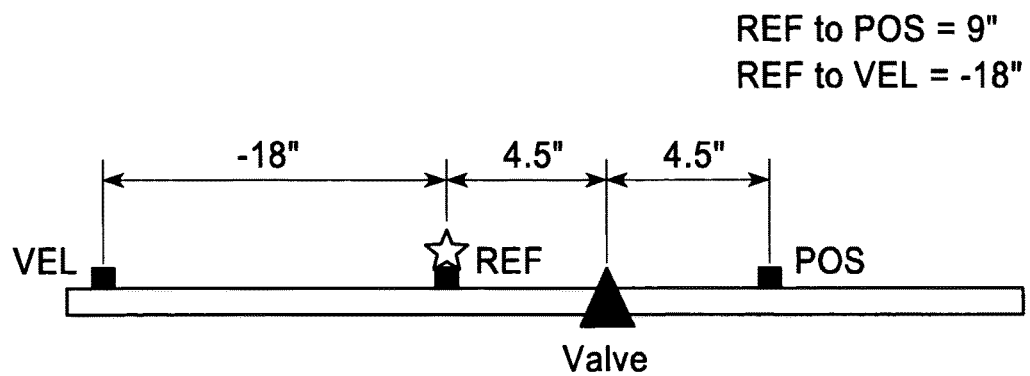

FIG. 23 illustrates the valve flow measurement laboratory test configuration to illustrate the preferred methods of analysis with two of a number of acoustic sensor locations used in the analyses. The POS acoustic sensor is 0.375 ft (4.5 in.) from the valve and the REF acoustic sensor is located on the opposite of the valve at a distance of 0.375 ft (4.5 in.) from the valve. A third acoustic sensor, the VEL sensor is located on the same side of the valve as the REF sensor and 1.5 ft (18 in.) away from the REF sensor. The REF sensor is 0.75 ft (9 in.) away from the POS sensor. This configuration was used in the analyses illustrated in FIGS. 24 through 55.

Figure 24:
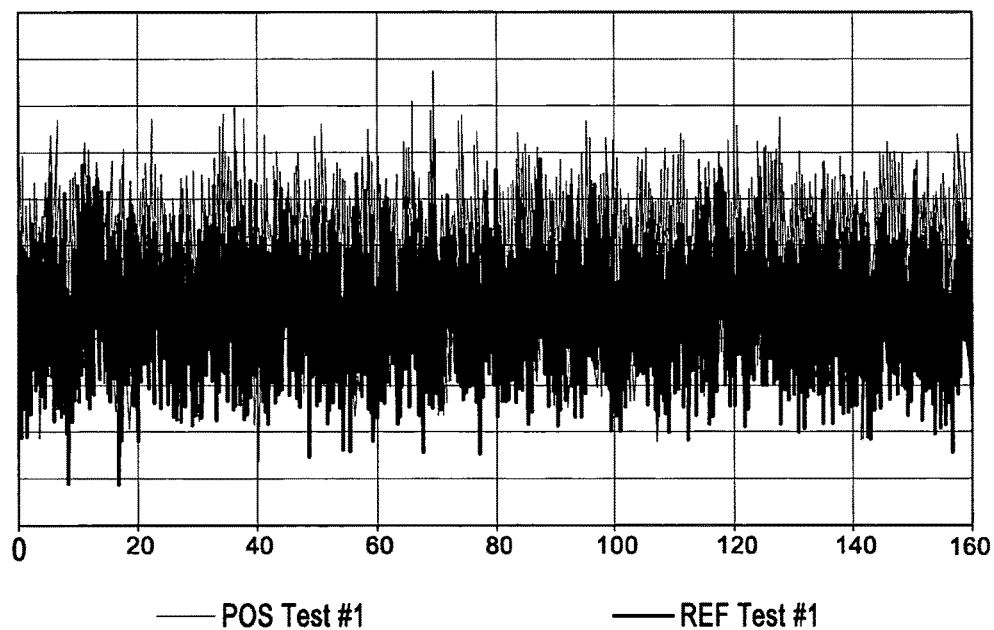

FIG. 24 illustrates the time series of the POS and the REF acoustic sensors when the valve is partially closed but the pressure on both sides of the valve is 0 psig. Only background noise is observed. The results would be the same if the valve were totally opened, totally closed, or at the same pressure on both sides of the valve.

Figure 25:
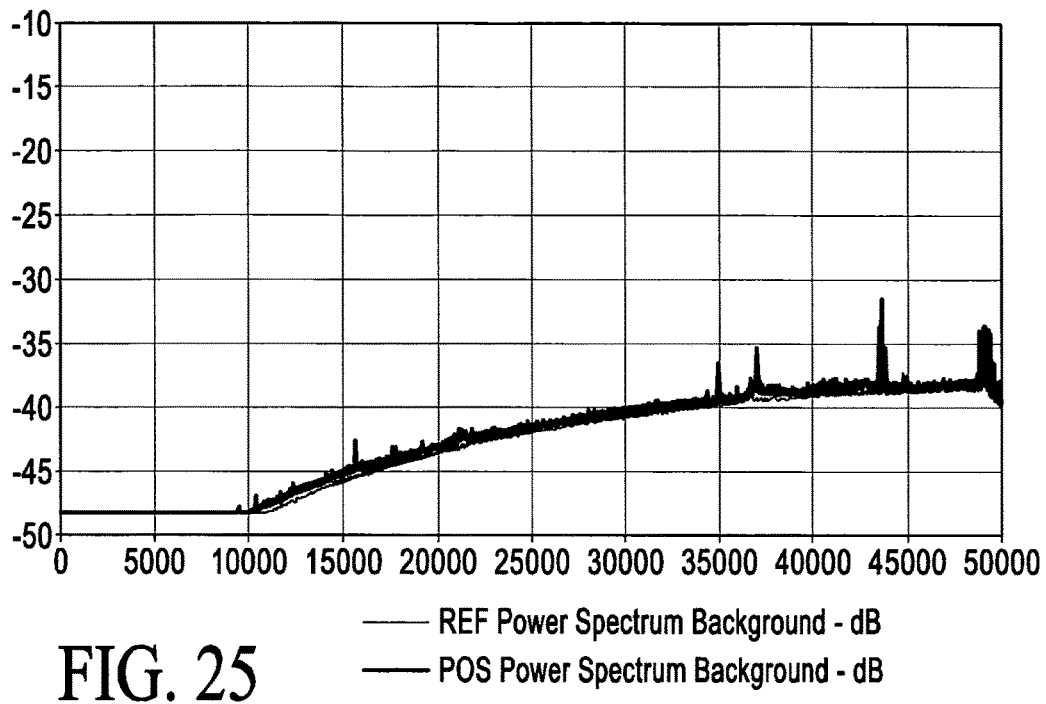

FIG. 25 illustrates the PSDs of the POS and the REF acoustic sensors for the time series in FIG. 24 when the valve is partially closed but the pressure on both sides of the valve is 0 psig. Only background noise is observed. The results would be the same if the valve were totally opened, totally closed, or at the same pressure on both sides of the valve.

Figure 26:
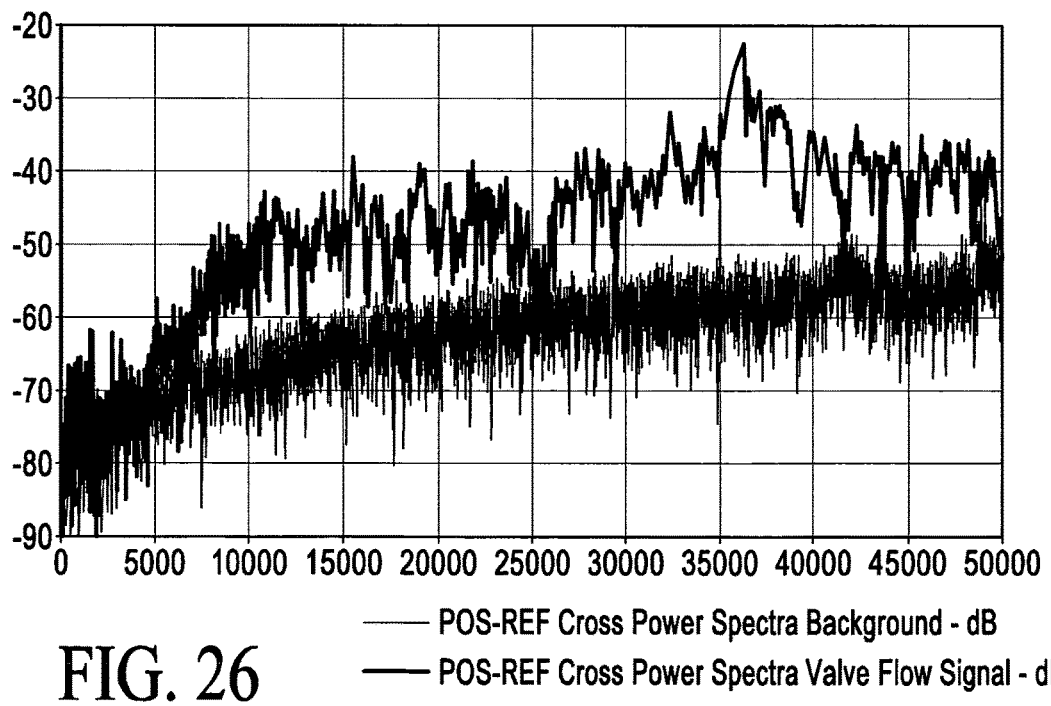

FIG. 26 illustrates the cross PSD of the POS and REF acoustic sensors that were computed from the time series of the acoustic sensors when the valve is partially closed but the pressure on both sides of the valve is 0 psig. Only background noise is observed. The results would be the same if the valve were totally opened, totally closed, or at the same pressure on both sides of the valve.

Figure 27:
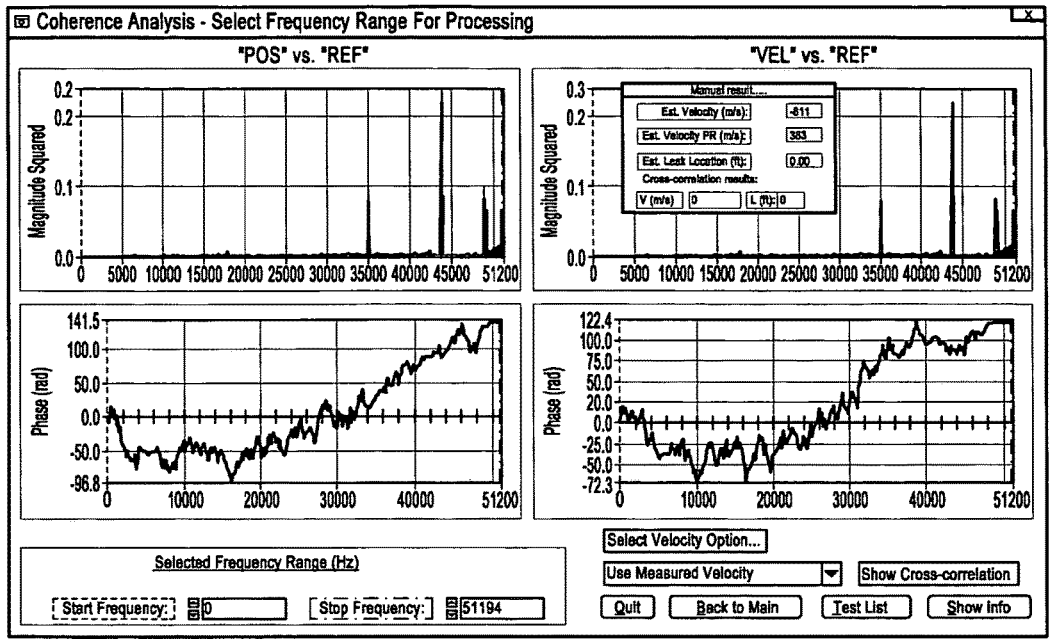

FIG. 27 illustrates the output of the coherence function for the background time series in FIG. 24.

Figure 28:
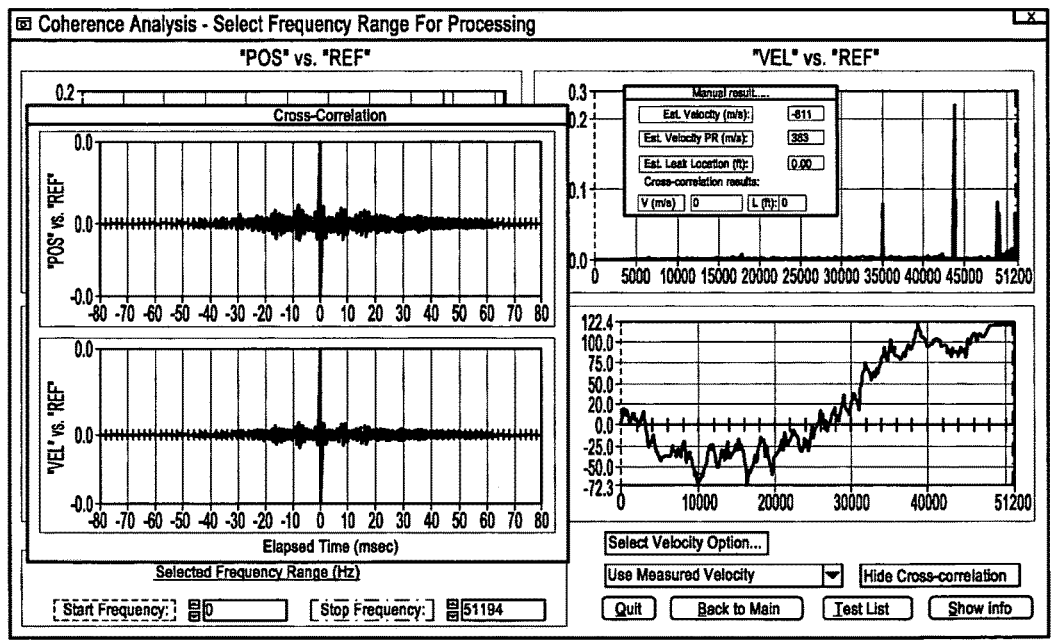

FIG. 28 illustrates the output of the cross correlation function for the background time series in FIG. 24 without bandpassing and with bandpassing.

Figure 29:
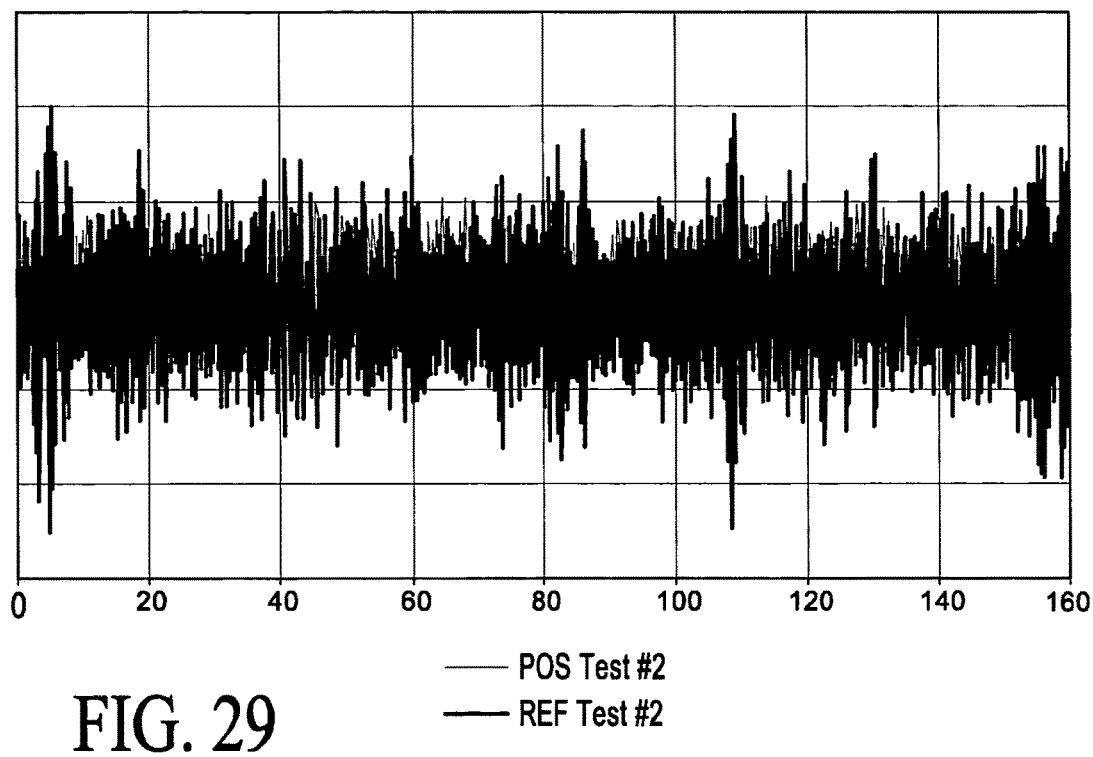

FIG. 29 illustrates the time series of the POS and the REF acoustic sensors when the valve is partially closed but the pressure on one side of the valve is at 100 psig and the pressure on the opposite side of the valve is 0 psig. The presence of the valve flow signal is observed and is obviously different than the response when the pressure is zero on both sides of the valve.

Figure 30:
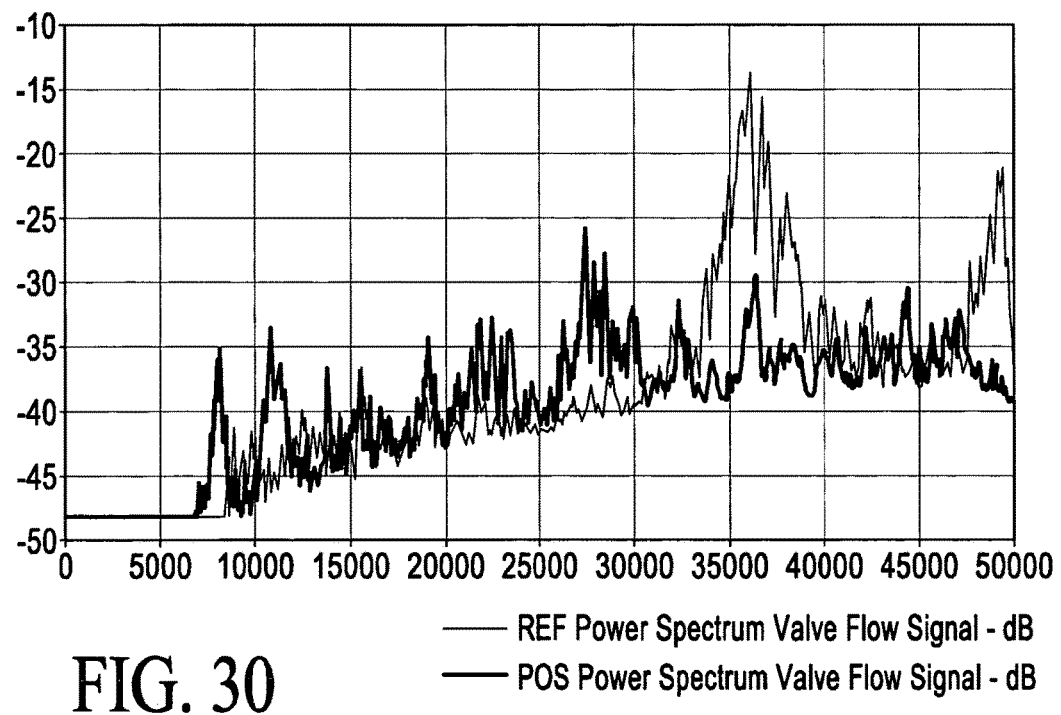

FIG. 30 illustrates the PSDs of the POS and the REF acoustic sensors for the time series in FIG. 29 when the valve is partially closed but the pressure on one side of the valve is at 100 psig and the pressure on the opposite side of the valve is 0 psig. The presence of the valve flow signal is observed and is obviously different than the response when the pressure is zero on both sides of the valve.

FIG. 31 illustrates the PSDs of the POS and the REF acoustic sensors for the time series in FIG. 33 of the valve flow signal relative to the time series in FIG. 24 of the background noise.

Figure 32:
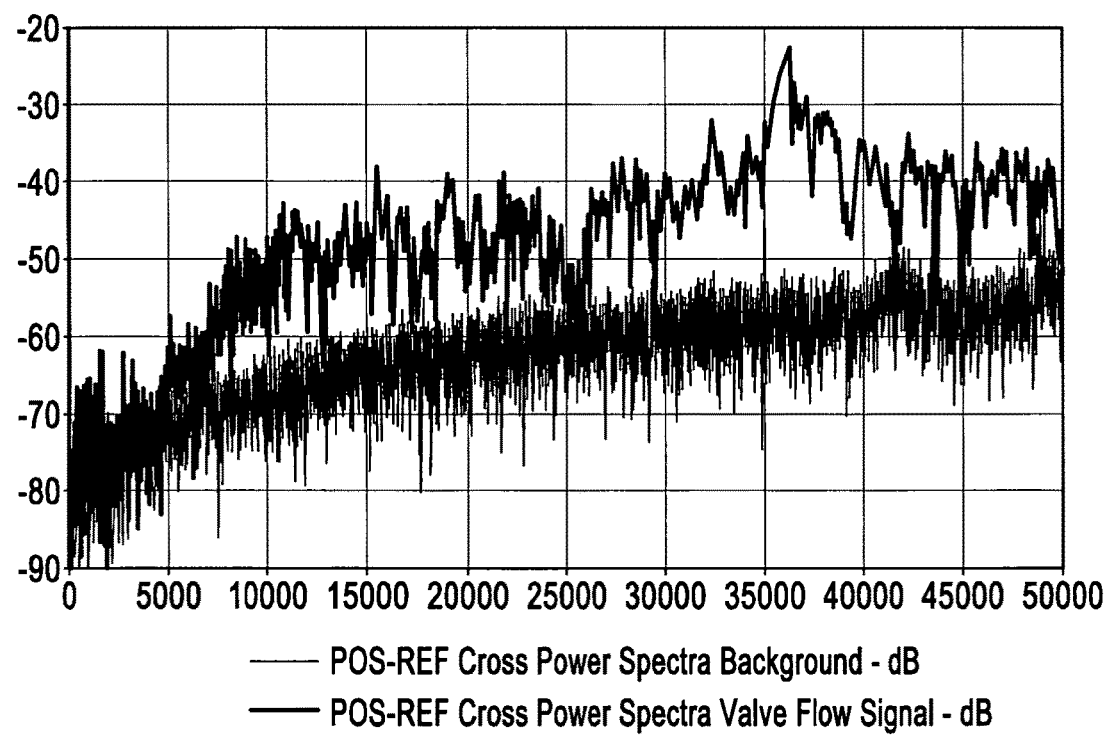

FIG. 32 illustrates the cross PSD of the POS and REF acoustic sensors that were computed from the time series of the acoustic sensors when the valve is partially closed but the pressure on one side of the valve is at 100 psig and the pressure on the opposite side of the valve is 0 psig. The presence of the valve flow signal is observed and is obviously different than the response when the pressure is zero on both sides of the valve.

FIG. 33 illustrates the output of the coherence function for a 5.3-gal/h leak with no generator for the time series in FIG. 29.

Figure 34:
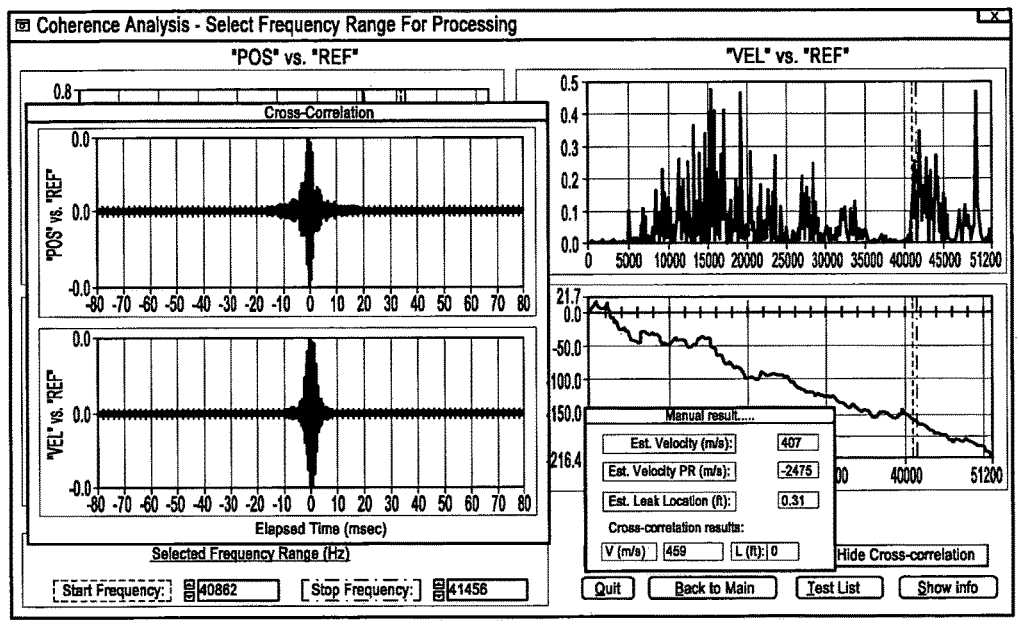

FIG. 34 illustrates the output of the cross correlation function for a 5.3-gal/h leak with no generator for the time series in FIG. 24 with bandpassing.

Figure 35:
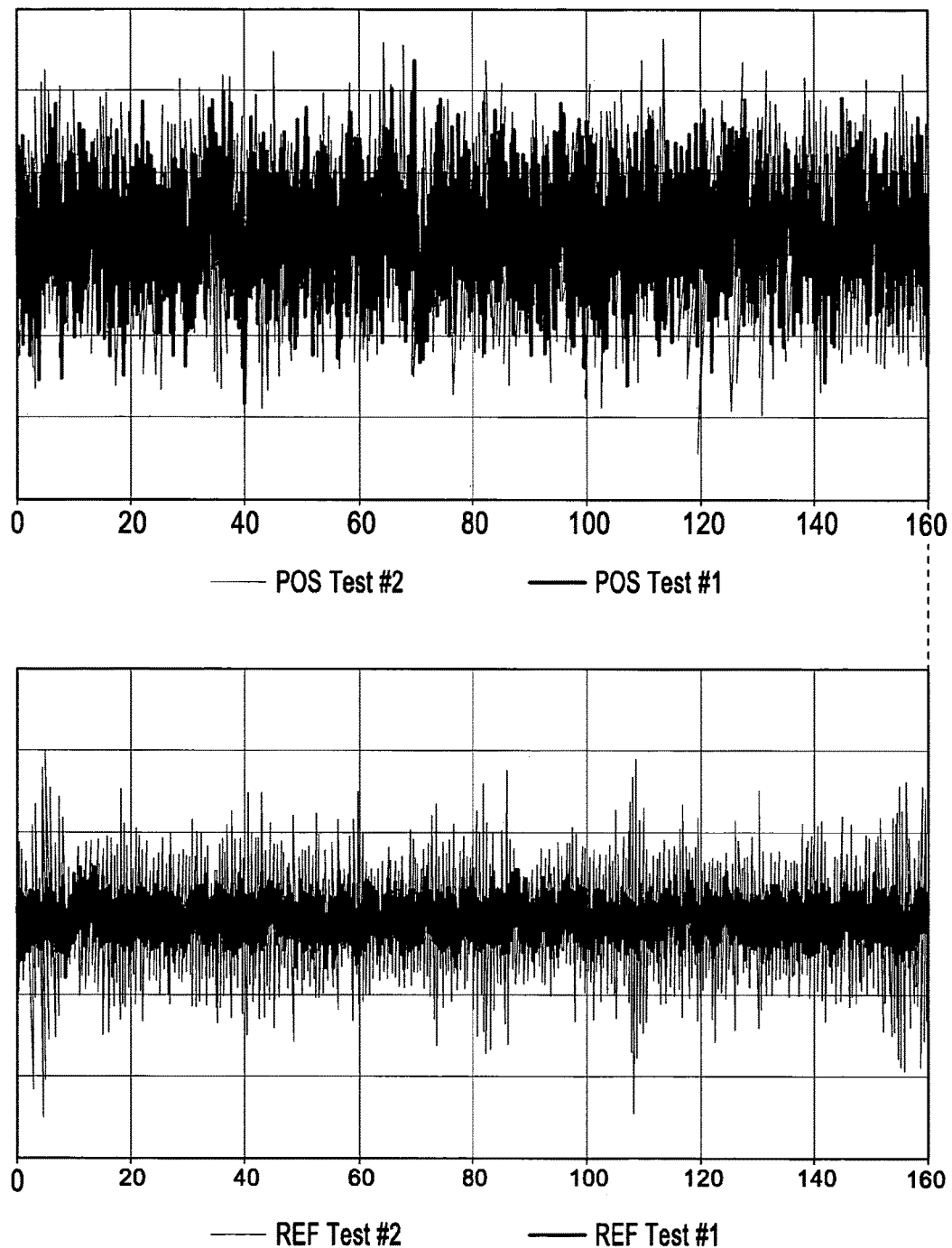

FIG. 35 illustrates the (a) time series of the POS acoustic sensor comparing the background noise in FIG. 24 and the valve flow signal in FIG. 29 and the (b) time series of the REF acoustic sensor comparing the background noise in FIG. 24 and the valve flow signal in FIG. 29.

Figure 36:
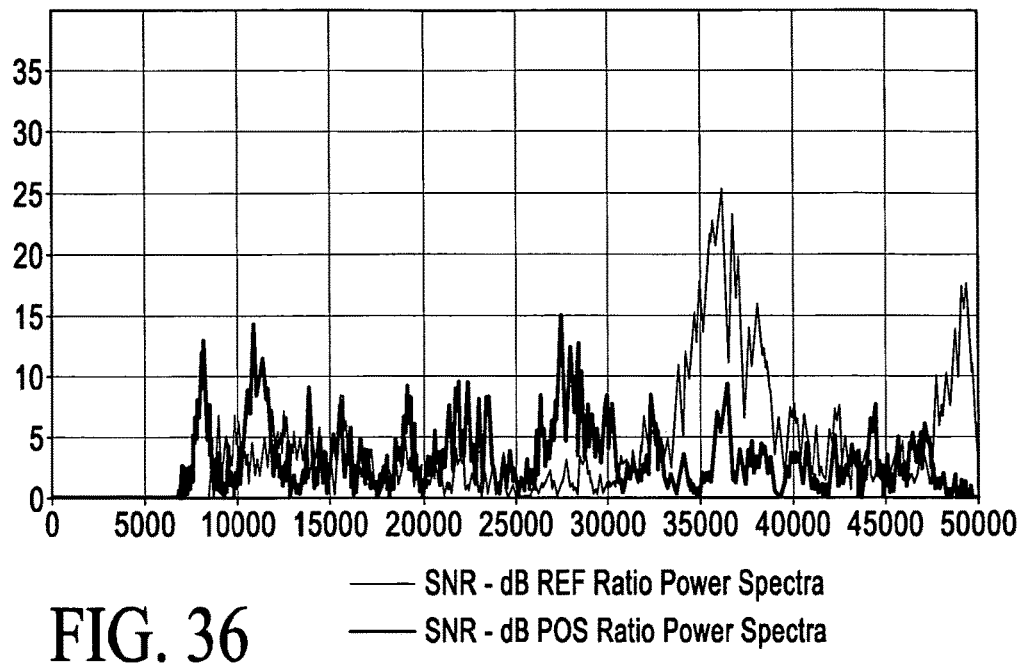

FIG. 36 illustrates the ratio or SNR of the PSDs of the POS and the REF acoustic sensors when the valve flow signal is present and when it is not.

Figure 37:
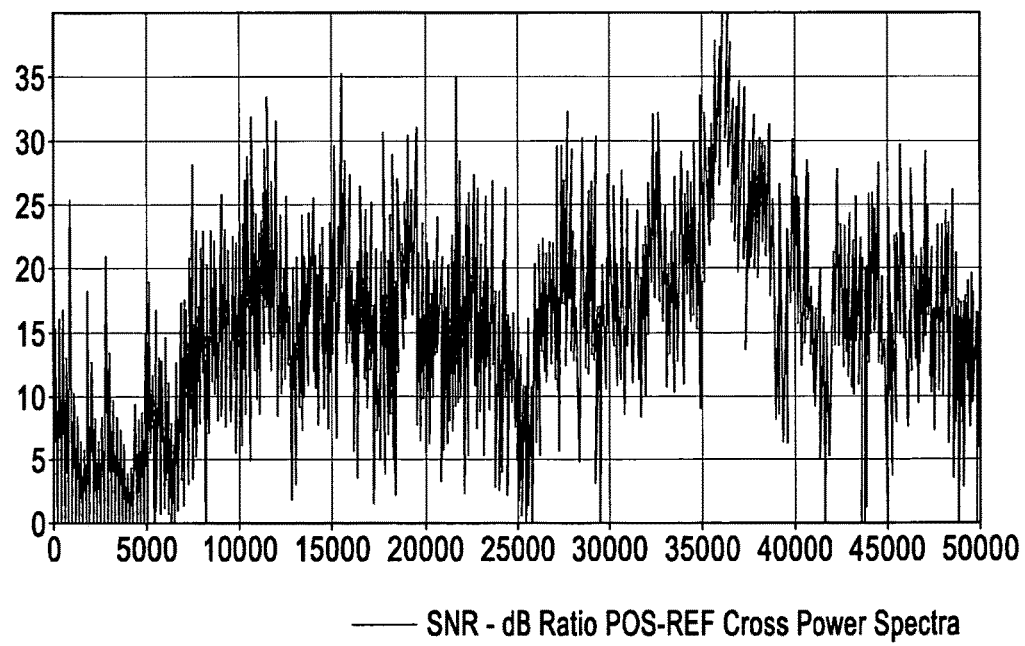

FIG. 37 illustrates the ratio or SNR of the cross PSD of the POS and REF acoustic sensors when the valve flow signal is present and when it is not.

Figure 38:
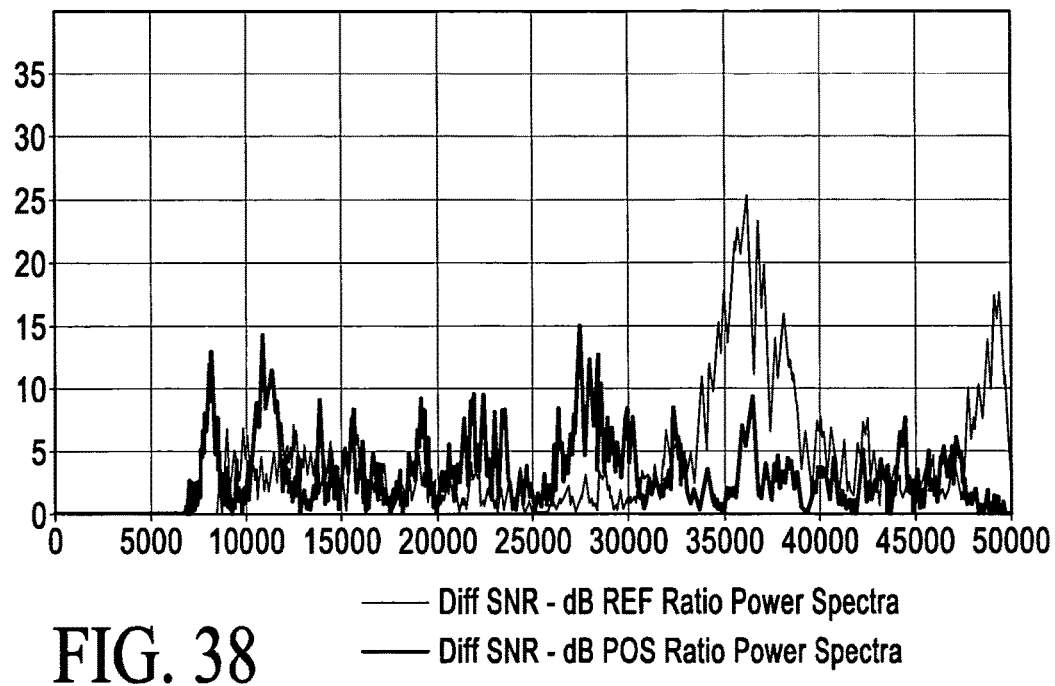

FIG. 38 illustrates the difference of the PSDs of the POS and the REF acoustic sensors when the valve flow signal is present and when it is not.

Figure 39:
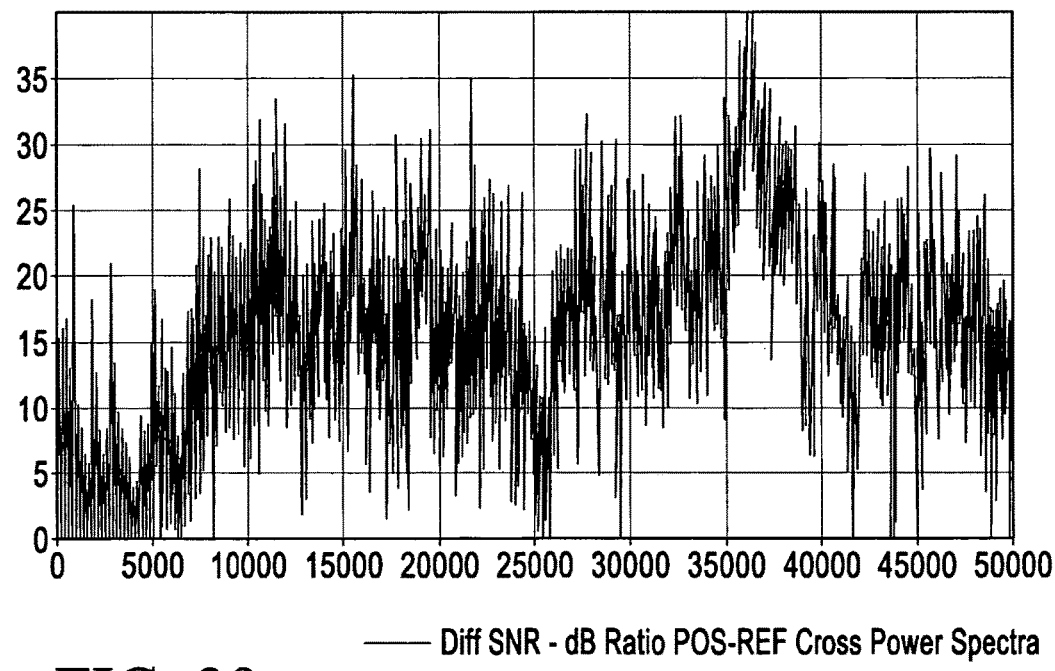

FIG. 39 illustrates the difference of the cross PSD of the POS and REF acoustic sensors when the valve flow signal is present and when it is not.

Figure 40:
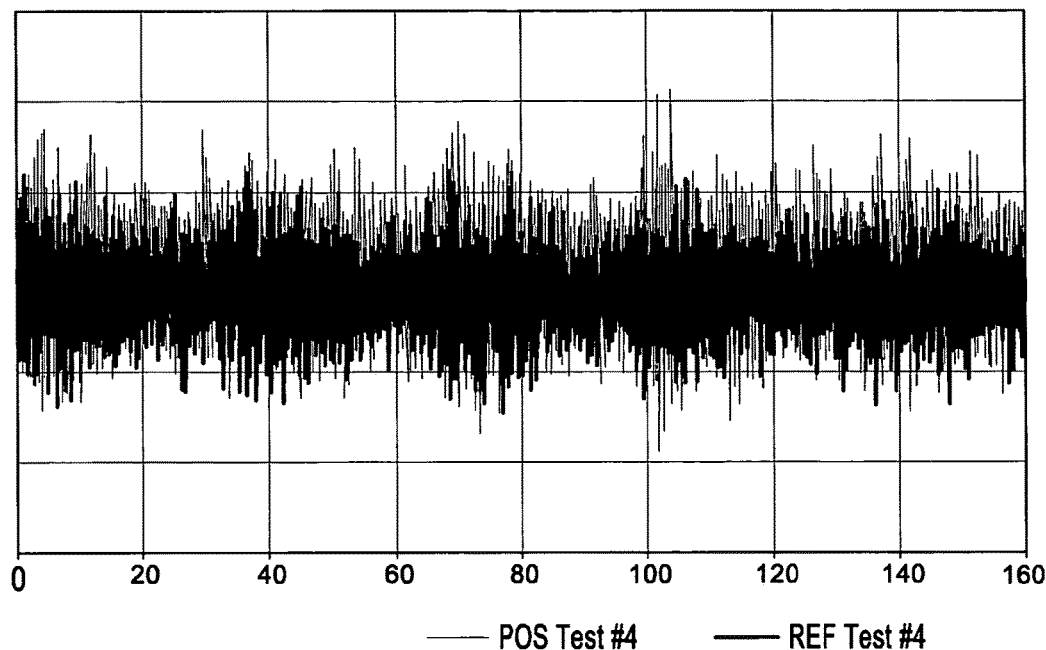

FIG. 40 illustrates the time series of the POS and the REF acoustic sensors in the presence of generator noise when the valve is partially closed but the pressure on both sides of the valve is 0 psig. Only background noise is observed. The results would be the same if the valve were totally opened, totally closed, or at the same pressure on both sides of the valve.

Figure 41:
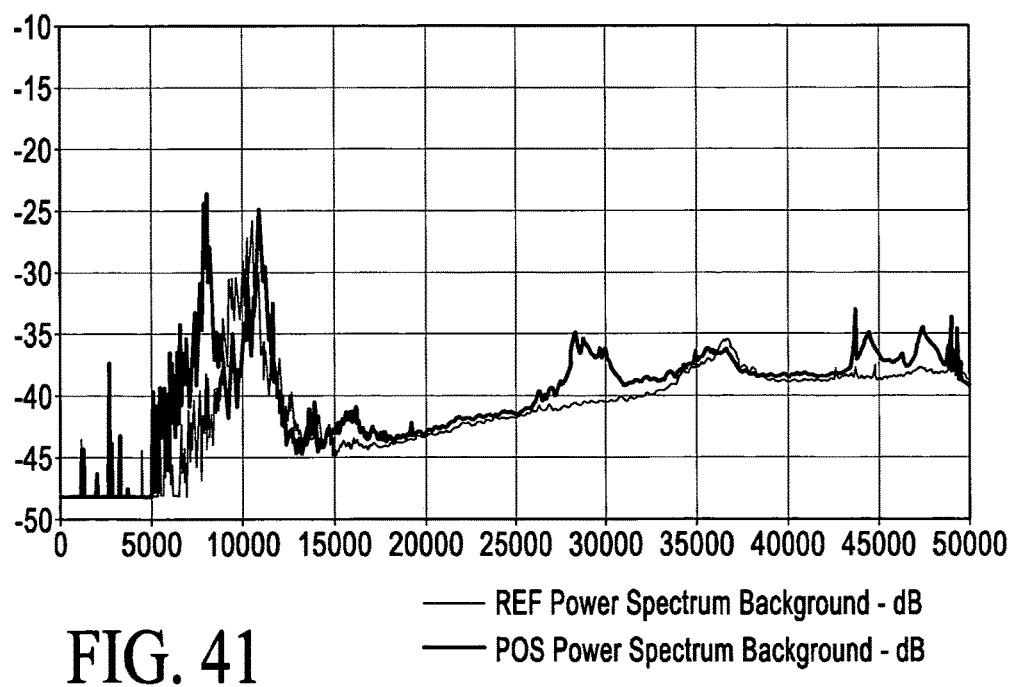

FIG. 41 illustrates the PSDs of the POS and the REF acoustic sensors in the presence of generator noise for the time series in FIG. 40 when the valve is partially closed but the pressure on both sides of the valve is 0 psig. Only background noise is observed. The results would be the same if the valve were totally opened, totally closed, or at the same pressure on both sides of the valve.

Figure 42:
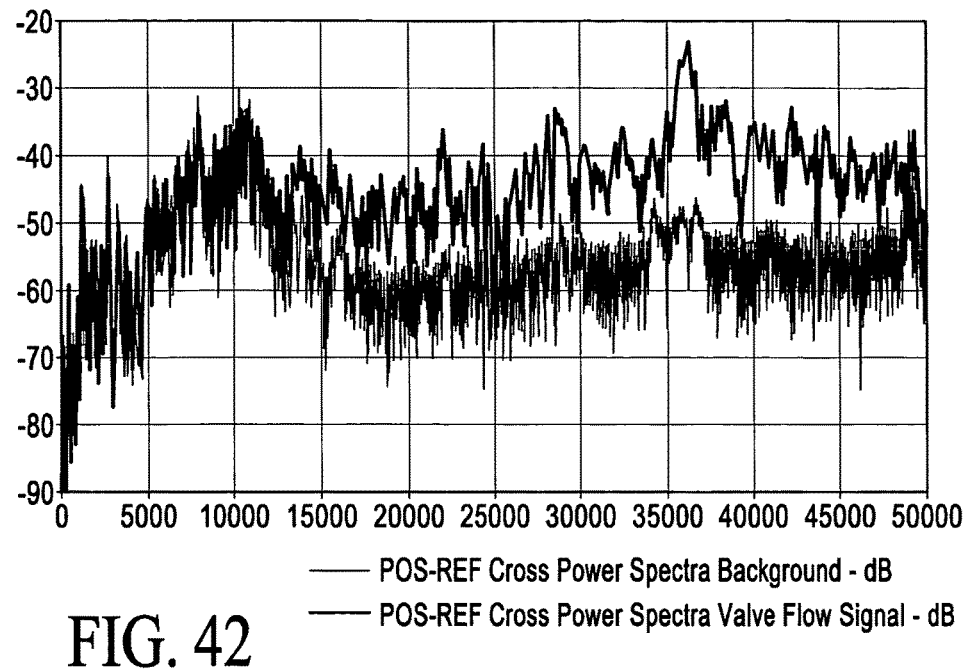

FIG. 42 illustrates the cross PSD of the POS and REF acoustic sensors in the presence of generator noise that were computed from the time series of the acoustic sensors when the valve is partially closed but the pressure on both sides of the valve is 0 psig. Only background noise is observed. The results would be the same if the valve were totally opened, totally closed, or at the same pressure on both sides of the valve.

Figure 43:
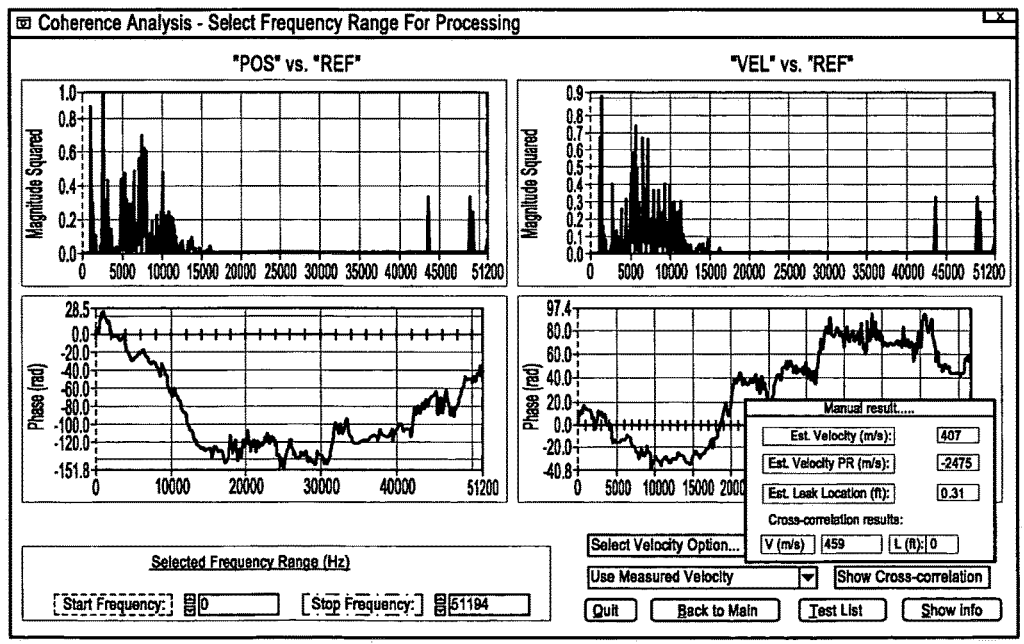

FIG. 43 illustrates the output of the coherence function for the background time series in the presence of generator noise in FIG. 40.

FIG. 44 illustrates the output of the cross correlation function for the background time series in the presence of generator noise in FIG. 40 with bandpassing.

FIG. 45 illustrates the time series of the POS and the REF acoustic sensors in the presence of generator noise when the valve is partially closed but the pressure on one side of the valve is at 100 psig and the pressure on the opposite side of the valve is 0 psig. The presence of the valve flow signal is observed and is obviously different than the response when the pressure is zero on both sides of the valve.

Figure 46:
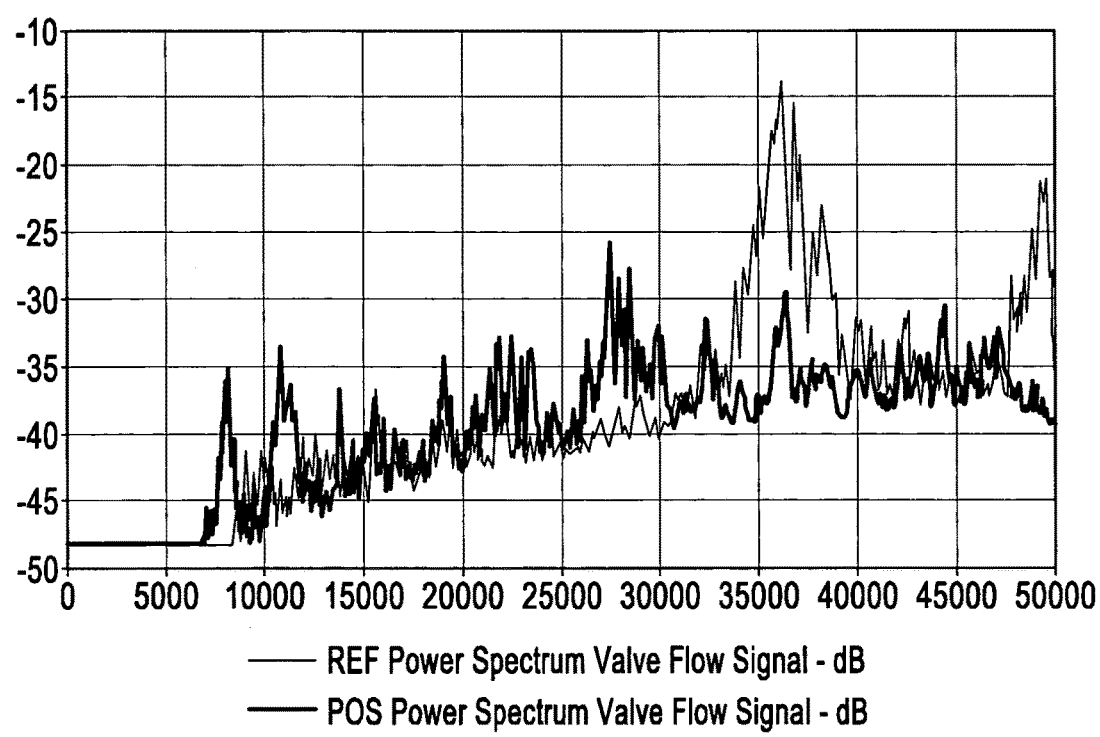

FIG. 46 illustrates the PSDs of the POS and the REF acoustic sensors in the presence of generator noise for the time series in FIG. 45 when the valve is partially closed but the pressure on one side of the valve is at 100 psig and the pressure on the opposite side of the valve is 0 psig. The presence of the valve flow signal is observed and is obviously different than the response when the pressure is zero on both sides of the valve.

FIG. 47 illustrates the PSDs of the POS and the REF acoustic sensors for the time series in FIG. 45 of the valve flow signal relative to the time series in FIG. 40 of the background noise.

Figure 48:
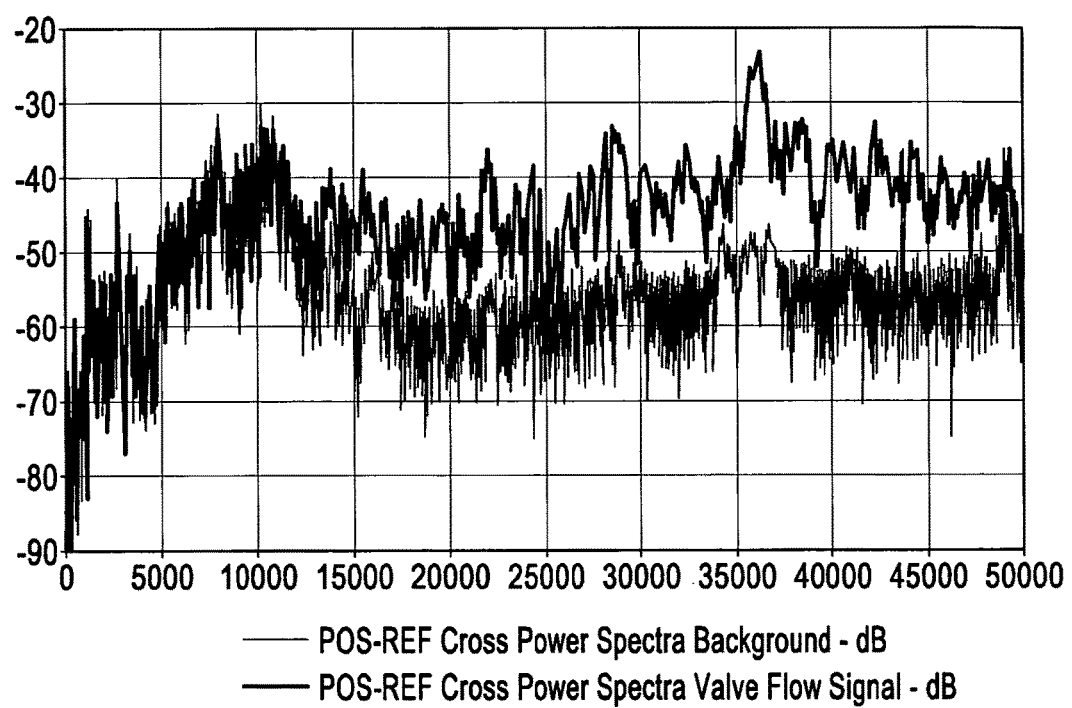

FIG. 48 illustrates the cross PSD of the POS and REF acoustic sensors in the presence of generator noise that were computed from the time series of the acoustic sensors when the valve is partially closed but the pressure on one side of the valve is at 100 psig and the pressure on the opposite side of the valve is 0 psig. The presence of the valve flow signal is observed and is obviously different than the response when the pressure is zero on both sides of the valve.

FIG. 49 illustrates the output of the coherence function for a leak rate of 4.05 gal/h in the presence of generator noise in the time series of FIG. 45.

Figure 50:
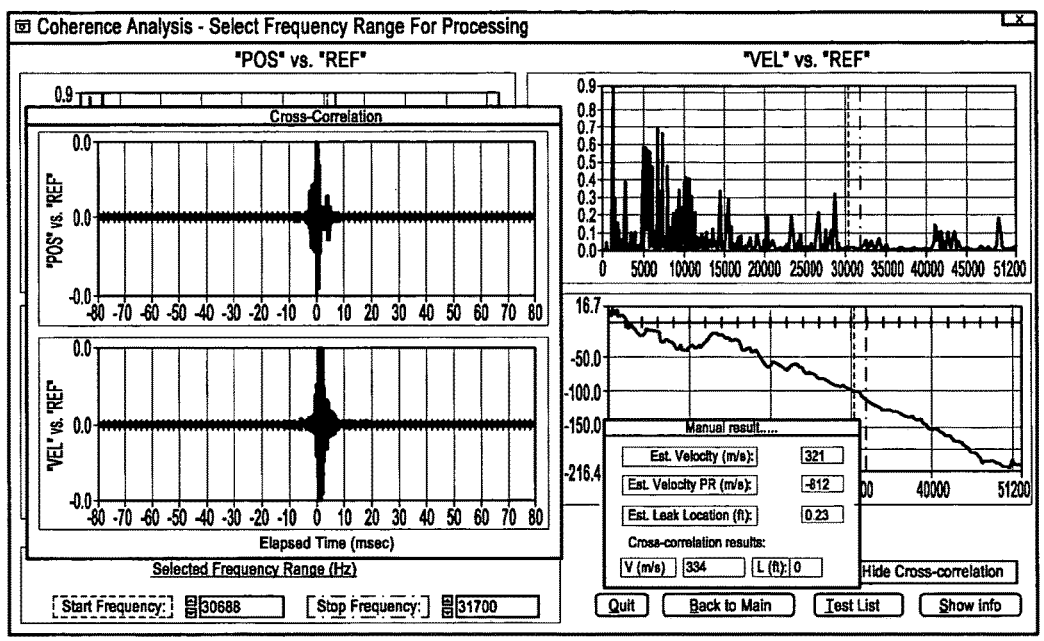

FIG. 50 illustrates the output of the cross correlation function for a leak rate of 4.05 gal/h in the presence of generator noise for the time series in FIG. 45 with bandpassing.

FIG. 51 illustrates the (a) time series of the POS acoustic sensor comparing the background noise in FIG. 40 and the valve flow signal in FIG. 45 and the (b) time series of the REF acoustic sensor comparing the background noise in FIG. 40 and the valve flow signal in FIG. 45.

Figure 52:
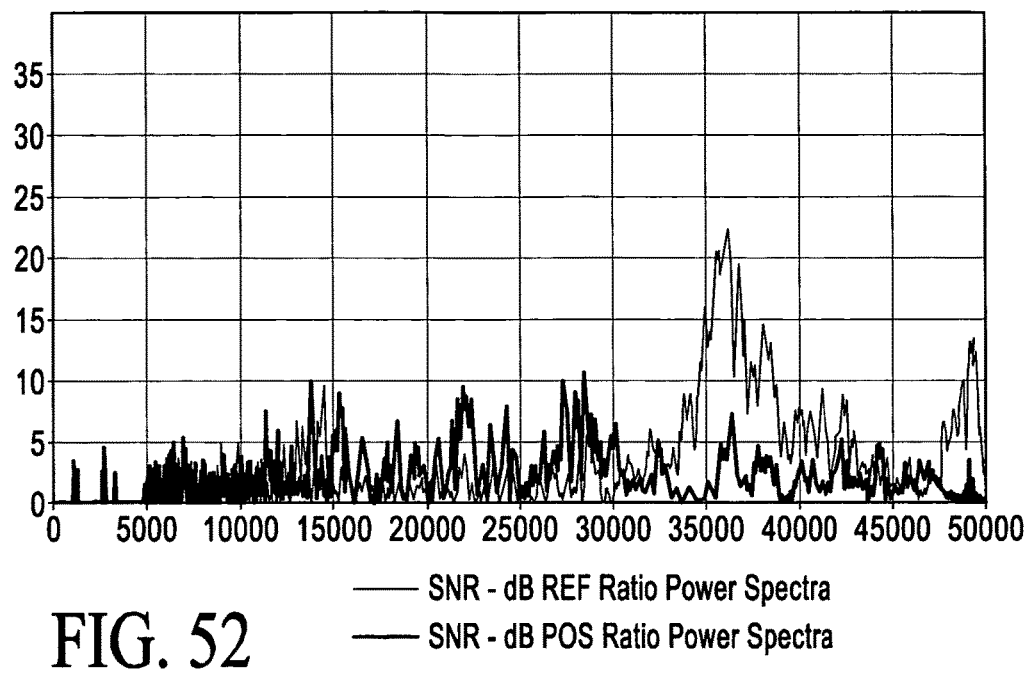

FIG. 52 illustrates the ratio or SNR of the PSDs of the POS and the REF acoustic sensors in the presence of generator noise when the valve flow signal is present and when it is not.

Figure 53:
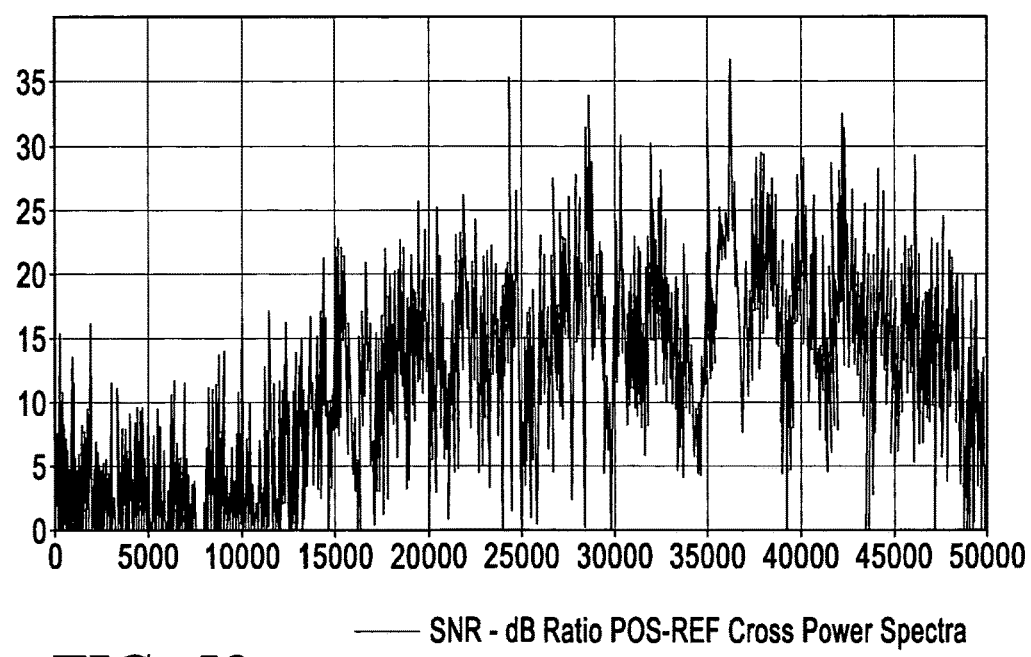

FIG. 53 illustrates the ratio or SNR of the cross PSD of the POS and REF acoustic sensors in the presence of generator noise when the valve flow signal is present and when it is not.

Figure 54:
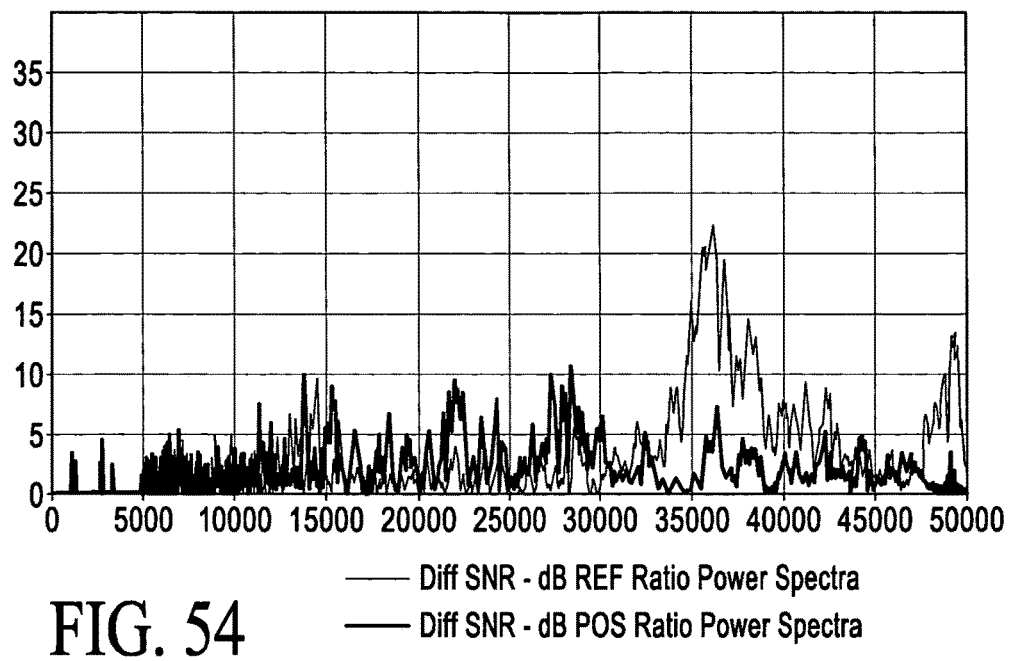

FIG. 54 illustrates the difference of the PSDs of the POS and the REF acoustic sensors in the presence of generator noise when the valve flow signal is present and when it is not.

Figure 55:
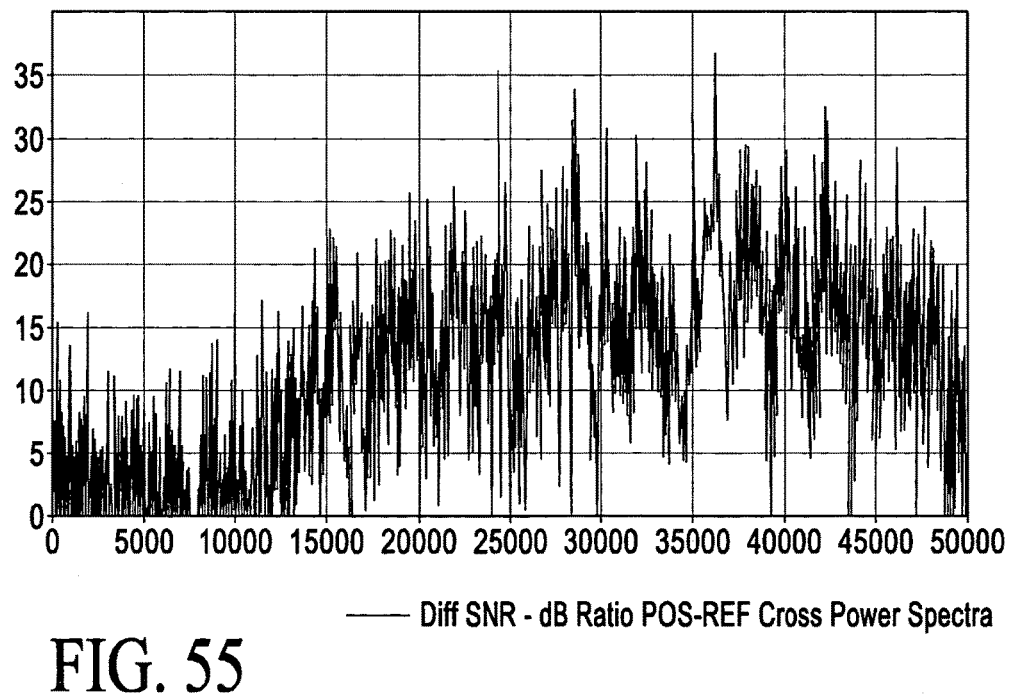

FIG. 55 illustrates the difference of the cross PSD of the POS and REF acoustic sensors in the presence of generator noise when the valve flow signal is present and when it is not.

Figure 56:
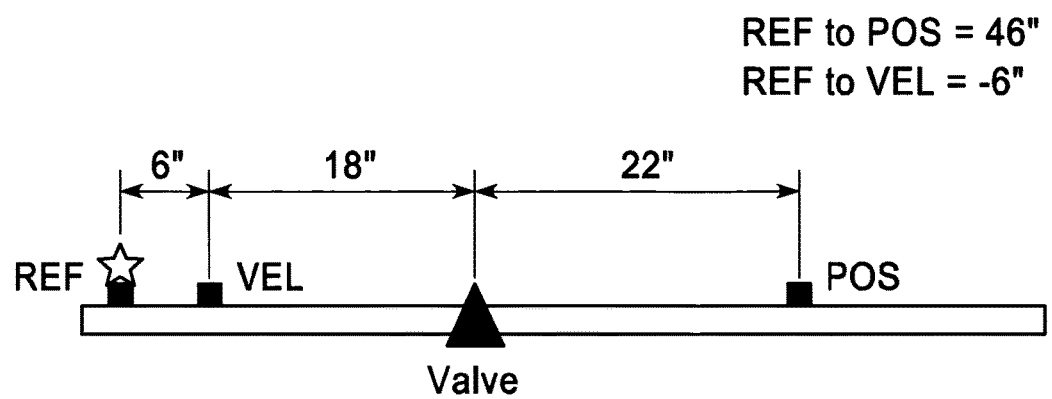

FIG. 56 illustrates another valve flow measurement laboratory test configuration used to illustrate the preferred methods of analysis. The POS acoustic sensor is 1.83 ft (22 in.) from the valve. The REF acoustic sensor is located on the opposite of the valve at a distance of 2.0 ft (24.0 in.) from the valve. A third acoustic sensor, the VEL sensor is located on the same side of the valve as the REF sensor and 0.5 ft (6 in.) away from the REF sensor and 1.5 ft (18 in. from the valve. The REF sensor is 3.33 ft (40 in.) away from the POS sensor. This configuration was used in the analyses illustrated in FIGS. 57 through 72 without the generator turned on.

Figure 57:
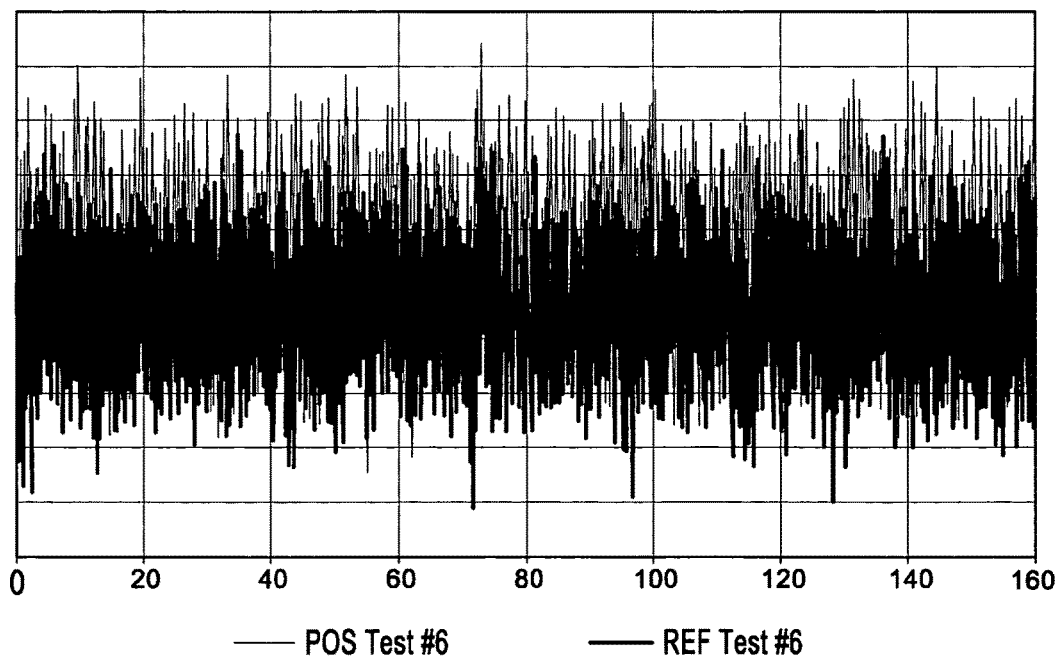

FIG. 57 illustrates the time series of the POS and the REF acoustic sensors when the valve is partially closed but the pressure on both sides of the valve is 0 psig. Only background noise is observed. The results would be the same if the valve were totally opened, totally closed, or at the same pressure on both sides of the valve.

Figure 58:
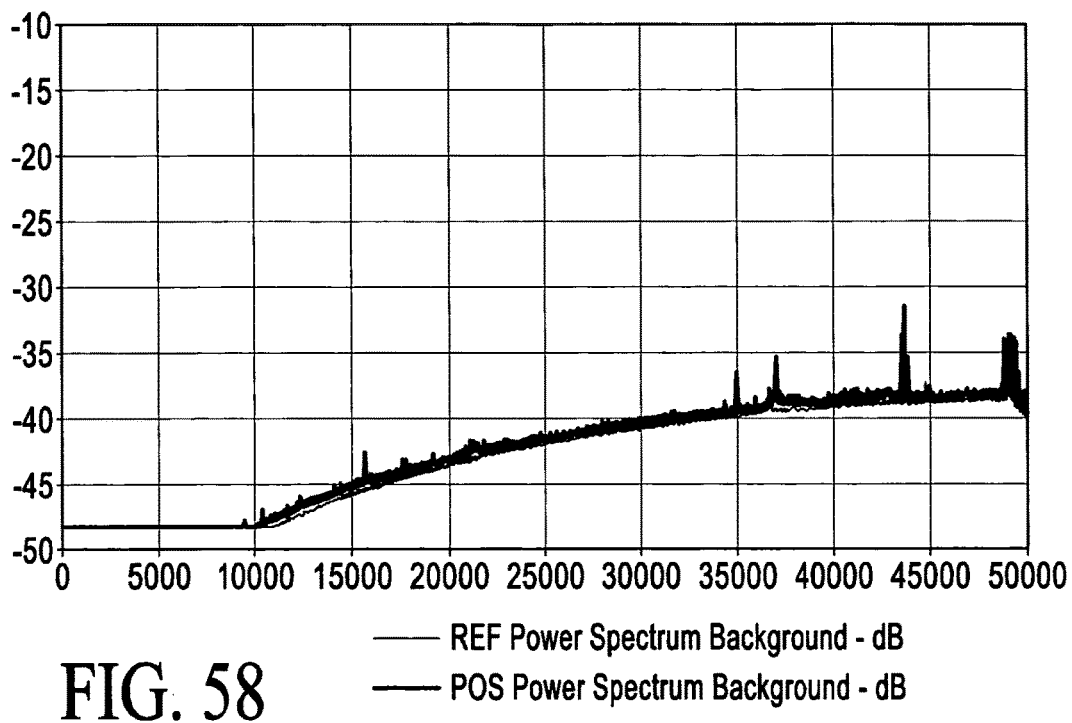

FIG. 58 illustrates the PSDs of the POS and the REF acoustic sensors for the time series in FIG. 57 when the valve is partially closed but the pressure on both sides of the valve is 0 psig. Only background noise is observed. The results would be the same if the valve were totally opened, totally closed, or at the same pressure on both sides of the valve.

Figure 59:
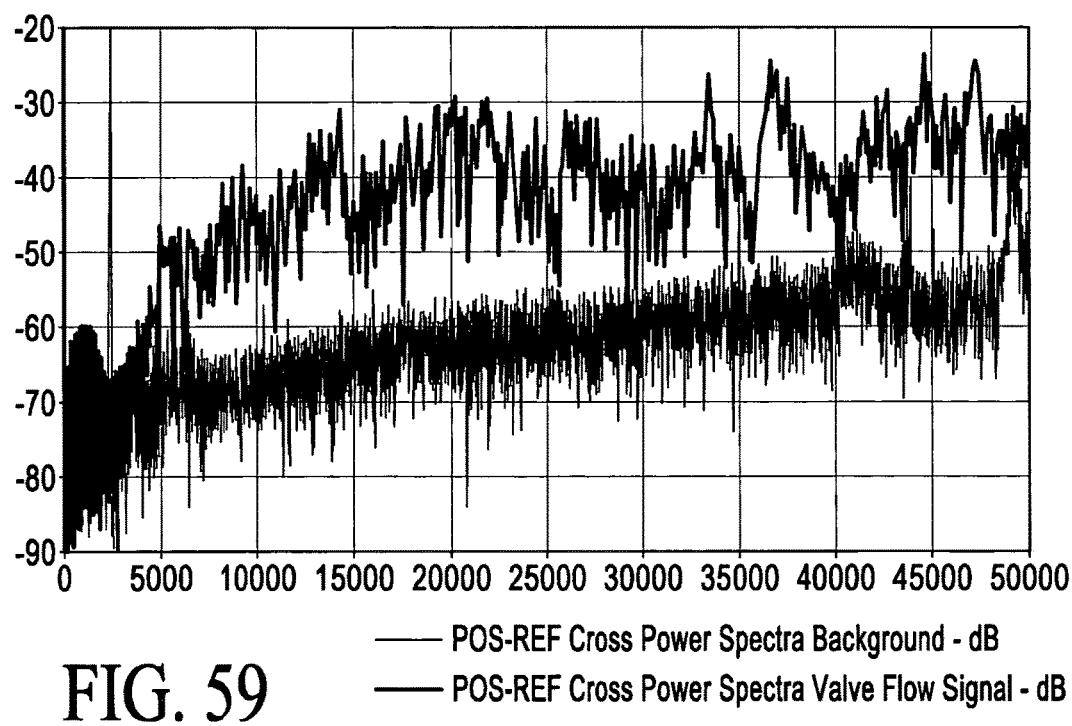

FIG. 59 illustrates the cross PSD of the POS and REF acoustic sensors that were computed from the time series of the acoustic sensors when the valve is partially closed but the pressure on both sides of the valve is 0 psig. Only background noise is observed. The results would be the same if the valve were totally opened, totally closed, or at the same pressure on both sides of the valve.

Figure 60:
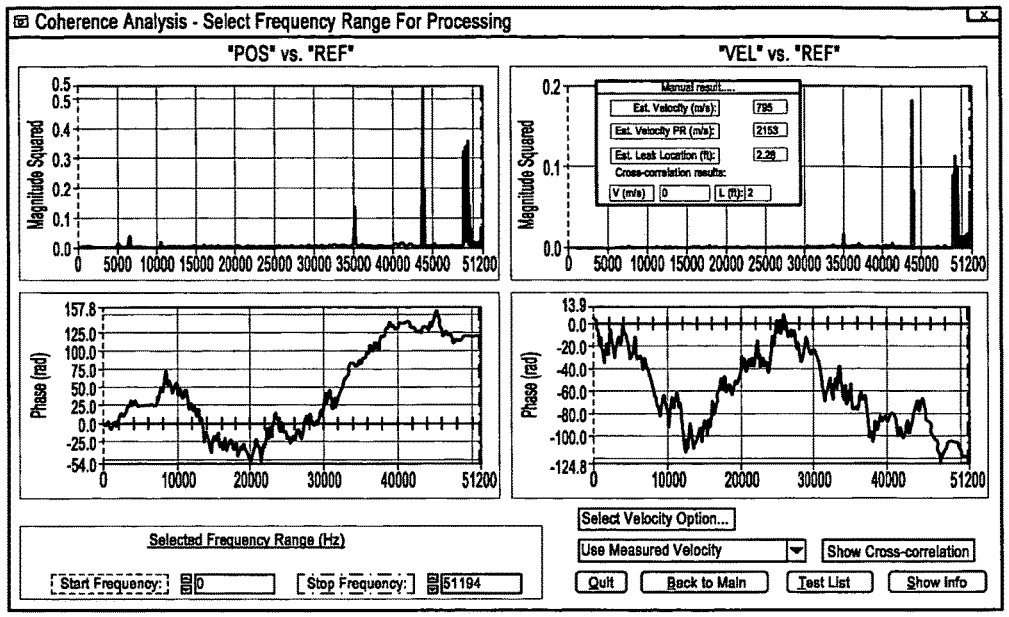

FIG. 60 illustrates the output of the coherence function for the background time series in FIG. 57.

Figure 61:
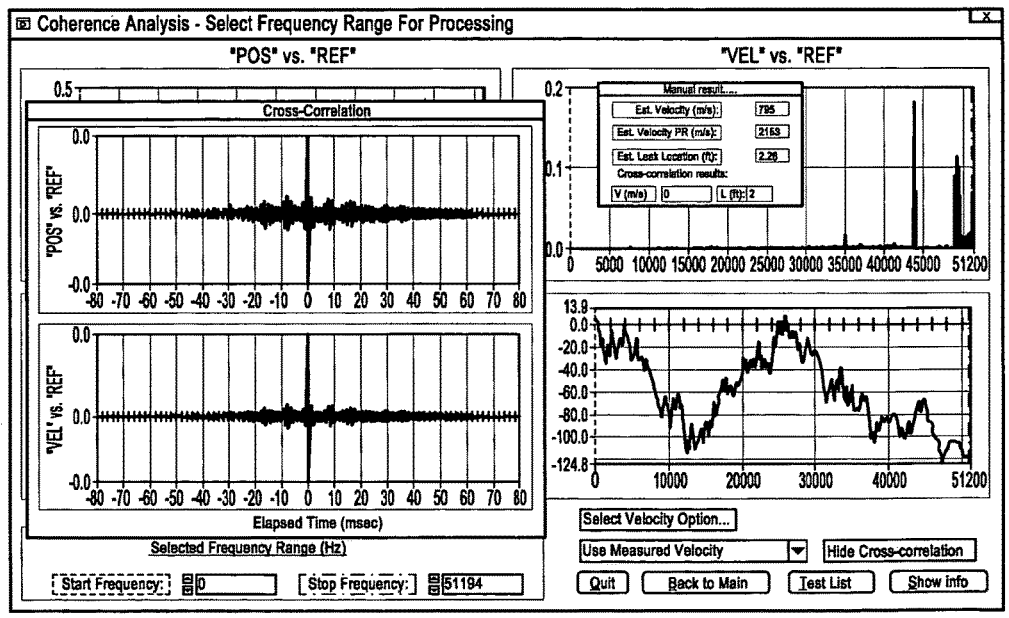

FIG. 61 illustrates the output of the cross correlation function for the background time series in FIG. 57 without bandpassing and with bandpassing.

Figure 62:
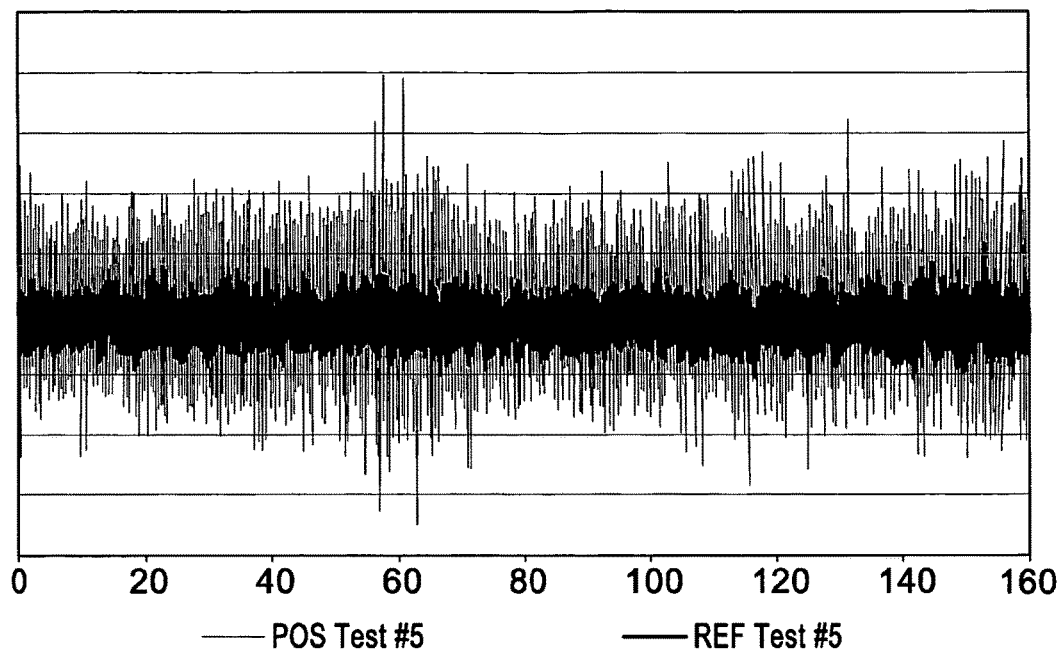

FIG. 62 illustrates the time series of the POS and the REF acoustic sensors when the valve is partially closed but the pressure on one side of the valve is at 100 psig and the pressure on the opposite side of the valve is 0 psig. The presence of the valve flow signal is observed and is obviously different than the response when the pressure is zero on both sides of the valve.

Figure 63:
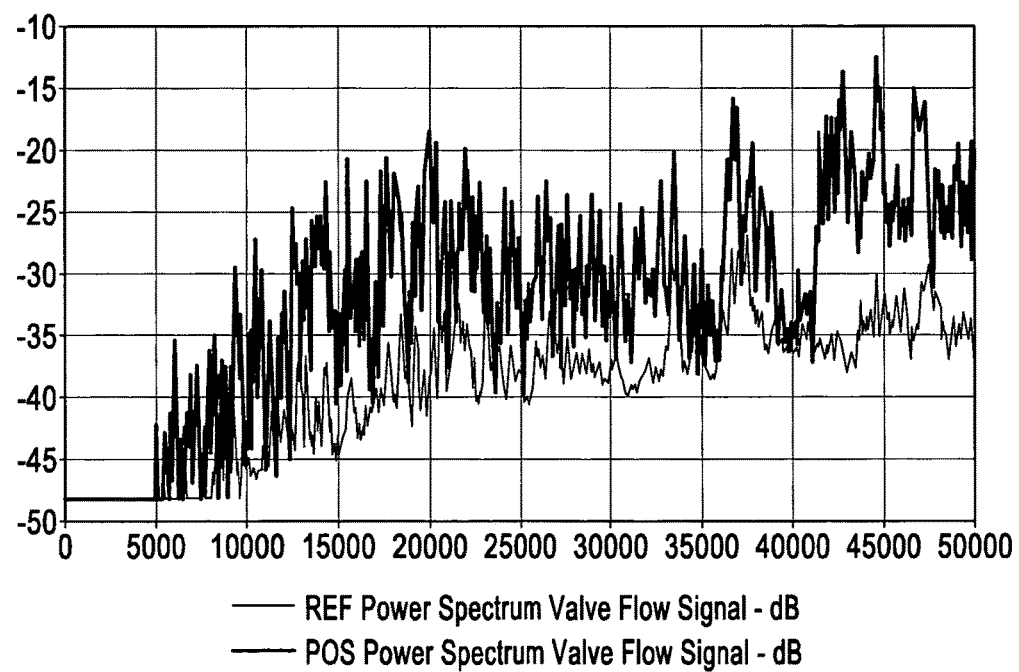

FIG. 63 illustrates the PSDs of the POS and the REF acoustic sensors for the time series in FIG. 62 when the valve is partially closed but the pressure on one side of the valve is at 100 psig and the pressure on the opposite side of the valve is 0 psig. The presence of the valve flow signal is observed and is obviously different than the response when the pressure is zero on both sides of the valve.

FIG. 64 illustrates the PSDs of the POS and the REF acoustic sensors for the time series in FIG. 62 of the valve flow signal relative to the time series in FIG. 57 of the background noise.

Figure 65:
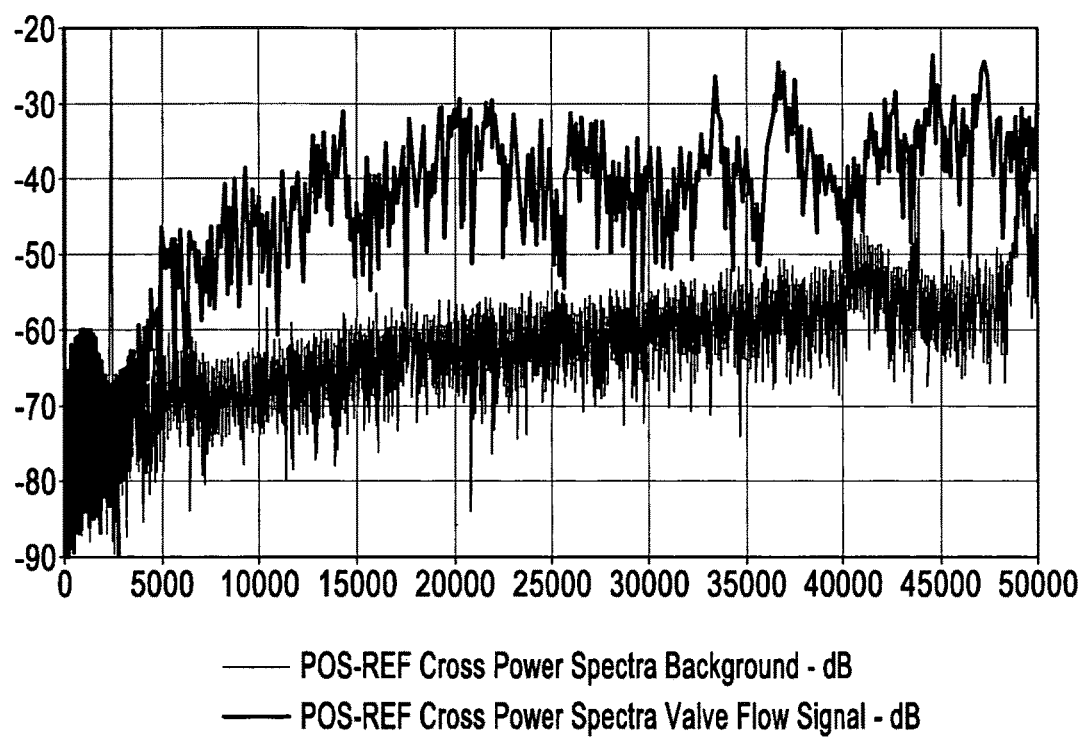

FIG. 65 illustrates the cross PSD of the POS and REF acoustic sensors that were computed from the time series of the acoustic sensors when the valve is partially closed but the pressure on one side of the valve is at 100 psig and the pressure on the opposite side of the valve is 0 psig. The presence of the valve flow signal is observed and is obviously different than the response when the pressure is zero on both sides of the valve.

Figure 66:
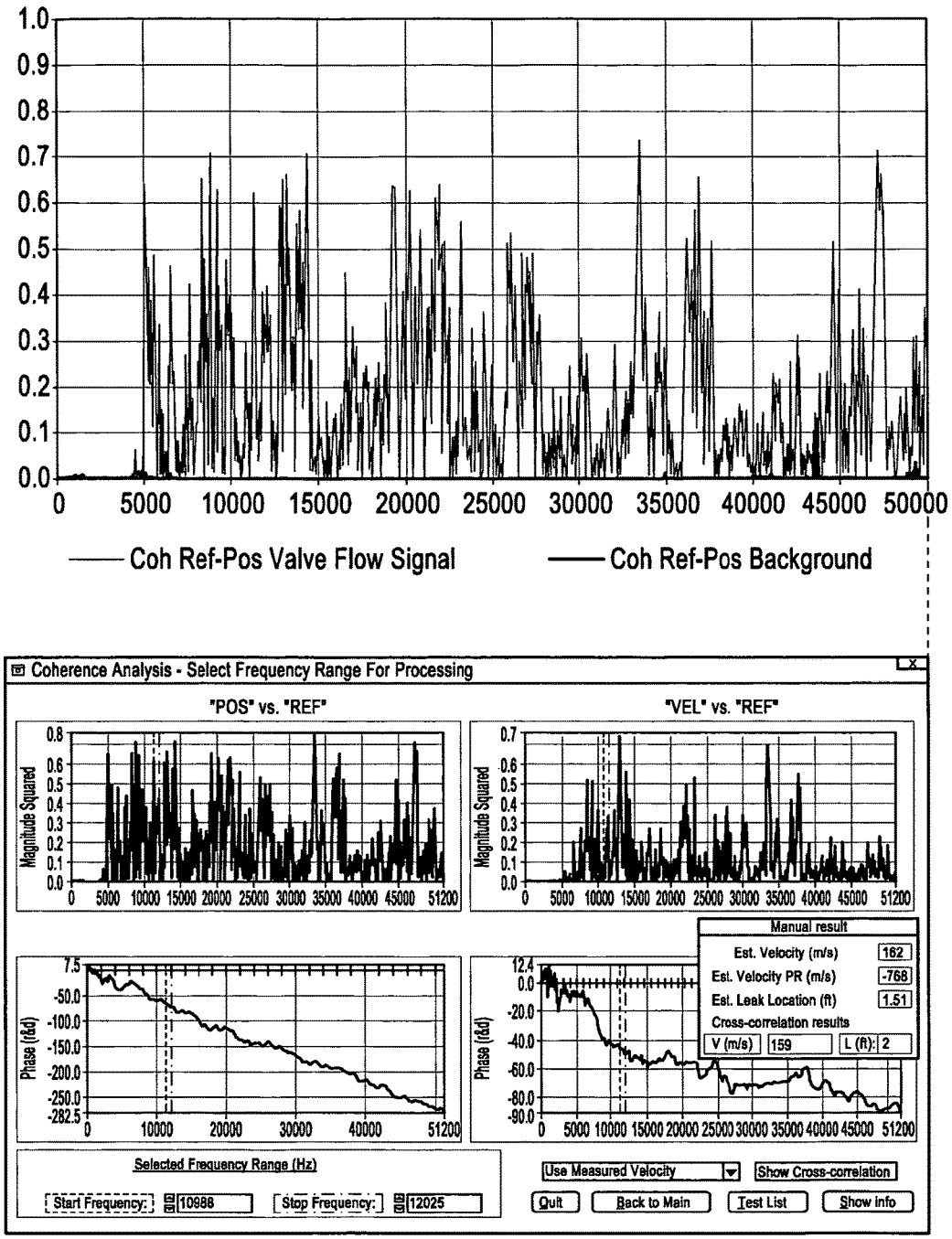

FIG. 66 illustrates the output of the coherence function for the background time series in FIG. 57.

Figure 67:
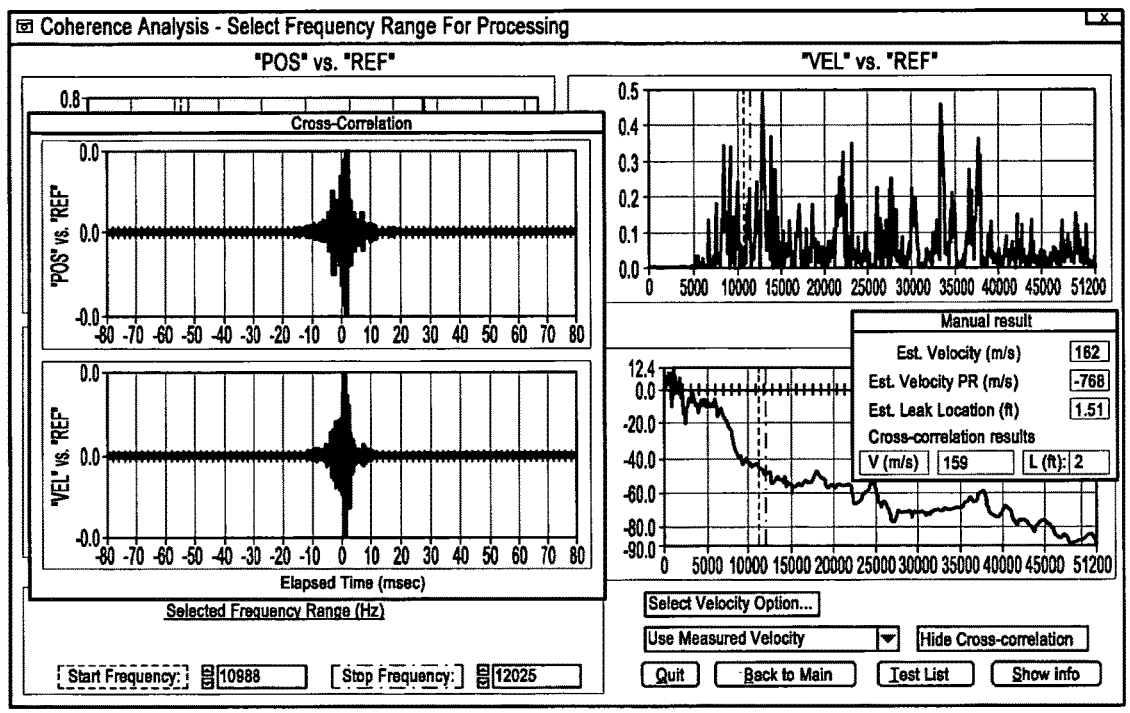

FIG. 67 illustrates the output of the cross correlation function for the background time series in FIG. 57 without bandpassing and with bandpassing.

Figure 68:
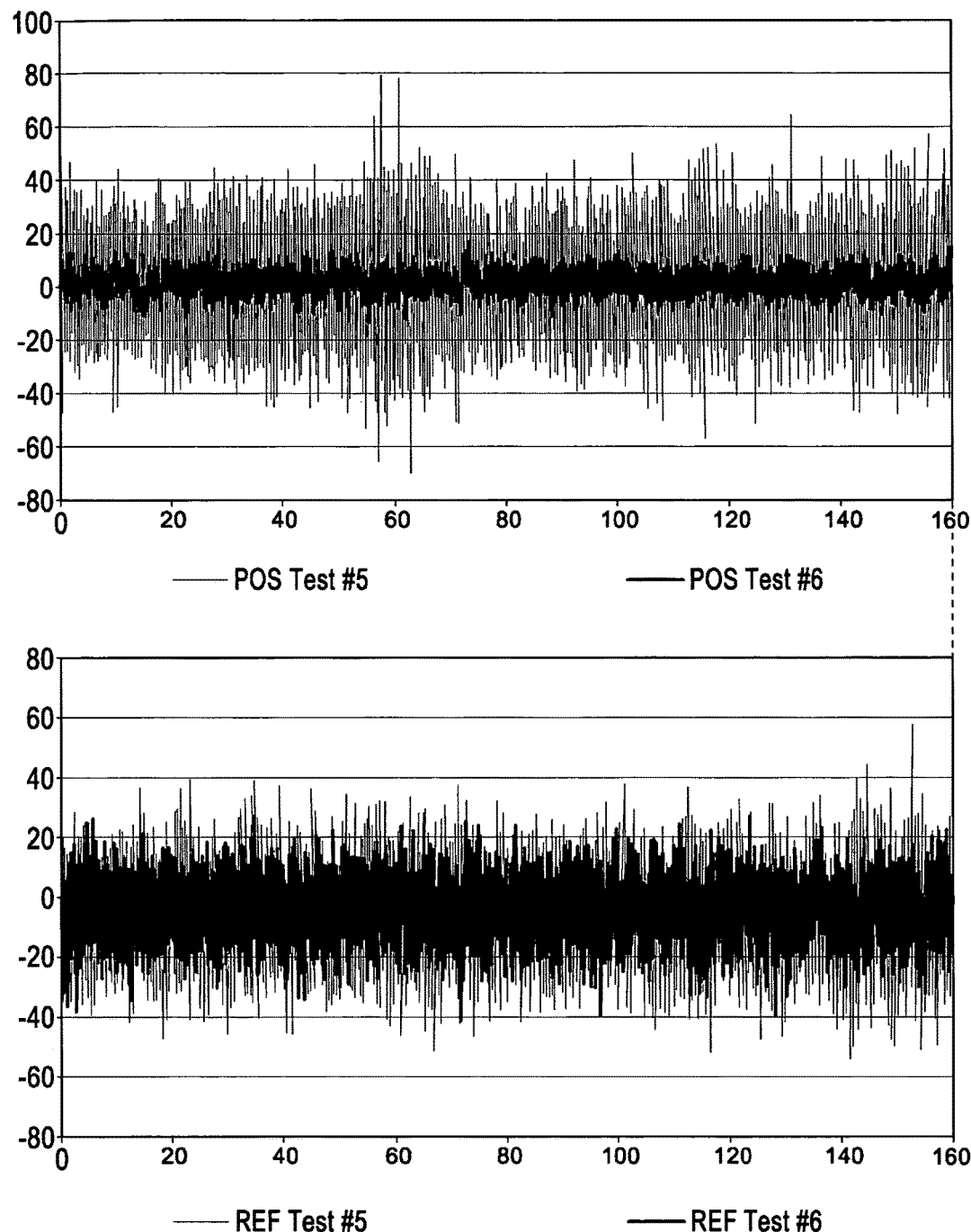

FIG. 68 illustrates the (a) time series of the POS acoustic sensor comparing the background noise in FIG. 57 and the valve flow signal in FIG. 62 and the (b) time series of the REF acoustic sensor comparing the background noise in FIG. 57 and the valve flow signal in FIG. 62.

Figure 69:
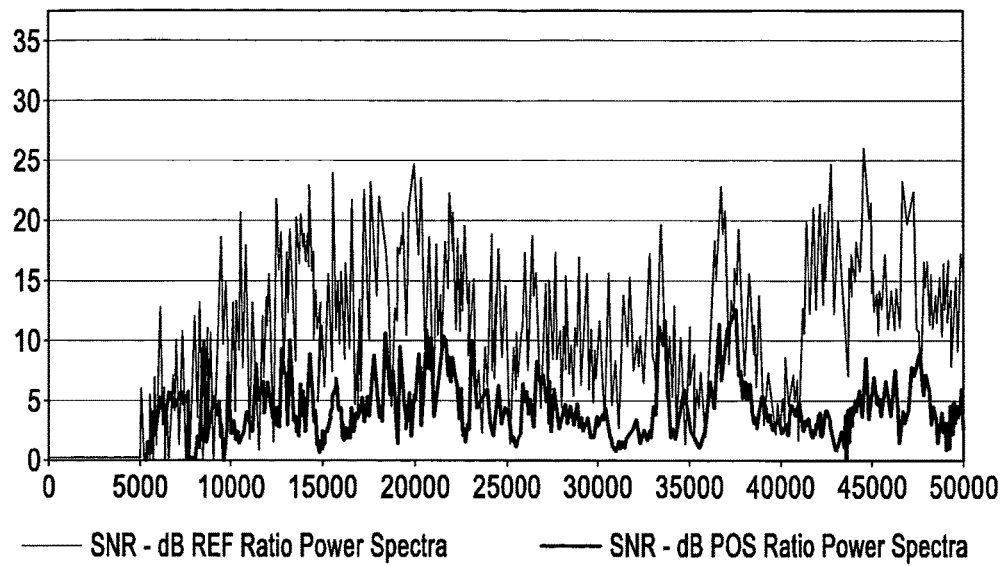

FIG. 69 illustrates the ratio or SNR of the PSDs of the POS and the REF acoustic sensors when the valve flow signal is present and when it is not.

Figure 70:
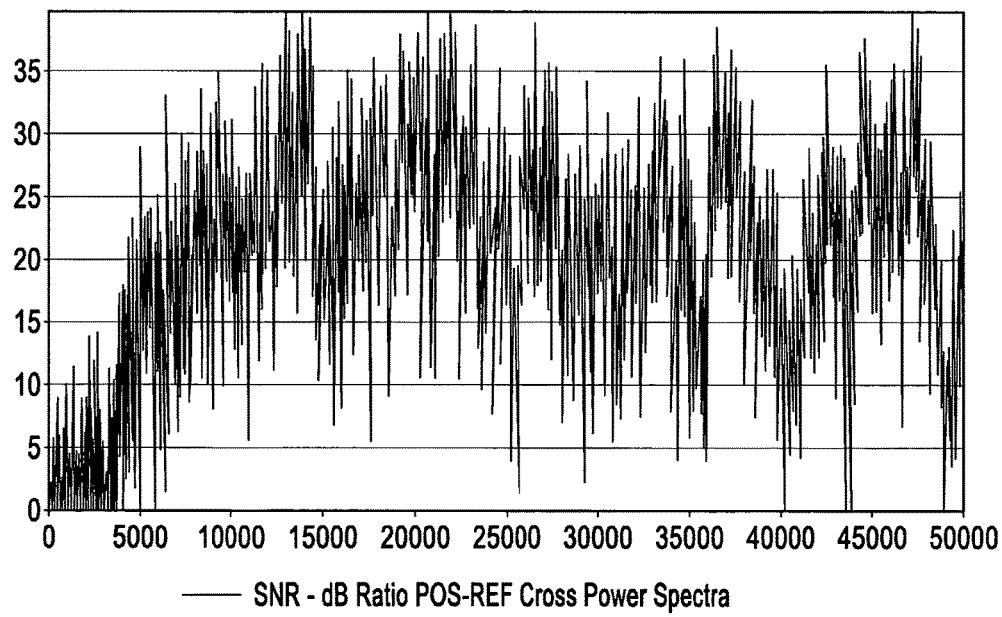

FIG. 70 illustrates the ratio or SNR of the cross PSD of the POS and REF acoustic sensors when the valve flow signal is present and when it is not.

Figure 71:
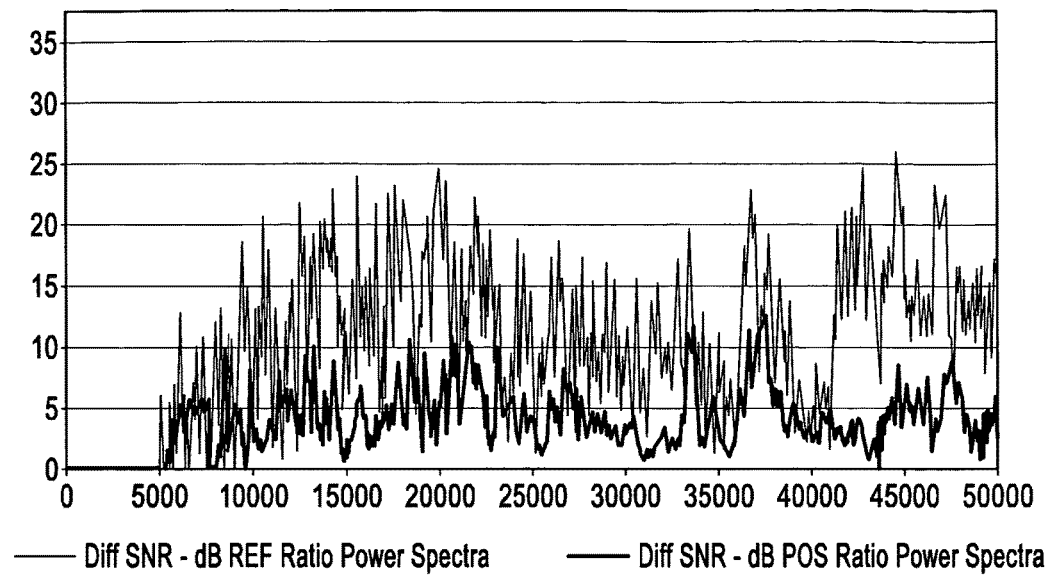

FIG. 71 illustrates the difference of the PSDs of the POS and the REF acoustic sensors when the valve flow signal is present and when it is not.

Figure 72:
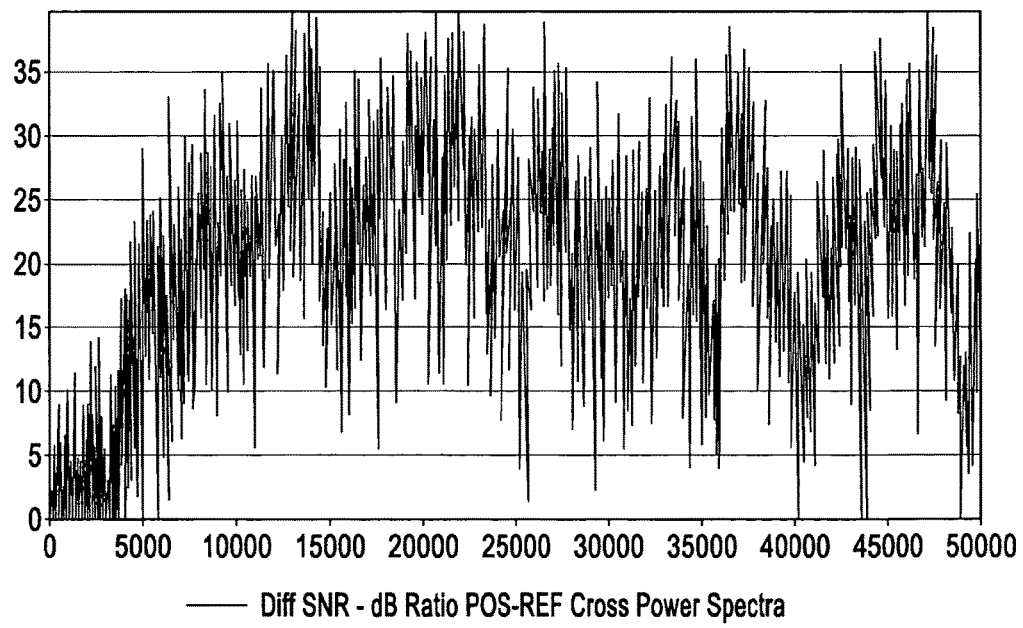

FIG. 72 illustrates the difference of the cross PSD of the POS and REF acoustic sensors when the valve flow signal is present and when it is not.

DESCRIPTION OF THE PREFERRED EMBODIMENT

The regulation (Part 250—(*Oil And Gas and Sulphur Operations in the Outer Continental Shelf Subpart D—Oil and Gas Drilling Operations;* § 250.447-§ 250.451) requires that the BOP systems in the United States (Title 30: *Mineral Resources*, on a drilling rig for both onshore and offshore rigs be pressure tested according to Part 250, Subpart D, Sections 250.447-250.45). The pressure test is designed to insure that all parts of the BOP are operationally functional, i.e., pipes and flanges do not leak and valves seal completely when closed so that there is no flow across the valve.

To test the BOP for integrity safely and/or in accordance with BOP regulations, a pressure testing system, or its alternative, a constant-pressure, volumetric testing system needs to be performed at two pressures. For safety and efficiency, a test should be performed at a lower pressure (e.g., between 200 and 300 psig) to verify that the system passes before raising the pressure to higher pressures (e.g., typically 5,000 psig, or more) for a test at the working operational pressure of the drilling rig. This two-pressure testing approach is done for safety, efficiency, and effectiveness. Because the test media is water, the pressures are high, and the volume of the pressurized liquid is small, the impact of temperature-induced pressure (and/or volumetric) changes are small and can, to first order, be neglected. In addition, short tests (e.g., 5 to 10 min) can be performed. The total time required to perform an integrity test and the accuracy of the integrity test can be significantly impacted by whether or not the valves are completely closed so that small flows across an incompletely sealed valve do not produce pressure (and/or volumetric) changes that provide false indications of a leak or a system integrity problem. The addition of and the integration of a valve measurement system with a pressure (and/or a volumetric) integrity testing system reduces the total test time and increases the accuracy and reliability of the integrity test.

Figure 1A:
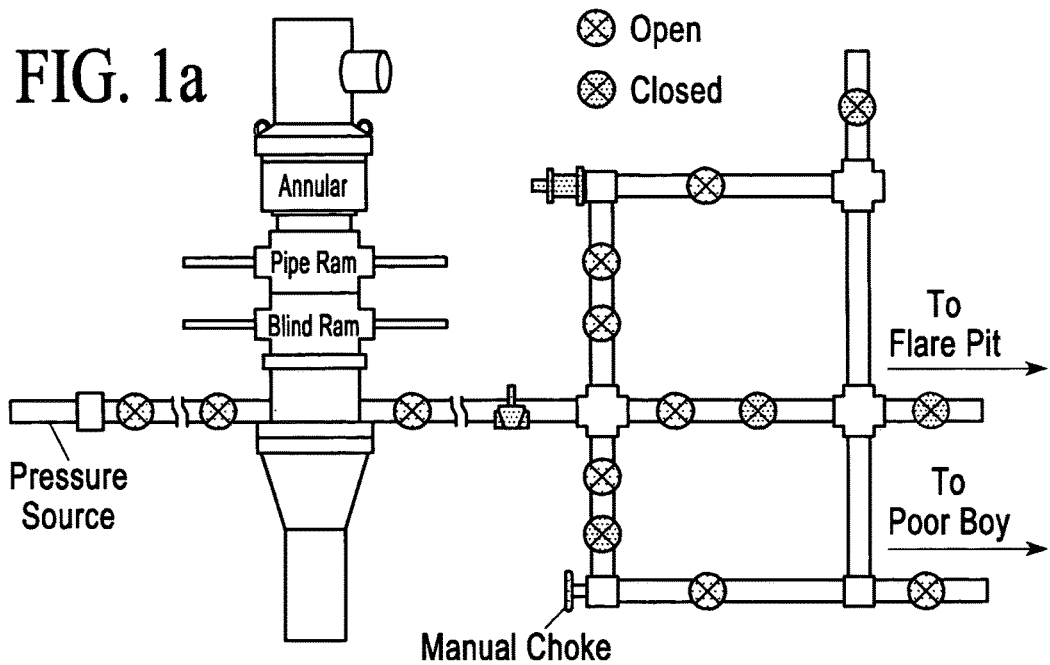
FIG. 1a illustrates a BOP Stack that needs to be tested.
Figure 1B:
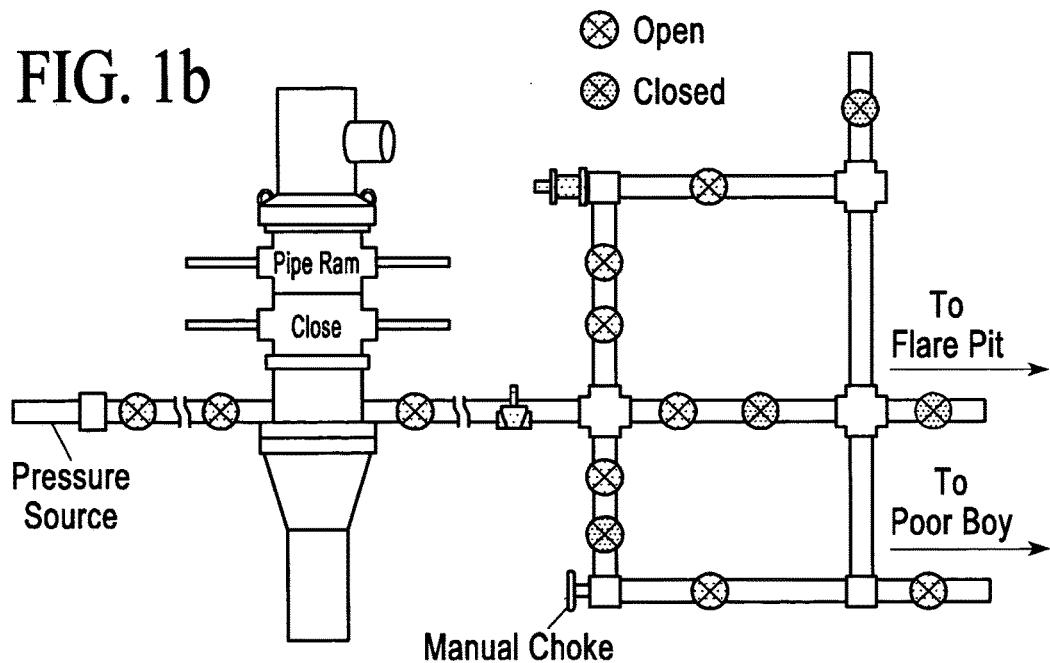
FIG. 1b illustrates the valve configuration for a Casing Pressure Test, which is one of five tests for this BOP Stack configuration.

FIG. 1 illustrates a BOP system that needs to be tested. A complete pressure test is accomplished by partitioning the BOP system into five or more different pipe and valve configurations. Our validation testing was performed on a drilling rig that required nine different pipe and valve configurations. The piping typically ranges from 3 to 6 in, in diameter and is typically less than 100 ft between valves. The BOP tree is shown in the middle of the figure. Over 12 gate valves are shown in this BOP system. FIG. 1*b* illustrates the valve configuration for a Casing Pressure Test. This BOP system test illustrates a five-subsystem test procedure and involves a Casing Pressure Test, a Pipe Rams Test, an Annular Test, a Blind Rams Test, and a Choke Manifold Test. Two pressure tests, one at the low pressure and one at the high pressure must be performed. Such BOP tests can involve many more valves and many more than five valve configurations. This approach is taken to insure that each valve and pipe section of the BOP system is tested and to limit the number of valves in each test configuration so that the sources of false alarms (i.e., one or more valves that prevent passing the pressure test because of one or more incompletely closed or sealed valves) can be more easily identified and mitigated. In order to pressure test the configuration illustrated in FIG. 1*b*, five valves must completely seal. If any of these valves fail to seal completely when closed, there will be a small flow from the pipe on one side of the valve to the pipe on the other side of the valve. This loss of volume due to the flow across the valve will result in a pressure drop, and if large enough, will be responsible for not passing the pressure test. Once a pressure test fails, the operators visually examine the piping and the flanges for leaks. If not are found, then it is assumed that one or more of the valves are not completely closed, but the challenge is to determine which one or more valves are not sealed. Typically, the valves are more tightly closed or re-opened and re-closed, and a second pressure test is performed. This is time consuming and there is no guarantee that the culprit valves are sealed in the second test and that valves that were completely closed in the first test actually seal in the second test. Experience has shown that it can be very time consuming to perform a test of the entire BOP system because of the large number of valves that must be completely sealed to complete a valid pressure test.

The preferred embodiment of the present invention is comprised of (1) a pressure testing system to test the BOP system or portions of the BOP system for integrity and (2) an acoustic valve measurement system to determine whether or not each valve that is closed for the pressure test is actually completely closed. The pressure testing system is used to test the BOP system or portions of the BOP system for integrity after verifying with an acoustic measurement system that all of the valves that are closed to isolate and pressurize that portion of the BOP system being tested are completely closed, and if not, to identify which valves are not completely closed and need to be closed to perform a test. As an alternative embodiment, a constant-pressure, volumetric measurement system can be used in conjunction with the acoustic system to quantify the flow across a valve that is not closed and to verify that the flow rate is zero when the valve is believed to be closed. If the measured flow is due to an incompletely closed valve, then this flow will be decreased or eliminated as the valve is more completely closed. Because a constant-pressure volumetric system can detect smaller flows than an acoustic system, the use of the volumetric system with the acoustic system further reduces the number of false alarms due to incompletely closed valves over that of an acoustic system. The constant-pressure, volumetric system will also detect any residual flow not associated with an incompletely sealed valve, and as an alternative embodiment, a constant-pressure volumetric testing system can be used instead of a pressure testing system for testing a portion or all of the BOP system for leaks. In this test, the pressure is maintained at the test pressure and the volume changes, which would result in a pressure drop, are measured directly and can be converted to an equivalent pressure drop, if necessary. While a constant-pressure volumetric testing system is commonly used for petroleum pipelines at airport and petroleum fuel storage facilities, it has not been used for testing the BOP system. The main advantage of the volumetric test as compared to a pressure test is that a direct measurement of the flow across an incompletely sealed valve can be made in gallons or gallons per hour and it can be used in conjunction with the acoustic system to verify that the valves are completely closed. As illustrated in FIG. 18, a constant-pressure volumetric testing system implemented for short runs of piping was used to verify that there was flow or no flow across the valve for the laboratory test configuration and for quantifying the flow rate across the valve if it was not completed sealed.

Figure 2:
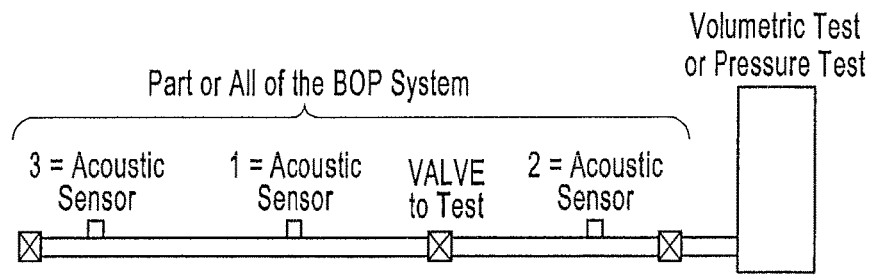
FIG. 2 illustrates a section of the testing configuration for a BOP Test.

As illustrated for a simple pipe and valve configuration in FIG. 2, the preferred embodiment of the valve measurement system is comprised of two acoustic sensors mounted on the outside of the pipe with one sensor on either side of the valve. As an alternative embodiment, the valve measurement system can be implemented with only one acoustic sensor positioned close enough to a valve that is not completely closed to detect any flow noise produced by that valve, but if flow noise from a valve is detected, it is not possible to say with certainty that it is the valve closest to the acoustic sensor that is not completely closed. With two or more acoustic sensors, where at least one acoustic sensor is located on either side of the valve, a definitive statement about the status of the valve that is bracketed by the acoustic sensors can be made, because the source of the valve flow signal can be "located" between the two sensors. An accurate location estimate indicates that the bracketed valve is producing the valve flow signal. Once this bracketed valve is closed, another acoustic test will determine if other valves may also be incompletely closed. As another alternative embodiment, a third or fourth acoustic sensor can be mounted on the piping leading into the valve but at a known separation distance from each sensor bracketing the valve. The two acoustic sensors on each side of the valve (not bracketing the valve) can be used to compute the velocity of the flow noise propagating through the piping, which leads to more accurate location of the valve between the two acoustic sensors bracketing the valve. They can also be used to determine from which direction a valve flow signal is coming from. To either locate the flow noise source or to compute the propagation velocity requires that the distance between the acoustic sensors be known. The most reliable verification that a valve with bracketing acoustic sensors is completely sealed requires that the distance between two acoustic sensors bracketing the valve and from each sensor to the valve be known. However, such verification can also be accurately performed without knowing these distances.

The preferred embodiment of the present method and apparatus of the valve measurement system is comprised of two acoustic sensors mounted on the outside of the pipe with one sensor on either side of the valve. The acoustic sensors can be permanently mounted on the pipe wall or the valve itself, or temporarily mounted on the pipe wall or the valve itself with epoxy, straps, or magnets. The presence of a small flow across the valve can be detected by comparing the ratio of the cross spectra obtained (1) with a pressure difference across the valve and (2) with no pressure difference across the valve, which preferably is obtained when the pressure on both sides of the valve is 0 psig. This approach works because cross spectral analysis allows one to determine the relationship between two time series as a function of frequency, and if there is, to determine what the frequency characteristics or frequency band where the relationship exists. The ratio automatically eliminates the background noise in the non-valve-signal frequency bands and computes the excess signal in the valve-flow-signal bands. This approach works even if the background noise is found in the valve-signal band provided that the background noise is stationary over time, i.e., is approximately the same in a statistical sense during the valve test as when the background noise was obtained. If not, an adaptive noise cancellation method using the acoustic data from a separate acoustic sensor that only measures background noise during the valve measurement test to remove the background noise from the acoustic sensors during the valve test. Once the background noise is removed from the time series of the two acoustic sensors bracketing the valve, the ratio of the cross spectra obtained with and without a pressure difference works as indicated in the preferred embodiment. In an alternative embodiment, the coherence function can also be computed between the two acoustic sensors and used to determine if there is flow across the valve or if the bracketed valve is the incompletely sealed valve generating the valve flow signal. A background coherence measurement can help determine if there is ambient noise at frequencies not usually observed.

This can be implemented when there is a pressure difference if the noise cancelled times series from both sensors is used to compute the coherence function, or if the frequency band containing the valve flow signal can be identified or is known from previous measurements. The valve flow signal can be identified against random background noise if the phase of the coherence function is highly linear and the magnitude-squared of the coherence function is strong, as described below. This approach has been used for locating leaks in pipes. The coherence function obtained when there is no pressure difference will help identify the background noise in the coherence function obtained when there is a pressure difference across the valve.

With two or more acoustic sensors, where at least one acoustic sensor is located on either side of the valve, a definitive statement about the status of the valve that is bracketed by the acoustic sensors can be made, because the source of the valve flow signal can be located between the two sensors, if the source of the valve flow signal is from the bracketed valve. The valve flow signal can be located using the phase of the coherence function of the valve test at frequencies where $\gamma^2$ is high and the phase is linear, which is the approach used for locating pipe leaks. An accurate location estimate of the valve between the two acoustic sensors indicates that the located valve is producing the valve flow signal and needs to be closed. If a third or fourth acoustic sensor is mounted at the other end of the piping leading into the valve and at a known separation distance from each sensor bracketing the valve, then any leaks in the piping or the pipe flanges can be located using a similar approach. A strong response in the magnitude squared of the coherence function (where $\gamma^2$ is high) and/or the presence of a linear relationship (where $\phi$ is linear) can be used independently of the location method to determine the presence of a valve flow signal, because $\gamma^2$ is the normalized cross power spectrum.

As indicated above, another alternative embodiment is the use of a third and/or fourth acoustic sensor are mounted on the piping leading into the valve and at a known separation distance from each sensor bracketing the valve. Any combination of two sensors bracketing the valve can be used to locate the source of the flow noise at the valve, even if these sensors are not equally spaced around the valve or in the immediate proximity of the valve. The method can work with a spacing of 500 ft or more, but for best results the maximum spacing should be less than 50 to 100 ft. The two acoustic sensors on each side of the valve (not bracketing the valve) can be used to compute the velocity of the flow noise propagating through the piping. To either locate the flow noise source or to compute the propagation velocity requires that the distance between the acoustic sensors be known.

The acoustic method works, because a valve that is partially closed will produce flow noise that is cause by liquid flow across the valve. The strength of the flow noise will increase as the pressure increases. The pressure wave produced by the flow through the hole or slit that remains after a valve is thought to be fully closed propagates down the pipe. Three primary propagation modes are possible in the pipe leading to an acoustic sensor: (1) through the liquid, (2) at the interface of the liquid and the inner pipe wall, and (3) in the pipe wall. The strongest propagation mode is through the liquid. All three propagation modes can be present at the same time and can be present in a wide range of different frequencies, including overlapping frequencies. Regardless of the propagation mode, this flow noise will be strongest in one or more frequency bands that are controlled by the materials, liquid media, and the type and configuration of the valve and piping system. Our cross power spectral and/or or coherence/correlation signal processing approach does not require a priori knowledge of the propagation modes or propagation frequencies.

As stated above, the presence of valve flow noise, which is the acoustic "signal" to be detected by the valve measurement system, is determined by comparing the acoustic times series collected with one or more acoustic sensors (a) without the presence of a valve flow signal to the acoustic times series collected with these same acoustic sensors (b) with the presence of a valve flow signal. If the background noise is large or contaminates the valve flow signal, then noise cancellation may be required.

The valve flow signal can be eliminated by collecting time series data on the two acoustic sensors bracketing the valve when the pressures are the same on each side of the valve. This pressure condition can be assured by opening the valve or by lowering the pressure in the piping on both sides of the valve to 0 psig, which is a special case of the aforementioned. Also, when the pressure is 0 psig, no valve flow noise can be created. This is true even if the valve is partially closed. When the pressures are the same, no flow across the valve is possible and therefore, the valve flow noise due to a valve which is not totally sealed will not be produced.

There are a variety of different types of background noise that might impact the valve measurements. Background noise emanating from a single location or a single source can be mistaken for the valve flow signal. A generator or a pump would be examples. These sources of noise can be very large and much larger than the valve flow signal itself. Fortunately, these sources of noise are generally found in one or more narrow frequency bands that are generally not the same frequency bands as the valve flow signal and can be removed by filtering or by analyses that does not include these bands in the processing once the noise and signal bands are known. The method for computing these frequency bands is described below. If the single location or single source noise is found in the valve flow signal frequency bands, then one or more noise cancellation methods can be used before the method mentioned above is performed. If these noise sources do not seriously contaminate the valve signal band, it will not be necessary to use noise cancellation.

Another type of background noise is broadband noise that occurs at all frequency bands, including the valve flow signal bands. If this level of noise is larger than the valve flow signal, it can mask the valve flow signal and must be reduced before the analysis method is applied through advanced signal processing. Averaging can be used (1) to reduce the background noise by the square root of the number of samples averaged together and (2) to increase the valve flow signal in proportion to the number of samples averaged.

The type of analysis method used will depend on whether the background noise is stationary (i.e., does not change over time). If the noise is stationary, then background noise obtained before, during, or after the valve flow measurements are made can be used. If the background noise changes over time, then an adaptive noise cancellation approach will be needed, so that the measurement background noise will be representative of the contamination of the valve flow signal at the time of the measurement. An adaptive approach is needed if the noise is transient and changes over time.

There are many ways to compare the times series collected with and without the presence of the valve flow noise signal, but for best results the data should be analyzed as a function of frequency. The preferred method is to use two acoustic sensors (x and y) bracketing the valve and to compute the Power Spectra (Gxx and Gyy), the Cross Power Spectrum (Gxy), the Coherence Functions (both $\gamma^2$ and phase ($\phi$)), cross correlation function after bandpassing the time series data so that only the flow noise frequencies are included, and analyze these quantities as a function of frequency. The specific method used will depend on the type and frequency characteristics of the background noise. It should be noted that the magnitude squared, $\gamma^2$, is the cross power spectrum obtained using two sensors that is normalized by the absolute value of the product of individual power spectra. The advantage of the cross power spectrum for the valve application is that it is quicker to collect and process the data and the ratio of the cross power spectrum obtained during a valve test and the background cross power spectrum obtained during background tests provides a simple and direct estimate of the signal-to-noise ratio (SNR) to use in detection.

A simple and quick test of each valve in the BOP test configuration is performed before, during, or after the pressure test using a passive acoustic valve measurement system (PAVMS). The preferred embodiment attaches two acoustic measurement sensors (denoted herein by x and y or by POS and REF) to the outside wall of the pipe section on each side of the valve (i.e., bracketing the valve). The acoustic sensors only need to be within 50 to 100 ft of the valve, but typically 2 to 10 ft from the valve. Preferably, the two acoustic sensors should be at different distances from the valve (e.g., 2 ft on one side and 5 ft on the other). The preferable method is to time register and to collect a time series from each acoustic sensor at a sufficient sampling rate and then process these time series data in the frequency domain in near real-time. The presence of a valve flow signal can be determined from either acoustic sensor by computing the power spectral density (PSD) of the time series and looking for peaks or excess power in the spectra as a function of frequency. If the background noise is large or if localized noise sources exist, then this will be difficult to do if one does not know a priori which frequency bands have low noise or what the PSD of the background noise is.

The background noise can be determined by collecting data in close proximity to a valve when the valve is known to be completely sealed, or when the pressure on both sides of the valve are the same or at zero gauge pressure, which means there can be no valve flow noise. In addition, an acoustic sensor may be located in close proximity to the valve but not on the valve or piping that would be subject to the valve flow signal, if it were present. In all four cases, the time series and PSD are only a function of the background noise, and such background noise may include general background noise, system/instrumentation noise, and localize sources of noise (e.g., a generator). If a valve is not completed sealed and there is a pressure difference across the valve, then the time series and the PSD contain this signal, as well as the background noise. If an independent measurement of the background noise is made, as suggested above, then there will be a difference in the two time series and the two PSDs.

There are a variety of methods to determine if there is a difference. One is to visually inspect the time series and/or the PSDs and to compare the differences analyzed as a function of frequency or frequency bands. A second approach is to remove the background noise from the valve flow signal data by noise cancellation. If the time series of the background noise is obtained at the same time as the valve flow signal time series (and time registered), then one of many adaptive noise cancellation algorithms can be used. If the background noise is obtained at a different time than the valve flow signal time series (e.g., before or after the valve flow signal measurements are made), then an average transfer function can be obtained and used for noise cancellation. This latter approach assumes (i.e., requires) that the background noise is stationary (i.e., does not change over time). A third approach is to compute the ratio or difference of the valve flow signal data with the background noise data.

All three methods will work, but our preferred method uses the ratio of the cross PSDs (valve flow test and background noise test) if two acoustic sensors are used, especially if they bracket the valve. If only one acoustic sensor is available, then the ratio of the PSDs (valve flow test and background noise test) can be used. This preferred method allows a direct comparison and easy visual interpretation of the differences between the valve flow signal and the background noise as a function of frequency or in frequency bands so that the frequency bands with the strongest signal and/or the smallest background noise can be analyzed and used to determine whether or not a valve is closed. The equivalent analysis can be performed on the time series, but this usually requires some a priori knowledge of the background noise to be successful and typically usually requires frequency domain analysis using PSDs to develop the most efficient analysis method. Noise cancellation can be effective in removing background noise from the valve flow signal, which also contains the same background noise. Taking the ratio of the power spectra of the valve flow signal (with background noise) and the background noise, as indicated above, is a simple but direct form of noise cancellation. The disadvantage of this approach is that the background noise is usually obtained at a different point in time and may not be the same as when the valve flow signal test data is obtained. This is minimized if the data collection time is sufficient to provide a reliable estimate of the average background noise that would be representative of the background noise at any time. Adaptive noise cancellation addresses this problem, because the background noise is measured at the same time as the valve flow signal.

Adaptive noise cancellation requires that an independent measurement of the background noise be made that does not contain the valve flow signal. A separate acoustic sensor, which is not attached to the pipe or valve, but is located in close proximity to the valve flow signal acoustic sensor, is used to measure the background noise. This approach may not measure those acoustic vibrations that can only be sensed by attachment to the pipe or valve when the valve is completely closed or the pressure difference across the valve is zero. Providing that the average background noise during the BOP test is stationary (i.e., approximately constant), which is not an unreasonable assumption for these measurements, then a measurement of the background noise with the valve flow signal acoustic sensor with the valve completely closed, a zero gauge pressure on both sides of the valve, with equal pressure on both sides of the valve, or with the valve open, should provide the necessary background data to use in effectively detecting the valve flow signal.

Because the BOP piping configured for a pressure test may include a multiplicity of valves and because the distances between valves are generally not large enough to prevent the detection of a valve flow signal from other nearby valves that are not totally closed, an acoustic sensor may detect the presence of a valve flow signal that is not immediately adjacent to the sensor. In this case, the acoustic test will indicate that a valve is not sealed, but it may not be useful in identifying which valve is not closed. This problem is addressed using two acoustic sensors that bracket the valve, because these two acoustic sensors can be used to locate the source of the valve flow signal using the coherence and cross correlation methods. If the valve between the two acoustic sensors is not closed and the location of the source of the valve flow signal is the location of the valve, then this location method indicates that that valve is not closed. If the valve being bracketed by the two acoustic sensors is closed, then these two acoustic sensors will not locate it, but will indicate which direction (i.e., which side of the valve receives the valve flow signal first) the valve flow signal and the next valve to check. When two acoustic sensors do not bracket the valve flow signal, they can be used to estimate the propagation speed of the acoustic valve flow signal as a function of frequency and used for more accurate location estimates. The propagation speed can vary depending on the propagation mode. In general, three acoustic sensors are best used to locate the valve flow signal, where one pair brackets the valve and the other pair does not.

The pair that does not bracket the valve, as indicated above, is used for estimating the propagation speed as a function of frequency, and used to convert the time of arrival measurements for the two acoustic sensors bracketing the valve to distance and location relative to the acoustic sensors.

The coherence function or the cross correlation function after appropriately processing the time series in a signal band is used to locate the leak. The location estimate is determined as a function of the derivative of the phase ($\phi$) as a function of frequency in frequency bands where the phase is approximately linear and the when the magnitude-squared ($\gamma^2$) is higher than the background. This method has been used to locate leaks in buried piping and is equally applicable for detecting and locating the source of noise produced by an incompletely closed valve. If the background noise is large or is found in certain frequency bands where the valve flow signal also is found, then the time series of the acoustic sensors used for location should be noise cancelled before the coherence function is computed. If the background noise occurs in different frequency bands than the valve flow signal, then noise cancellation is not required if the valve flow signal bands can be identified. These frequency bands can be identified by comparing the valve flow coherence function, or the cross spectra and power spectra used to compute the valve flow coherence function, to the background coherence function, or the cross spectra and power spectra used to compute the background coherence function. As mentioned above, the background noise can be measured with the valve flow signal acoustic sensor when the valve is completely closed, with a zero gauge pressure on both sides of the valve, with equal pressure on both sides of the valve, or with the valve open.

The cross correlation function can also be used to locate the valve flow noise and the propagation speed using the same acoustic sensors that are used when computing these quantities using the coherence function. However, without knowing a priori the frequencies where the valve flow signal is strongest relative to the background noise, these estimates may be too contaminated with background noise to be accurate. If the cross correlation function is processed in the same frequency bands as used by the coherence function, the results will be similar. The advantage of the coherence function approach is that no a priori knowledge of the frequency content of the valve flow signal or the background noise is required, because it is derived as part of the computation. This is also true of the cross power spectrum and the ratio of the cross power spectra and the ratio of the individual acoustic sensor power spectra obtained during the valve test and during the background measurements.

The coherence function is comprised of the magnitude-squared ($\gamma^2$) and the phase ($\phi$). $\gamma^2$ is computed from the magnitude squared of the cross spectrum of the time series obtained from the two acoustic sensors bracketing the valve of interest divided by the magnitude square of the power spectra obtained for each acoustic sensor. Because both $\gamma^2$ and $\phi$ are computed as a function of frequency, the frequency bands computing the valve flow signal and the background noise can be assessed as part of the computation. The signal-to-noise ratio (SNR) as a function of frequency (SNR (f)) is computed directly from $\gamma^2$ (i.e., $(1-\gamma^2)/\gamma^2$). The SNR(f) as a function of frequency can also be computed from the cross spectrum obtained with a valve flow signal present and without a valve flow signal present (i.e., background noise).

Our preferred analysis method is to compute the ratio of the cross power spectrum obtained during a valve flow signal measurement and the cross power spectrum obtained when the pressure difference across the valve is equal or the pressures on both sides of the valve are zero and to set a threshold that is statistically different than 1 at a high enough confidence level to meet the required performance standard. Typically, this can be expressed as a minimum SNR or in terms of a probability of detection ($P_D$) and a probability of false alarm ($P_{FA}$). For Gaussian background noise, SNR is easily related to ($P_D$) and ($P_{FA}$). In general, the regulatory agencies require testing to be performed with a system capable of achieving a $P_D \geq 95\%$ against the flow rate of interest and a $P_{FA} \leq 5\%$. Most systems need to operate with a $P_{FA} \leq 1\%$.

There are many ways to establish a threshold that results in an acceptably high $P_D$ and an acceptably low $P_{FA}$. One way is to select (i.e. compute) a threshold based on the $P_D$ against the minimum level of valve flow that is acceptable in a BOP pressure test and the $P_{FA}$ that does not require many retests to insure the valve is tight. Another way is to do a hypothesis test with acceptable Type I and Type II errors to differentiate the signal plus background noise from the background noise for the PSD or Cross PSD or their differences. Another way is to do a hypothesis test with acceptable Type I and Type II errors to differentiate the ratio of the signal plus background noise from the background noise for the PSD or Cross PSD. This is really evaluating the SNR. This can also be done for the coherence function. This can be enhanced by taking into account those frequency bands where the phase is linear. The ratios or SNRs, when converted to dB, can also be used to set a threshold. Thresholds of SNR can be related to $P_D$ and $P_{FA}$ to determine the SNR threshold. Typical numbers for $P_D \geq 95$ to 99% and $P_{FA} \leq 1$ to 5% for small valve flows that would not trigger a pressure drop threshold exceedance during a BOP pressure test. The Type I and Type II errors are the same as $1-P_D$ and the $P_{FA}$, respectively. SNR thresholds can be as low as 10 dB and may be as high a 15 to 20 dB depending on the required performance.

The background time series is usually obtained before testing each valve. If the ratio of the cross power spectra indicates the presence of the valve flow signal, then these two sensors should be used to locate the source to verify that the valve between the two acoustic sensors is the source of the valve flow signal. A volumetric system can be used to determine the magnitude of flow and when the valve is sufficiently closed to perform the pressure test. The propagation speed can be measured using two acoustic sensors not bracketing the valve or by scratching the external side of the pipe when the valve is open, when the pressure is the same on both sides of the valve, when the pressure is zero on both sides of the valve, or when the valve is known to be entirely closed. Lightly scratching the surface of the pipe with a small screw driver or knife produces a signal equivalent to a small valve flow.

The time series used to compute the PSDs, the cross PSD, or the coherence function can be analyzed with equivalent results to determine the presence of a valve flow signal if the frequency bands where the valve flow signal is large and/or the background noise is small. As indicated above, this is also true for the cross correlation function. The mean, median, standard deviation, variance, or power can be computed using the time series. If the time series are bandpassed to those frequency bands where the valve flow signal is large and/or the background noise is small, the presence of the valve flow signal can be determined. If the time series of the valve flow signal is noise cancelled, then the determination is not impacted by background noise. In general, it is more efficient to analyze these data in the frequency domain.

For best results the background noise should be obtained with the same sensors and electronic systems that are used to measure the valve flow signal. Thus, it is preferable to estimate the background noise from these acoustic sensors when the valve flow signal is not present (i.e., typically when the pressure on both sides of the valve are equal or preferably zero). This will work providing the background noise is stationary during the valve measurements. If not, then an adaptive noise cancellation method needs to be applied using data from an independent acoustic sensor not subject to the valve flow signal during the acoustic valve measurements.

If two acoustic sensors are located on the same side of the valve, then the propagation speed of the valve flow signal can be determined and used in more accurately locating the valve flow signal. The acoustic data is collected at 100 kHz (up to 200 kHz) and the basic approach taken for detecting and locating leaks in pipelines is applied to valves. This approach is described below. The preferred method is to collect data with two acoustic sensors bracketing each valve before the line is pressured (i.e., at a pressure of 0 psig) with the valve open to the piping on both side of the valve. A sufficient set of times series should be collected to develop a transfer function under the background noise conditions for noise cancellation. Once this background noise data is obtained, the BOP system should be pressurized for the conduct of the pressure or volumetric test. If one or more of the valves is not sealed, then flow noise will occur and can be detected from the coherence, cross spectra, or correlation (after appropriate bandpassing to the flow noise signal band(s) using the noise cancelled time series. The coherence between the two sensors is computed and the frequency band containing the valve flow signal is determined by looking for a high magnitude-squared and/or a linear phase relationship.

The number of sensors can be minimized and optimized by having the sensors bracket multiple valves. The acoustic sensors do not need to be in close proximity to the valve and distances up to 100 ft or more would also accommodate the acoustic measurements needed to determine whether or not a valve is closed. This two-sensor configuration increases the performance and allows the acoustic sensors to detect small flows across the valve because of Vista's signal processing algorithm, which removes the noise not specifically present in the flow signal frequency band.

The main advantage of the acoustic valve flow measurements is that the number of pressure tests necessary to indicate the BOP system integrity is minimized, and may allow for the entire BOP system to be tested in one or two tests. More than one pressure test may be required if two or more valves are used on each side of the valve for redundancy. If all of the valves seals can be verified, then it should be possible to test the entire as a single configuration (instead of the 9 configurations currently required.) To check all of the valves, we would use a modified version of our constant-pressure, dual pressure, volumetric leak detection system (HT-100 Volumetric Leak Detection System) to maintain a specified level of pressure during the acoustic measurements and to measure the flow across the valves at this pressure in real-time until all valves are completely sealed as determined by the PALS Leak Location System modified and used as Valve Testing System.

Possible Locations of Acoustic Sensors.

Figure 4:
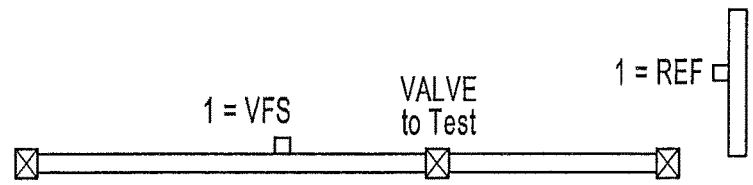
FIG. 4 illustrates Configuration 2 with One Acoustic Sensor to check for the valve flow signal and an independent Reference Acoustic Sensor (REF) to measure Background Noise.
Figure 5:
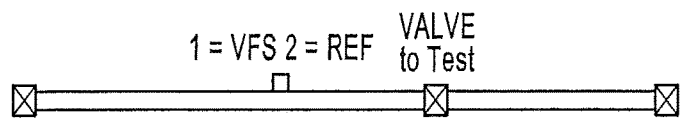
FIG. 5 illustrates Configuration 3 with One Acoustic Sensor to check both for the valve flow signal (VFS) and to measure Background Noise (REF).
Figure 6:
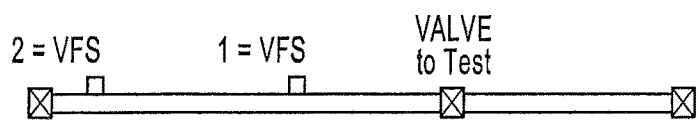
FIG. 6 illustrates Configuration 4 with Two Acoustic Sensors, both on the same side of the Valve.
Figure 7:
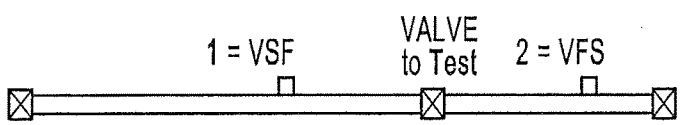
FIG. 7 illustrates Configuration 5 with Two Acoustic Sensors, where the two sensors bracket the Valve.
Figure 8:
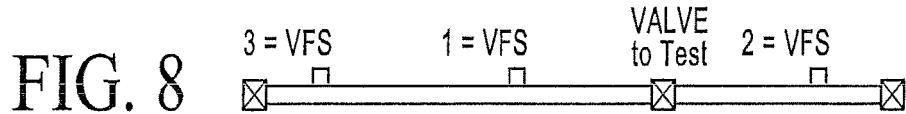
Figure 9:
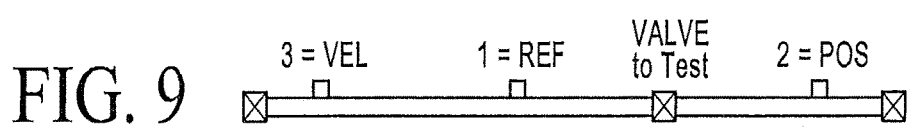
FIG. 9 illustrates Configuration 6 with Three Acoustic Sensors, where Sensors 1 and 2 bracket the Valve and are used to Locate the Valve Flow Signal (VFS), and Sensors 1 and 3 are on the same side of the Valve and are used to measure the propagation velocity of the Valve Flow Signal (VFS).
Figure 10:
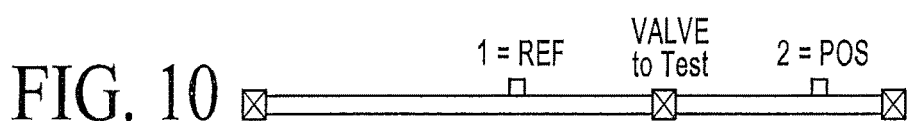
FIG. 10 illustrates Configuration 6 with Two Acoustic Sensors, where the two sensors bracket the Valve, and are used to locate the position of the Valve relative to the REF Acoustic Sensor.

FIGS. 3 through 10 illustrate eight of many different acoustic sensor locations that can be used to detect the presence of an incompletely closed valve by detection of the valve flow signal produced by flow across the valve. FIGS. 7 through 10 illustrate four acoustic sensor location that can be used to locate the source of the valve flow signal, which location can be used to determine whether or not the valve being examined is the source of the valve flow signal (i.e., whether or not it is closed). FIG. 6 can be used to determine which direction the valve flow signal is coming from, and therefore, which valves (the one on the left or the two on the right) may be the valve that is not closed.

Figure 3:
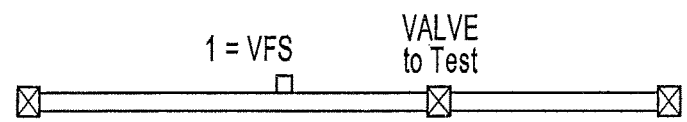
FIG. 3 illustrates Configuration 1 with One Acoustic Sensor to check for the valve flow signal (VFS).

FIGS. 3 and 5 illustrate the use of a single acoustic sensor. FIG. 3 illustrates that acoustic measurements can be made at pressure to detect the presence of a valve flow signal. FIG. 5 illustrates that acoustic measurements can be made prior to or after these valve flow measurements to estimate the average background noise. As stated above, this can be accomplished by making acoustic measurements when the valve is known to be tight or when the pressure is the same or zero on both sides of the valve. Both analyses of the raw or noise cancelled acoustic sensor time series or the power spectrum can be used to detect whether or not valve being tested is sealed. The preferred method of analysis is the take the ratio of the power spectra obtained when there is a pressure difference across the valve and when there is no pressure difference across the valve.

FIG. 4 illustrates the configuration in FIG. 3, but includes an acoustic sensor not located on and not subjected to the valve flow signal, but close enough to the acoustic sensor on the valve piping to measure the background noise. In addition to the analyses methods in FIG. 3, the acoustic sensor not subjected to the valve flow signal can be used as a reference for adaptive noise cancellation or average noise cancellation.

FIG. 6 illustrates two acoustic sensors located on one side of the valve being examined. In this configuration, the propagation speed of the valve flow signal can be determined.

Coherence Function and Coherence-Based Correlation Methods Used for Detecting and Locating Valve Pipe.

The coherence function and the coherence-based correlation methods developed by the inventor (called the Pipeline Advanced Leak-location System or PALS) and used for locating underground pressurized pipe leaks over distances 300 to 500 ft or more work, well and are well documented. The method works well for underground or buried pipe because the background noise is minimized simply because the surrounding backfill and soil dampens any ambient acoustic background noise. This approach does not work, or work well, however, for locating leaks in aboveground piping, because of the large amount of ambient background noise. The aboveground piping acts as an "acoustic antenna" for background noise, which interferes with the ability of the pipeline leak location system to work. Similar performance issues arise for valves, because they are located aboveground. As a consequence, these location methods have not been applied to piping valves located aboveground.

The author developed a method for applying these location methods to aboveground valves both for detection and for location. The method requires that background measurements be made when it is known that the valve is completely closed, or the pressure is the same on both sides of the valve (i.e., 0 psig). The background measurements can be used to identify those frequency bands where the noise is strong and should be avoided in the detection and location algorithms. This approach only needs to be used if there is some indication that the valve flow noise detected with the preferred method may not be the valve being tested. Also, accurate location of the valve is not required provided the location (and the valve) is between the two acoustic sensors.

Overview of Coherence Function and Coherence-Based Correlation Methods Used for Locating Leaks in Underground Pressurized Piping.

Figure 11:
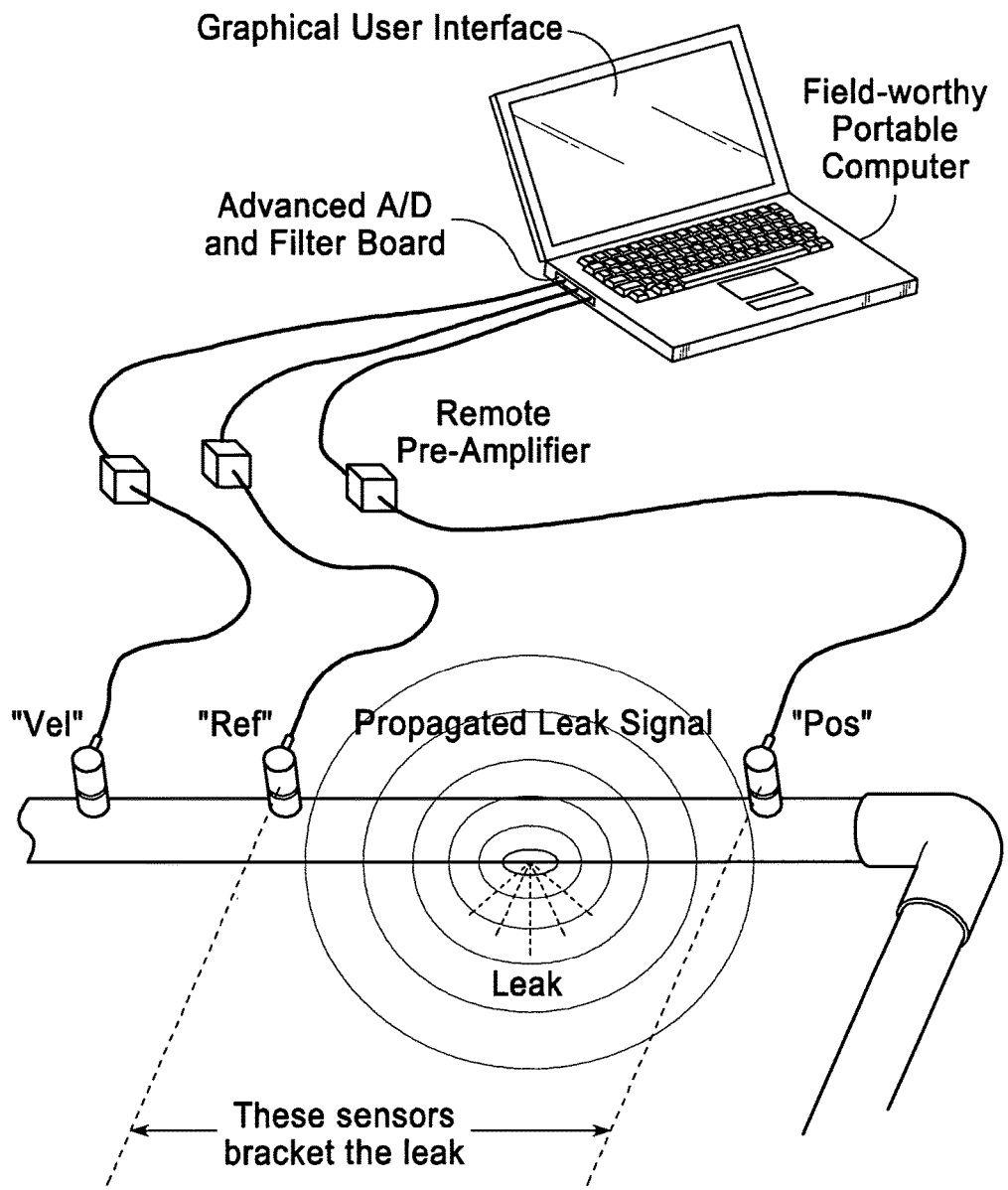
FIG. 11 illustrates a schematic of the PALS.

As described below, PALS was originally developed for locating holes in underground pipelines containing refined petroleum fuels and ranging in size from 2 in. to over 30 in. in diameter. PALS uses three sensors spaced at intervals along the line (see FIGS. 9 and 11). Two of the acoustic sensors bracket the valve and two of the sensors are on the same side of the valve. The two sensors bracketing the valve are used to locate the leak and will also be used to locate the source of the valve flow signal (i.e., the valve) and the two sensors on the same side of the valve are used to determine the propagation speed as a function of frequency to use in converting the acoustic time data to distance data for the location estimate. An in-house laboratory study was performed to determine whether or not PALS could detect and locate small leaks, leaks as small as 0.2-gal/h leak, which is EPA's regulatory performance standard for detection of leaks in underground pipelines found as gas stations, and if it could, how far could the sensors be separated and still achieve acceptable performance. The ability to detect and locate small valve flows was demonstrated as part of an in-house, internal research and development project where the measurements made to detect and locate leaks smaller than 0.2 gal/h. The measurements made in the laboratory using a small valve in a short section of pipe to simulate the leak in the pipe (see FIG. 18) apply directly. The valve flow was detected from the ratio of the PSD obtained during the tests when the valve was cracked and the PSD when the pressure was zero or the same on both sides of the valve.

PALS achieves a high level of performance because of a unique approach to signal processing based on coherence analysis that enables the leak signal to be identified as a function of frequency so that frequencies with high background noise could be avoided. The basic signal processing methodology used by the PALS was first demonstrated in 1991 on an underground 200-ft, 2-in.-diameter underground fuel pipeline. Further tests—on a 100-ft, 6-in.-diameter pipe section installed at the Test Apparatus—were conducted in 1995 immediately prior to the start of the further testing. In 2000, the author demonstrated the performance of the PALS for the Department of Defense at four different underground pipelines located in New Jersey, Arkansas, Kentucky, and California. Tests were conducted on the 1015-ft-long, 12-in.-diameter Navy Test Loop that was part of the SERDP Test Pipeline Facility (STPF). The PALS's performance was consistent in all of these tests: for line segments less than 200 ft long, the system located leaks within 3 ft or less of their actual positions; for line segments longer than 200 ft, the system located leaks to within 1.5% of the distance between sensors. In most of the tests, leaks were "created" through the use of removable leak plugs, with diameters of 0.01 and 0.04 in.

A description of the PALS method is provided below. It includes the algorithms based on the coherence function, as well as some examples of test results from the STPF. This description is followed by a description of the valve tests for very small flows and for flows and some background conditions found on a BOP.

System Description.

A brief description of the PALS is presented below. As illustrates FIG. 11, the PALS is comprised of three small acoustic sensors, three small pre-amplifiers, and a field-worthy notebook computer having a data acquisition card. There are a wide number of acoustic sensors or accelerometers that could be used. We have used acoustic sensors from Endevco, Physical Acoustics, Hartford Steam Boiler, and many others with good success. The cables connecting the pre-amps to the data acquisition card in the computer can be up to a thousand feet in length. The cables connecting the pre-amps to the sensors generally have length restrictions of 10 ft to 100 ft, or so. Communication between the sensor-pre-amp subsystem and the computer could also be accomplished by wireless communication.

The sensors can be attached directly to the pipe wall, flanges, or the valve with epoxy, a magnet, or a strapping system for portable testing and easy removal or permanently mounted on the pipe wall, flanges, or valve.

Each sensor measures the acoustic signal generated by the flow through a hole in the pipe. A pair of sensors called the "position" (POS) and "reference" (REF) sensors bracket the leak and determine the location of the leak relative to the Reference sensor. A second pair of sensors, which do not bracket the leak, is used to measure the speed of propagation of the acoustic signal in the pipe. The propagation speed is measured with the "velocity" (VEL) and the reference sensors. For the leak to be properly located, the distances between the sensors must be known—since the measurement made by the PALS determines the location relative to the reference sensor for the sensor configuration (VEL-REF-POS). These distances and this sensor configuration must be entered into the PALS software before a measurement can be made. A second measurement configuration can also be used, in which both the VEL and POS sensors are located to the left or right of the REF sensor (REF-VEL-POS). The REF-POS sensors still bracket the leak, but the REF-VEL sensors do not. A leak-location measurement can take as little as 10 s to 1 min and sometime 2 to 5 minutes to complete. (For valve testing, the measurement takes less than 5 s for detect and less than 1 min if a location measurement is required. Both configurations were used in the pipeline tests illustrating the capability herein.

The PALS uses automatic gain control and has a 16-bit data acquisition capability. The data acquisition card allows data to be collected at a maximum sample rate of 200,000 samples/second (200 kHz) and can process up to 200 ensembles per second comprised of up to 16,384 samples per ensemble. The Nyquist sample rate is 100 kHz, which is sufficient to exploit the leak signal over the frequency band of interest. The sample rate and ensemble length, which control the maximum separation distance allowed for the position and reference sensor pair, can be selected so as to maximize the number of ensembles averaged together in the shortest time. The software prints out the maximum separation distance possible for the choice of sample rate and ensemble size and warns the user if the parameter selection is not sufficient.

Coherence-Based Detection Algorithm.

PALS uses a coherence function signal-processing algorithm to locate a leak. The coherence approach overcomes the difficulties experienced with amplitude and correlation analyses. PALS uses the coherence function to determine the existence of an acoustic signal and to determine the frequency band that contains the signal. The existence of the signal and the frequency band containing the signal are determined from both the magnitude-squared ($\gamma^2$) and the phase ($\varphi$) displays. Once the frequency band containing the signal is selected, the location of the leak relative to the reference sensor can be estimated from the phase data. The PALS software implements this algorithm.

The $\gamma^2$ display allows for the frequency band with the strongest leak signal to be identified, and the $\varphi$ display allows for an estimate of the location of the leak to be made.

The $\gamma^2$ display is not sufficient by itself to identify which frequency band to use in the analysis. The phase of the frequency band selected for the analysis must be linear and stable, qualities that may be present in only a portion of the frequency band identified by $\gamma^2$. There may be multiple frequency bands that contain the signal, or one or more of these signal bands may be contaminated by different propagation modes or multipath reflections. The propagation velocity to use for each frequency band is not necessarily known a priori. In some cases a theoretical estimate of the propagation velocity can be used, but to ensure accurate location estimates it needs to be measured in most cases.

Unlike the correlation function, the coherence function determines the relationship between two time series as a function of frequency. This means that the coherence function can be used for leak location independently and without a priori knowledge about the properties of the pipeline or the leak; this is not possible using the correlation function.

Once the coherence function has identified the leak signal frequency band, the correlation function can be used to verify that only one leak signal exists and that reflections from other sections of the pipeline do not interfere with the location estimate. Multiple reflections or leak signals show up as multiple peaks in the correlation function. Small changes in the frequency band used to perform the leak location analysis often eliminate one or more of the multiple peaks, if they are present, and allow for a reliable estimate of location to be made. This use of the correlation function is powerful, but it works only because the signal band has already been determined from the coherence function.

Eqs. (1) and (2) can be used to compute the position of the leak and the propagation speed of the leak signal in the pipe, respectively, using the output of the coherence function. The location of the leak with respect to the REF sensor can be computed from the output of the phase display for the POS-REF by $$X_{REF-Leak} = X_{REF-POS}/2 - (Vd_{\varphi REF-POS}/df)/(4\pi) \quad (1)$$

where $X_{REF-Leak}$ is the distance from the reference sensor to the leak, V is the propagation velocity to use in the calculation, and $d\varphi/df$ is the slope of the linear portion of the phase plot in the frequency band containing the leak signal.

The propagation velocity, V, can be computed from the output of the phase display for the VEL-REF by $$V = 2\pi (X_{REF-VEL}(d\varphi_{REF-VEL}/df))^{-1} \quad (2)$$

Illustration of PALS at the STPF Underground Test Pipeline.

An example of the output of the coherence function ($\gamma^2$, $\varphi$) for the three sensors positioned on the test pipeline is illustrated schematically in FIG. 13. The sensors are labeled REF2, VEL, and POS. A leak of 1.9 gal/h flows through a 0.01-in.-diameter hole into a saturated sand backfill. All tests were conducted with water in the test pipeline and at a line pressure of 70 psi. The underground test pipeline is a 12-in.-diameter, schedule 40 pipeline that is buried approximately 3 ft in a sand backfill. A schematic of the line is shown in FIG. 12. The line, which is 1,015 ft long, begins at a vertical riser that extends about 3 ft above the ground and terminates with a blind flange at another 3-ft vertical riser. The pipeline is U-shaped with two long runs of 500 ft and a short section of 15 ft. The leak was located 233.5 ft from the outlet riser. Sensors can be mounted on carefully measured special access points, and on the exposed pipe at the two vertical risers located at the ends of the pipe and in an open concrete test pit. In addition, the line was exposed at three locations where pits had been dug. In these three pits the sensors were attached directly to the line using epoxy.

The three pits, which served as the initial positions of the position, reference, and velocity sensors, are denoted POS, REF, and VEL respectively. A constant-pressure, volumetric leak detection system was attached to the inlet riser to measure the volumetric flow rate of the leak during the acoustic tests and to establish and hold the pressure constant during the tests.

The distances between the POS-REF and the VEL-REF sensors for the sensor configuration shown in FIG. 12 were 360.0 ft and 137.3 ft, respectively. Since the reference sensor is not situated between the velocity and position sensors, the computed velocity is displayed as a negative number. At frequencies above 10 kHz, the leak signal for both the POS-REF and the VEL-REF coherence functions is clearly seen in FIG. 13. Values of $\gamma^2$ are greater than 0.6 and are clearly greater than the values of $\gamma^2$ outside the leak signal frequency band (frequencies less than 10 kHz). In this example, the phase $\varphi$ is highly linear, but the phase slope, $d\varphi/df$, changes slightly with frequency in the vicinity of the three peaks in $\gamma^2$ found at frequencies of 12.5, 15.5 and 18.0 kHz. The analysis for leak location was performed between 12.6 and 14.0 kHz. The results are summarized in Table 1.

TABLE 1

Leak Rate of 1.9 gal/h for a 0.01-in.-diameter Hole in the Test Pipeline

| Measurement | PALS Test Results 0.01-in. hole, 1.9 gal/h |
|---|---|
| Configuration (see Figure) | FIG. 12 |
| Reference - Position Sensor Separation Distance - ft | 360.0 ft |
| Reference - Velocity Sensor Separation Distance - ft | 137.3 ft |
| Velocity - m/s | 1,409 m/s |
| PALS: Reference - Leak-Location Distance - ft | 233.1 ft |
| Actual: Reference - Leak-Location Distance - ft | 233.5 ft |
| PALS: Error: Reference - Leak-Location Distance - ft | 0.4 ft |
| PALS: Reference - Leak-Location Distance - % of REF-POS Distance | 0.1% |

In this example, the PALS located the leak to within 0.4 ft (or 0.1% of the 360.0-ft POS-REF separation distance). The PALS indicated that the leak was 233.1 ft from the REF sensor, and the actual location of the leak was 233.5 ft. A measured propagation velocity of 1,409 m/s was used in the analysis.

FIG. 13 also shows the output of the correlation function on the bottom right corner for this frequency band (12.6 to 14.0 kHz). The correlation function shows a single, highly defined peak with a time delay of 30 ms. For a propagation velocity of 1,409 m/s, the position estimated with the correlation function is 236 ft, which is nearly identical to the estimate made with the coherence function. For this type of example, where the leak signal is very strong and the phase is very linear, the coherence and correlation functions should, as they did, give nearly identical results.

FIG. 14 shows the output of a leak-location test conducted in the absence of a leak. The $\gamma^2$ display is approximately zero over the entire frequency range, and the $\varphi$ display exhibits a random, irregular, and nonlinear behavior. The correlation function does not show any well-defined peaks. FIG. 14 illustrates the output when the ambient background noise is negligible.

FIG. 15 illustrates the most typical acoustic sensor configuration (VEL-REF-POS). This configuration was intended to test the PALS over a distance of 159.5 ft on a straight section of pipeline away from the ends. The output of the coherence function is shown in FIG. 19. The leak was located to within 0.5 ft of the actual location. The position measured with the PALS was 33.5 ft, and the actual position was 33.0 ft. The estimate of the leak position used the measured velocity of 1,621 m/s and the analysis was based on the frequency band between 17.6 and 18.4 kHz.

The accuracy of the PALS determined from the results of 19 tests is summarized in Table 2 is approximately 1% of the separation distance between the reference and position sensors bracketing the leak. The average error for these tests is about 3 ft over distances that ranged from 159.5 to 516.5 ft. In general, the accuracy of the test results ranged between 0.5% and 2.5% of the spacing between the reference and position sensors. The location accuracy was not strongly correlated with sensor separation distance. This result makes sense, because only those tests with adequate signal-to-noise ratio were analyzed.

TABLE 2

Summary of the Accuracy of 19 Leak-Location Tests Conducted at the STPF (Sensor Separation Distances between 159.5 and 516.5 ft)

|  | PALS Location Error (ft) | PALS Location Error (% of Sensor Separation) |
| --- | --- | --- |
| Average | 3.10 | 1.10 |
| Median | 2.65 | 0.80 |
| Standard Deviation | 2.02 | 0.77 |

For most valve flow measurements, the flow rates produced by an incompletely sealed valve will be higher than the flow rates used in these leak location tests and the positioning of the acoustic sensors relative to the valve flow/leak will be several feet rather than several hundred feet. The test pressures for a valve test will also be much higher, 250 psig and up to 10,000 psig versus 50 psig to 150 psig. As described below, the method will work well for both detection and location for even very small valve flow rates (0.16 gal/h), which are really too small to occur for the large valves and high pressures found on a BOP system.

Valve Measurements.

In 2002, the author performed an internal research project to illustrate that leaks smaller than 0.2 gal/h can be detected and located at distances over 100 ft when the pressure difference was 100 psig. The same and other methods of analyses are applied to the BOP valves, except the background noise is higher and only detection is required. Location would only be required if there was some question about whether or not the valve being tested was the source of the detected flow noise. A closed valve was slightly opened to simulate a leak in the pipe or flow across the valve.

FIG. 17 illustrates the test configuration. Our estimate of the valve flow/leak signal was generated by a slightly cracked valve in a 25-ft-long, straight section of 2-in.-diameter pipe. A constant-pressure, volumetric leak detection and volumetric flow measurement system (LT-100) was used to conduct a leak detection test of a pipe by making volumetric measurements at two constant pressures to remove (i.e., noise cancel) the thermally induced volume changes, was used to maintain constant pressure in that portion of the pipe on the downstream side of the valve and to measure flow rate across the valve. Pressure on the upstream side of the valve was maintained by a pressurized storage tank half filled with nitrogen. The signal produced by flow across a cracked valve is similar to (but weaker than) that produced by a leak through the pipe wall into some type of backfill.

As illustrated in FIG. 17, two acoustic sensors were mounted on the pipe, one on each side of the valve at distances of 8.5 and 3.9 ft ("far" and "near" sensors), respectively, from the valve. The valve itself was located at the center of the pipe. Acoustic data from a number of 2-min tests were analyzed at a sample rate of 65 kHz for a valve flow rate of 0.16 gal/h.

FIG. 18 illustrates the results of coherence analysis for $\gamma^2$ when there is no flow across the valve. Some coherent background noise is observed at frequencies below 2.5 kHz—this noise is due to vibrations present in the laboratory and is not typical of the measurements made on a pipe buried underground. Also, the spikes in the $\gamma^2$ plot in FIG. 18 are anomalous and were eliminated from the PALS. Outside of this coherent band, as seen in FIG. 19, the power spectral density is relatively flat—representative of the background noise in the system (−36 dB relative to unity for the "near" sensor and −32 dB for the "far" sensor).

FIG. 20 illustrates the results of the coherence analysis when there is a leak of 0.16 gal/h generated at a line pressure of 52 psi. The valve flow signal is observed in three frequency bands: (1) 2 to 4 kHz, (2) 5.5 to 7.5 kHz, and (3) 10 to 32 kHz. The highest frequency band, which is typically used to locate a leak, is due to propagation of the acoustic leak signal through the liquid. FIG. 21 illustrates the power spectra obtained for each of the sensors. SNR is estimated from the power spectra with the 0.16-gal/h valve leak and the background noise level estimated from FIG. 18. The PSD of the valve flow/leak data is on average 28.75 dB above that of the no-leak data.

Description and Illustration of BOP Valve Flow Measurement Methods.

A description of methods for detecting, measuring, and locating leaks in underground piping and flow across valves using a coherence-based approach and a bandpassed coherence-based correlation approach was provided above. Below we performed specific tests to evaluate our methods for detecting incompletely sealed valves in the presence of generator noise. The methods used to generate these results are all applicable for detection and some may be used for location. The figure captions describe and illustrate the method test configuration and the computational methods used (FIGS. 24 through 72) for a range of operational test conditions.

FIG. 22 illustrates in a photograph the valve flow measurement apparatus assembled to illustrate the capabilities of the valve flow measurement system when the piping and valves are located above ground. FIG. 23 illustrates one valve flow measurement laboratory test configuration to illustrate the preferred methods of analysis. In this case the VEL acoustic sensor is to the left of the REF acoustic sensor and the valve is located between the REF and POS acoustic sensors. FIG. 56 illustrates another valve flow measurement configuration. In this second case, the VEL acoustic sensor is located between the REF acoustic sensor and the valve. Both configurations work equally well.

The test results shown in FIGS. 24 through 55 were obtained for the test configuration illustrated in FIG. 23. The POS acoustic sensor is 0.375 ft (4.5 in.) from the valve and the REF acoustic sensor is located on the opposite of the valve at a distance of 0.375 ft (4.5 in.) from the valve. A third acoustic sensor, the VEL sensor is located on the same side of the valve as the REF sensor and 1.5 ft (18 in.) away from the REF sensor. The REF sensor is 0.75 ft (9 in.) away from the POS sensor.

FIGS. 24 through 39 illustrate the various analyses when the background noise is relatively quiet (i.e., normal people traffic but no generator noise). FIGS. 24 through 28 were obtained with the valve partially closed no pressure difference across the valve, i.e., the pressures on both sides of the valve were 0 psig. This represents a response for a closed valve. Once we cracked the valve to set the flow rate across the valve, we did not want to open and close it, because we would not be able to repeat the valve flow tests under the same conditions. FIGS. 29 through 34 were obtained with the valve partially closed with a pressure difference across the valve at the start of the measurements of 100 psig with the pressure on one side at 100 psig and the pressure on the other side of the valve of 0 psig. FIG. 31 shows the PSDs of the valve flow relative to the PSD of the ambient background. FIGS. 35 through 39 use the results in FIGS. 24 through 34 and compute the SNR by either the ratio or the difference in the data produced a valve flow and tightly sealed valve.

FIGS. 40 through 55 illustrate the various analyses when a generator is operating near the acoustic sensors. While the generator noise is extremely noisy, the presence of a small crack in the valve producing a small flow is very detectable and can be accurately located. FIGS. 57 through 72 were run under similar conditions as the tests results shown in FIGS. 24 through 39 and with similar results.

The plots in each of the figures illustrate the type of analyses that can be used to detect the presence of an incompletely sealed valve. The figure captions and the figures themselves indicate the method of processing. For each processing run, we show the raw time series, the PSDs, the cross PSD, the coherence function, and the correlation function after bandpassing to use the frequency band where the valve flow signal was strongest. We did not process the time series itself, but we could have performed similar analyses, but knowledge of the frequency bands where the valve flow signal is the strongest and the background noise is the smallest needs to be used and best obtained in the frequency domain. Processing in the frequency domain as a function of frequency is easier to implement than in the time domain. The frequency bands where the valve flow signal is the strongest and the background noise is the smallest are determined directly from the peaks in the SNR plots or the coherence analysis.

In general, the detection of a small valve flow is accomplished from setting a threshold on the excess power in the SNR plot of the cross power spectrum of the POS and the REF acoustic sensors, which is produced by taking the ratio of the cross PSD at the test pressure when the valve is cracked and the cross PSD when there is no pressure difference across the valve, i.e., when both sides of the pipe at 0 psig. Alternatively, one can use the SNR of the PSD or either acoustic sensor or the average of both. In general, the SNR determined from cross PSD is 5 to 10 dB higher than the SNR of either of the PSDs. Validation that the valve flow signal being measured is determined by locating the valve producing the valve flow signal using the magnitude squared and phase of the coherence function or the peak signal in the cross correlation function after banding passing as determined from the magnitude squared and/or the phase of the coherence function. The velocity measured by the REF and VEL acoustic sensors can be used to accurately analyze the data when the propagation modes are mixed.

In FIG. 56, the POS acoustic sensor is 1.83 ft (22 in.) from the valve. The REF acoustic sensor is located on the opposite of the valve at a distance of 2.0 ft (24.0 in.) from the valve. A third acoustic sensor, the VEL sensor is located on the same side of the valve as the REF sensor and 0.5 ft (6 in.) away from the REF sensor and 1.5 ft (18 in. from the valve.) The REF sensor is 3.33 ft (40 in.) away from the POS sensor. This configuration was used in the analyses illustrated in FIGS. 57 through 72 without the generator turned on and is the same series of analyses performed in FIGS. 24 through 39.

It should be noted that the acoustic sensors do not need to be calibrated relatively to an absolute standard provided that each sensor is used to record the background noise in the absence of a valve flow signal and to use in the measurement to determine whether or not a valve flow signal exists. The ratio or SNR of the PSDs or the cross PSDs divide the relative background noise out. This is also true for the coherence analyses.

The analyses in FIGS. 24 through 39, FIGS. 40 through 55, and FIGS. 57 through 72 start with acoustic time series that have not been noise cancelled. In general, the ratio or SNR computations does the noise cancellation provided that the background noise, such as the generator noise, does not change between the time the background time series is obtained and the time the valve flow measurements are made. This assumption is usually valid, because the valve flow measurements can be made in a matter of minutes. If this assumption is not true, then adaptive noise cancellation should be used using an acoustic sensor located in a position that it only records background noise and not the valve flow signal.

FIGS. 24 through 26 illustrate the time series and the PSDs of the POS and the REF acoustic sensors, and the cross PSD of the POS and REF acoustic sensors when the valve is partially closed, but the pressure on both sides of the valve is 0 psig. Only background noise is observed. The results would be the same if the valve were totally opened, totally closed, or at the same pressure on both sides of the valve. FIGS. 27 and 28 illustrate the output of the coherence function and the cross correlation function for the VEL and REF and the REF and POS acoustic sensors. Only background noise is observed.

FIGS. 29 through 32 illustrate the time series and the PSDs of the POS and the REF acoustic sensors, and the cross PSD of the POS and REF acoustic sensors when the valve is partially closed, but the pressure on one side of the valve is at 100 psig and the pressure on the opposite side of the valve is 0 psig. The presence of the valve flow signal is observed and is obviously different than the response when the pressure is zero on both sides of the valve. This is clearly illustrated in FIG. 31, which plots the PSDs for the background and valve flow signal on the same plot for the POS and REF sensors. FIGS. 33 and 34 illustrate the output of the coherence function and the cross correlation function, where the cross correlation function was bandpassed as determined by the coherence function, $\gamma^2$. The presence of the valve flow signal is observed in the magnitude squared ($\gamma^2$) plot for both sensor pairs and is obviously different than the response when the pressure is zero on both sides of the valve. The valve was located from the coherence measurements. The location of 0.31 ft (from the REF acoustic sensor) is in excellent agreement with the actual location of 0.33 (4 in.).

FIGS. 35 through 37 illustrate the ratio or SNR of the PSDs of the POS and the REF acoustic sensors and the cross PSD of the POS and REF acoustic sensors when the valve flow signal is present and when it is not, i.e., valve flow signal PSD divided by the background noise PSD. FIGS. 38 and 39 illustrate the difference of the PSDs and the cross PSD. The time series is not a reliable method of detection, because the frequency contributions are not discernable. If the frequency bands where the signal was the strongest and the noise was the smallest was known a priori, then the time series could be effectively used. This is also true if the time series were noise cancelled. The presence of the valve flow signal might be discernable in the time series, but would be much stronger once the right frequency bands were selected. The power in the time series can be computed from the variance or standard deviation squared.

The differences in the computed quantities like the PSDs or cross PSD and the ratio or differences of these quantities can be compared visually, or statistically. Statistical hypothesis tests can be set up to compare whether or not the ratio is difference from 1 (i.e., no valve flow signal) or statistical differences in the difference quantities at some level of confidence. These tests can be set up for difference errors (in terms of the probability of a missed detections or the probability of a false alarm). In addition, the SNR can be defined in terms of these probabilities.

While not shown, similar detection results can be obtained from statistical quantities like the mean, median, standard deviation, variance, and power, which can be computed for the time series, and compared. Again similar statistic hypothesis tests can be set up for the time series quantities.

FIGS. 40 through 55 illustrate the response when a generator is operating in the proximity of the acoustic measurements made in FIGS. 28 through 43. In this case, the generator response is found in the frequency bands below 15,000 Hz (15 kHz). This can be observed by comparing the PSDs, cross PSD, and the coherence functions with background noise only (FIGS. 25 through 26 or FIGS. 58 through 60) with the generator background noise illustrated in FIGS. 41 through 43. The presence of the valve flow signal is observed, as illustrated in FIGS. 52 and 53 (or FIGS. 54 and 55), by the 20 dB excess power observed in the frequency band above 15,000 Hz. Note that the power in the 0 to 15,000 Hz frequency band is similar for the background noise with the generator and the valve flow signal with the generator. A separate acoustic sensor could be used to adaptive noise cancel the generator noise, but this was not necessary for these measurements. The coherence function was used to locate the valve. The location measurement shown in FIG. 49 is 0.23 ft. Other frequency bands showed results of 0.31 ft. All location estimates were sufficiently accurate to verify that the source of the valve flow signal was the valve between the POS and the REF acoustic sensors.

The preferred method of determining whether or not a valve is completely closed is to take the ratio of the cross PSD of two sensors bracketing the valve and compute the SNR and compare it to a threshold to obtain an acceptably low probability of false alarm ($P_{FA}$) and an acceptably high probability of detection ($P_D$) against a flow rate set equal to the flow rate or some fraction of the flow rate produced by the threshold pressure drop used to declare an integrity problem. As a check, the ratio of the PSDs for the two individual sensors can be used, or the difference in the coherence function for the test and the background noise. If there is a question about whether or not the valve between the two sensors is producing the valve flow signal, then the coherence function and/or the bandpassed correlation function can be used to insure the valve is between the sensors. This should not be a problem because $\gamma^2$ is determined from the cross PSD divided by the absolute value of the product of the two individual PSDs to normalize the cross PSD between 0 and 1.

Apparatus.

This method can be implemented with off the shelf components and a software signal processing package developed especially to implement one or more of the processing methods describe above. A modified version of the PALS was used herein. This method can be implemented using one to three acoustic sensors, which are either permanently or temporarily mounted on the pipe or valve itself. There is a wide range of available acoustic sensors that can be used for this application. The sensors can be mounted with epoxy, a magnet, or a strap and holding unit for temporary measurements or strapped and/or welder to the pipe or a special unit welded to the pipe. The mounting mechanism needs to insure that the face of the acoustic sensor is in direct contact with the pipe wall or the valve to be able to sensor pressure variations due to a valve flow or a leak, A pre-amp is required, which may be included in the sensor or be a stand-alone item. A power supply is also needed. A data acquisition means, typically a micro-processor card, is used to collect the acoustic data. If the acoustic data is analog, then an A/D converter is needed. A computer or a special microprocessor can be used. If a special microprocessor is used, the processing can be accomplished at the sensor itself. The data collected by the acoustic sensors can be communicated to the computer by wireless or cable connection.

While certain representative embodiments and details have been shown for purposes of illustrating the invention, it will be apparent to those skilled in the art that various changes in the methods and apparatus disclosed herein may be made without departing from the scope of the invention which is defined in the appended claims.

The invention claimed is:

1. A method for a valve flow test to determine whether a valve that needs to close completely to pressurize a piping system containing a liquid and to hold pressure during a blowout preventer (BOP) system or subsystem test is completely closed, comprising the steps of:
   (a) mounting a plurality of acoustic sensors on the piping system or on the valve, wherein at least one sensor is on each side of the valve;
   (b) determining if a pressure difference exists across the valve by identifying an acoustic valve flow signal, thereby determining whether the valve is incompletely closed; and
   (c) distinguishing said valve flow signal from a level of background noise present when said valve is closed completely and produces no valve flow signal; and
   (d) quantifying the volume flow rate across a valve that is incompletely closed with a constant pressure volumetric measurement system.

2. The method of claim 1, where said acoustic valve test is made before, during, or after the completion of a BOP system test.

3. The method of claim 1, where said volume flow rate is used to determine whether said valve is closed.

4. The method of claim 1, where a temporal or frequency response from each of said acoustic sensors is determined by processing a times series of each of said acoustic sensors, to determine if fluctuations in said processed time series obtained when there is a pressure difference across an incompletely closed valve is greater than fluctuations in said processed time series obtained when said valve is completely closed and there is no pressure difference across said valve, where the pressure on both sides of the valve is zero or said valve is known to be completely closed, wherein a processing method is selected from the group consisting of the direct comparison, the ratio, or the difference of the times series and a power spectra computed from each sensor and a cross-power spectrum computed from at least two of said sensors collected during said test to said background noise and of the identification of the presence of the valve flow signal in a correlation or coherence function computed from at least two of said acoustic sensors.

5. The method of claim 4, where the temporal or frequency response from each said acoustic sensor is measured and said processing of each said acoustic sensor is accomplished using a system selected from the group consisting of an analog data collection and processing system, a digital data collection and processing system, and an analog data collection system and with a digital processing system.

6. The method of claim 4, where said temporal or frequency response from said processed time series is determined by processing said time series in one or more frequency bands where a signal-to-noise ratio (SNR) of said valve flow signal is sufficient to distinguish a valve flow signal from an incompletely closed valve from background noise and false alarms.

7. The method of claim 6, wherein the presence of an incompletely closed valve is determined from the ratio of said cross-power spectrum obtained during said valve flow test and of said cross-power spectrum obtained from a background test.

8. The method of claim 6, where the presence of said incompletely closed valve is determined from the ratio of said power spectrum obtained during said test and of said power spectrum obtained from a background test.

9. The method of claim 6, where said frequency bands where said acoustic valve flow signal is strongest is determined from the output of the coherence function obtained during said valve flow test and said background test, when two of said acoustic sensors are used and where one of said acoustic sensors is mounted on each side of said valve.

10. The method of claim 9, where said frequency bands are determined from peaks in a magnitude-squared output of the coherence function, $\gamma^2$, obtained during said test, which are not found in the same frequency bands as a magnitude-squared output of the coherence function of any interfering background noise that prevents detection of an incompletely closed valve.

11. The method of claim 9, where said frequency bands are determined from linear regions of the phase output of a coherence function, $\phi$, obtained during said valve flow test, which are not found in the same frequency bands as phase output of the coherence function of any interfering background noise that prevents detection of an incompletely closed valve.

12. The method of claim 9, where said frequency bands are determined from the output of the coherence function and checked using the output of a correlation function.

13. The method of claim 6, where said frequency bands are processed in said time series before any other processing is performed.

14. The method of claim 6, where said frequency bands are processed in the frequency functions generated from said time series.

15. The method of claim 4, where the background noise is obtained from the time series from at least one other acoustic sensor that is obtained when said valve flow signal is not present and said background noise time series is used to remove said background noise from said time series of the valve flow signal using standard noise cancellation methods and the presence of said valve flow signal is determined from the difference between said time series of said valve flow acoustic sensor when no valve flow signal is present, where said other acoustic sensor could be the valve flow acoustic sensor when said valve flow signal is not present.

16. The method of claim 15, where said time series of said background noise is used in an adaptive noise cancellation method to remove or minimize said background acoustic noise in the said time series of said valve flow signal acoustic sensor, where said background noise time series is obtained at the same time as said valve flow acoustic measurements.

17. The method of claim 15, where said time series of said background noise is used to develop an average background noise cancellation transfer function to remove or minimize said background acoustic noise in the said time series of said valve flow signal acoustic sensor, where said background noise time series can be obtained before, during, or after said valve flow acoustic measurements.

* * * * *